United States Patent [19]

Fitzgerald et al.

[11] Patent Number: 5,036,466
[45] Date of Patent: Jul. 30, 1991

[54] DISTRIBUTED STATION ARMAMENT SYSTEM

[75] Inventors: Frank Fitzgerald, East Northport, N.Y.; William H. Ackerman, Jr., Centreville, Va.

[73] Assignee: Grumman Aerospace Corporation, Bethpage, N.Y.

[21] Appl. No.: 416,644

[22] Filed: Oct. 3, 1989

[51] Int. Cl.$^5$ .......................... G06F 15/58; F41F 7/00
[52] U.S. Cl. ...................................... 364/423; 235/400
[58] Field of Search .............. 364/423; 235/400–401; 89/1.56, 1.801, 1.813, 1.814, 1.810

[56] References Cited

U.S. PATENT DOCUMENTS

| | | | |
|---|---|---|---|
| 3,499,363 | 3/1970 | Lauro | 89/1.814 |
| 3,535,683 | 10/1970 | Woods et al. | 371/29 |
| 3,598,015 | 8/1971 | Delistovich | 89/1.814 |
| 3,603,948 | 9/1971 | Mediinski | 371/29 |
| 3,609,312 | 9/1971 | Higgins et al. | 364/423 |
| 3,619,792 | 11/1971 | Capeci et al. | 89/1.814 |
| 3,699,310 | 10/1972 | Cole | 235/401 |
| 3,735,668 | 5/1973 | Langlois et al. | 89/1.814 |
| 3,779,129 | 12/1973 | Lauro | 89/1.814 |
| 3,803,974 | 4/1974 | Everest et al. | 89/1.56 |
| 3,805,038 | 4/1974 | Buedel et al. | 371/29 |
| 4,246,472 | 1/1981 | Sun et al. | 235/401 |
| 4,324,168 | 4/1982 | Sano et al. | 89/1.814 |
| 4,359,926 | 11/1982 | Sano et al. | 89/1.814 |
| 4,475,196 | 10/1984 | La Zor | 371/29 |
| 4,494,438 | 1/1985 | Lighton et al. | 89/1.813 |
| 4,539,682 | 9/1985 | Herman et al. | 371/15 |
| 4,825,151 | 4/1989 | Aspelin | 89/1.56 |

Primary Examiner—Felix D. Gruber
Attorney, Agent, or Firm—Scully, Scott Murphy & Presser

[57] ABSTRACT

An armament system for use with a plurality of different types of stores, and comprising a central unit and a plurality of distributed stations. The central unit holds a plurality of store specific application programs, and each of the plurality of store types is associated with one of the store specific application programs. Moreover, each of the store specific application programs is adapted to control the transmission of data between a store of an associated type and one of the distributed stations. The central unit is adapted to control the operation of the armament system and the transmission of data between the central unit and the distributed stations, and to transmit any of the store specific application programs to any of the distributed stations of the armament system.

12 Claims, 49 Drawing Sheets

| INDEX VALUE | MODE CODE |
|---|---|
| 0 | DYNAMIC BUS OFFER |
| 1 | SYNCHRONIZE RT |
| 2 | TRANSMIT STATUS WORD |
| 3 | INITIATE SELF-TEST |
| 4 | TRANSMITTER SHUTDOWN |
| 5 | OVERRIDE TRANSMITTER SHUTDOWN |
| 6 | INHIBIT TERMINAL FLAG |
| 7 | OVERRIDE INHIBIT TERMINAL FLAG |
| 8 | RESET REMOTE TERMINAL |
|   | 9 THROUGH 15 ARE RESERVED |
| 16 | TRANSMIT VECTOR WORD |
| 17 | SYNCHRONIZE WITH DATA WORD (RECEIVE ONLY) |
| 18 | TRANSMIT LAST COMMAND |
| 19 | TRANSMIT BIT WORD |
| 20 | SELECTED TRANSMITTER SHUTDOWN |
| 21 | OVERRIDE SELECTED TRANSMITTER SHUTDOWN |
|   | 22 THROUGH 29 ARE RESERVED |
| 30 | ADJUST TERMINAL REDUNDANCY DEFAULTS |
| 31 | CONTROL TERMINAL PASSTHROUGH MODE |

FIG.11

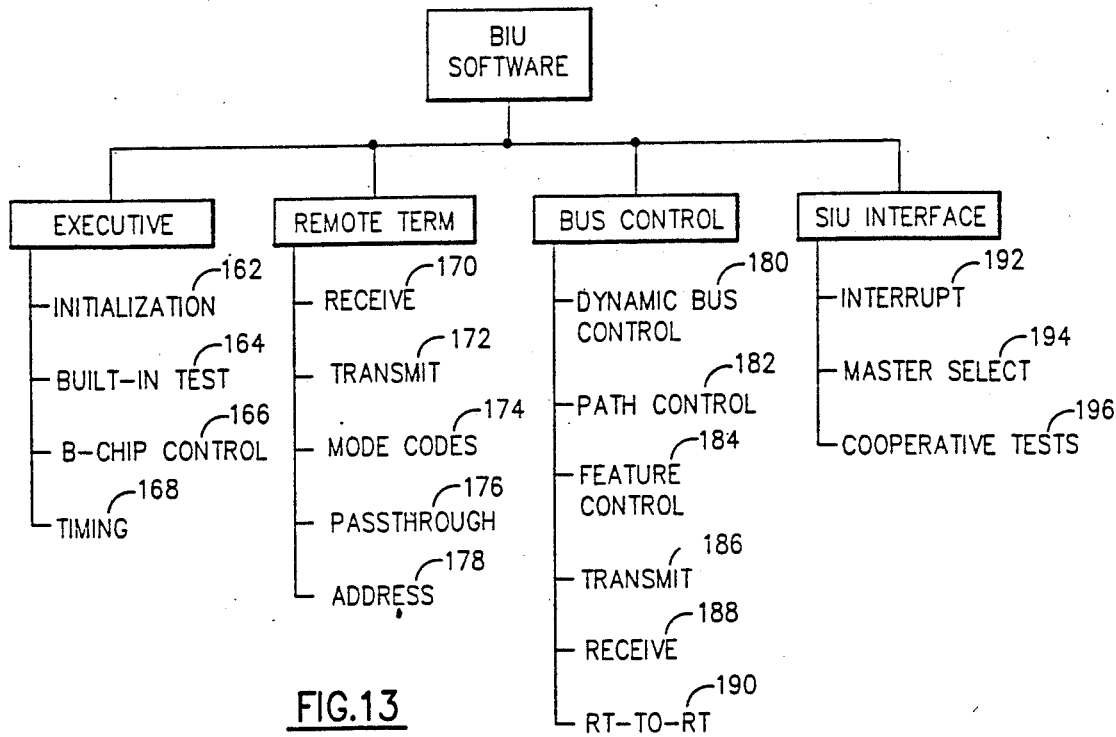

CONTENTS OF MEMORY 76a OF THE A BIU

| TRIAL BUFFER AREA | BIU STATUS WORD |
|---|---|
| SUBADDRESS INDEX | BIU ADDRESS |
|  | CURRENT MSEC. COUNT |
| BUFFER AREA |  |
|  | A BIU BIT WORD |
|  | A SIU BIT WORD |
|  | B BIU BIT WORD |
| BUS CONTROL FILE POINTER | SYSTEM DATA BUS BIT WORD |
| BUS CONTROL FILE | INPUT – OUTPUT BIT WORD FROM A SIU |
|  | INPUT – OUTPUT BIT WORD FROM B SIU |
|  | DEAD BIU FLAG |
|  | DEAD SIU FLAG |
| GOOD TRANSMISSION COUNTER ||
| GOOD RECEIVED MESSAGE COUNTER ||
| BAD RECEIVED MESSAGE COUNTER ||

FIG.14

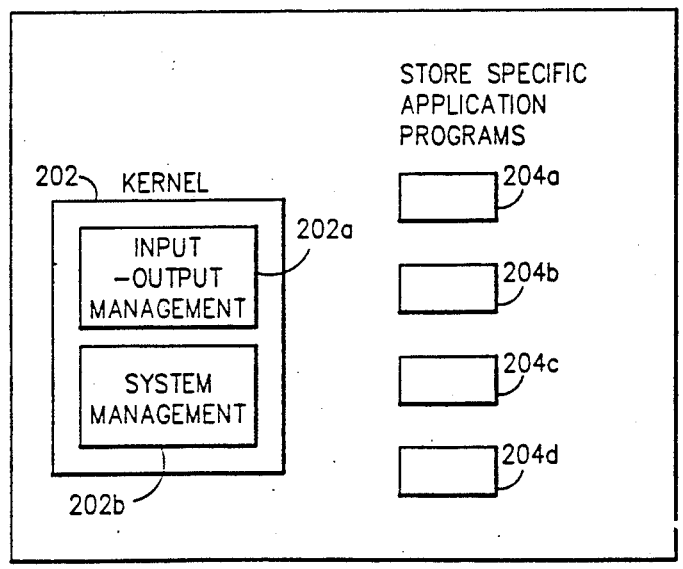

FIG.15

MICROCONTROLLER BIT WORD

| NO. | SIGNIFICANCE |
|---|---|
| 0 (LSB) | MICROCONTROLLER POR HAS BEEN PERFORMED |
| 1 | PROGRAM CHECKSUM FAULT HAS BEEN DETECTED |
| 2 | COMMUNICATION RAM FAULT DETECTED (IN THIS RAM) |
| 3 | SPARE |
| 4 | SPARE |
| 5 | SPARE |
| 6 | PROGRAM RUNAWAY DETECTED |
| 7 (MSB) | DEAD PROCESSOR |

FIG.18

SYSTEM DATA BUS BIT WORD

| NO. | SIGNIFICANCE |
|---|---|
| 0 (LSB) | BUS CHIP POR HAS BEEN PERFORMED |
| 1 | RT ADDRESS PARITY FAULT DETECTED |
| 2 | LAST RECEIVE MESSAGE DATA FAULT |
| 3 | BC-TO-RT REVERSION |
| 4 | NO BC RESPONSE ON SECONDARY BUS |
| 5 | NO BC RESPONSE ON PRIMARY BUS |
| 6 | NO RT ACTIVITY ON SECONDARY BUS |
| 7 (MSB) | NO RT ACTIVITY ON PRIMARY BUS |

FIG.19

INPUT/OUTPUT BIT WORD

| NO. | SIGNIFICANCE |
|---|---|
| 0 (LSB) | ALL INPUTS AT ZERO |
| 1 | ALL INPUTS AT ONE |
| 2 | SPARE |
| 3 | SPARE |
| 4 | SPARE |
| 5 | OUTPUT-INPUT MISMATCH |
| 6 | EEPROM PROGRAM INCOMPLETE LOAD |
| 7 (MSB) | EEPROM PROGRAM CHECKSUM FAULT |

FIG.20

BIT WORDS HELD IN MEMORY 76a OF THE A BIU
MICROCONTROLLER BIT WORD FROM MICROCONTROLLER OF THE A BIU,
MICROCONTROLLER BIT WORD FROM MICROCONTROLLER OF THE A SIU,
SYSTEM BUS BIT WORD FROM THE A BIU,
I/O BIT WORD FROM THE A SIU.

BIT WORDS HELD IN MEMORY 76b OF THE A BIU
MICROCONTROLLER BIT WORD FROM MICROCONTROLLER OF THE A BIU,
MICROCONTROLLER BIT WORD FROM MICROCONTROLLER OF THE B SIU,
SYSTEM BUS BIT WORD FROM THE A BIU,
I/O BIT WORD FROM THE B SIU.

BIT WORDS HELD IN MEMORY 76a OF THE B BIU
MICROCONTROLLER BIT WORD FROM MICROCONTROLLER OF THE B BIU,
MICROCONTROLLER BIT WORD FROM MICROCONTROLLER OF THE A SIU,
SYSTEM BUS BIT WORD FROM THE B BIU,
I/O BIT WORD FROM THE A SIU.

BIT WORDS HELD IN MEMORY 76b OF THE B BIU
MICROCONTROLLER BIT FROM MICROCONTROLLER OF THE B BIU,
MICROCONTROLLER BIT FROM MICROCONTROLLER OF THE B SIU,
SYSTEM BUS BIT WORD FROM THE B BIU,
I/O BIT WORD FROM THE B BIU.

BIT WORDS HELD IN MEMORY 94 OF THE A SIU
MICROCONTROLLER BIT WORD FROM THE MICROCONTROLLER OF THE A SIU,
I/O BIT WORD FROM THE A SIU.

BIT WORDS HELD IN MEMORY 94 OF THE B SIU
MICROCONTROLLER BIT WORD FROM THE MICROCONTROLLER OF THE B SIU,
I/O BIT WORD FROM THE B SIU.

FIG.21

TABLE 9-4. LOGIC LINE IDENTIFICATION

```
FROM BIU A:
   L0  = 1  SIU A IS GOOD
   L1  = 1  SIU B IS GOOD
                (BOTH = 0 INDICATES BIU A IS BAD)
FROM BIU B:
   L2  = 1  SIU B IS GOOD
   L3  = 1  SIU A IS GOOD
                (BOTH = 0 INDICATES BIU B IS BAD)
FROM SIU A:
   L4  = 1  SIU B IS BAD
   L5  = 1  BIU A IS ACTIVE
                (BOTH = 0 INDICATES SIU A IS BAD)
FROM SIU B:
   L6  = 1  SIU A IS BAD
   L7  = 1  BIU B IS ACTIVE
                (BOTH = 0 INDICATES SIU B IS BAD)
FROM POWER SUPPLIES:
   L8  = POWER A HAS CHANGED FROM OFF TO ON
   L9  = POWER B HAS CHANGED FROM OFF TO ON
FROM THE LOGIC OUTPUT:
   L10 = 1 CHANNEL A IS SELECTED
   L11 = 1 CHANNEL B IS SELECTED
```

FIG.23

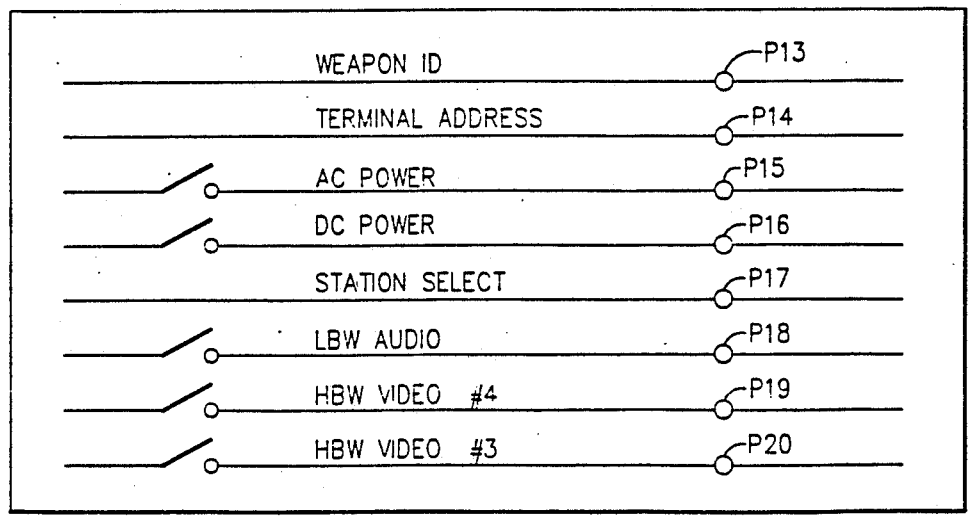

FIG.28

| SOURCE | BIU A<br>L0, 1 | BIU B<br>L2, 3 | SIU A<br>L4, 5 | SIU B<br>L6, 7 | POR<br>L8, 9 | LOGIC<br>L10, 11 | SELECT |
|---|---|---|---|---|---|---|---|
| NORMAL OPERATION | | | | | | | |
| | 1 1 | 1 1 | 0 0 | 0 1 | 0 0 | X X | A |
| | 1 1 | 1 1 | 0 1 | 0 0 | 0 0 | X X | B |
| POWER CHANGE RESPONSES | | | | | | | |
| | X X | X X | X X | X X | 1 1 | X X | RESET |
| | X X | X X | X X | X X | 1 0 | 1 0 | HOLD |
| | X X | X X | X X | X X | 0 1 | 0 1 | HOLD |
| | X X | X X | X X | X X | 1 0 | 0 1 | B |
| | X X | X X | X X | X X | 0 1 | 1 0 | A |
| SINGLE BIU FAILURES | | | | | | | |
| | 0 0 | 1 1 | 0 0 | 0 1 | 0 0 | X X | B |
| | 0 0 | 1 1 | 0 1 | 0 0 | 0 0 | X X | HOLD |
| | 1 1 | 0 0 | 0 1 | 0 0 | 0 0 | X X | A |
| | 1 1 | 0 0 | 0 0 | 0 1 | 0 0 | X X | HOLD |
| SINGLE SIU FAILURES | | | | | | | |
| | 1 0 | 0 1 | 1 1 | 0 0 | 0 0 | X X | A |
| | 0 1 | 1 0 | 0 0 | 1 1 | 0 0 | X X | B |
| | 1 0 | 1 1 | 1 1 | 0 0 | 0 0 | X X | A |
| | 1 1 | 0 1 | 1 1 | 0 0 | 0 0 | X X | A |
| | 1 0 | 0 1 | 0 1 | 0 0 | 0 0 | X X | A |
| | 1 0 | 0 1 | 1 1 | X X | 0 0 | X X | A |
| | 1 1 | 1 0 | 0 0 | 1 1 | 0 0 | X X | B |
| | 0 1 | 1 1 | 0 0 | 1 1 | 0 0 | X X | B |
| | 0 1 | 1 0 | X X | 1 1 | 0 0 | X X | B |
| COMBINED BIU AND SIU FAILURES | | | | | | | |
| | 0 0 | 1 0 | 0 0 | 1 1 | 0 0 | X X | B |
| | 0 1 | 0 0 | 0 0 | 1 0 | 0 0 | X X | B |
| | 1 0 | 0 1 | 1 0 | 0 0 | 0 0 | X X | A |
| | 0 0 | 0 1 | 1 0 | 0 0 | 0 0 | X X | A |
| ALL OTHER COMBINATIONS | | | | | | | |
| | X X | X X | X X | X X | X X | X X | HOLD |

FIG.24

```
BUS MESSAGES

```
R24 MESSAGE

1. SAFETY FLAGWORD
    i)   ARMAMENT SAFETY OVERRIDE BIT
    ii)  MASTER ARM BIT
    iii) WEIGHT OFF WHEELS BIT
    iv)  LANDING GEAR HANDLE BIT
    v)   GROUND TEST BIT 2. JETTISON ENABLE FLAGWORD
    i)  INTENT TO JETTISON BIT
    ii) JETTISON ARM BIT 3. WEAPON SAFETY FLAGWORD
    i)   STATION SELECT BIT
    ii)  TARGET DESIGNATE BIT
    iii) INTENT-TO-LAUNCH BIT
    iv)  CRAB BIT
    v)   WEAPON SELECT BIT

4. FUZE CONTROL FLAGWORD
    -SAFE, INSTANTANEOUS OR DELAY

5. LOADOUT WORD
    -WALLEYE WEAPON OR WALLEYE POD

6. R01 MESSAGE
```

```
R01 MESSAGES

1. STORE IDENTIFICATION CODE
2. STORE CONTROL DATA
```

```
T02 MESSAGES

1. POD CONFIGURATION STATUS WORD
2. POD CONTROL STATUS WORD
3. POD BIT STATUS WORD
```

FIG.33

```
T07 MESSAGE

DATA IDENTIFYING THE
STATUS OF SELECTED
CONDITIONS OF THE
DISTRIBUTED STATION
```

```
T23 MESSAGE

1. STATION DATA FLAGWORD
2. WALLEYE PROGRAM FLAGWORD
    i)  STORE IDENTIFICATION CODE
    ii) ERROR CODE
3. WORD (1) OF T02 MESSAGE
4. WORD (2) OF T02 MESSAGE
5. WORD (3) OF T02 MESSAGE
```

FLAGS EMPLOYED WITH THE WALLEYE WEAPON AND
WALLEYE POD APPLICATION SOFTWARE

1. ISR DIRECTION FLAG
2. LOADOUT COMMAND FLAG
3. INHIBIT ALL COMMANDS FLAG
4. STATION SELECT FLAG
5. WEIGHT ON WHEELS FLAG
6. LANDING GEAR HANDLE FLAG
7. MASTER ARM FLAG
8. ARMAMENT SAFETY OVERRIDE FLAG
9. GROUND TEST FLAG
10. GENERIC APPLICATION FLAG
11. STORE TYPE ISR DIRECTION FLAG
12. STORE HUNG FLAG
13. LOADOUT PRESENT FLAG
14. 1760 MESSAGE PRESENT FLAG
15. STATUS MESSAGE HANDSHAKE FLAG
16. JETTISON ENABLE FLAG
17. WEAPON SELECT FLAG
18. 1760 INITIALIZATION FLAG
19. STORE BUS PREFERENCE FLAG
20. STORE MISMATCH FLAG
21. 1760 SOLICIT RESPONSE FLAG
22. T23 MESSAGE MONITOR FLAG
23. T23 MESSAGE UPDATE FLAG
24. ARMAMENT SYSTEM BUS PREFERENCE FLAG

FIG.35

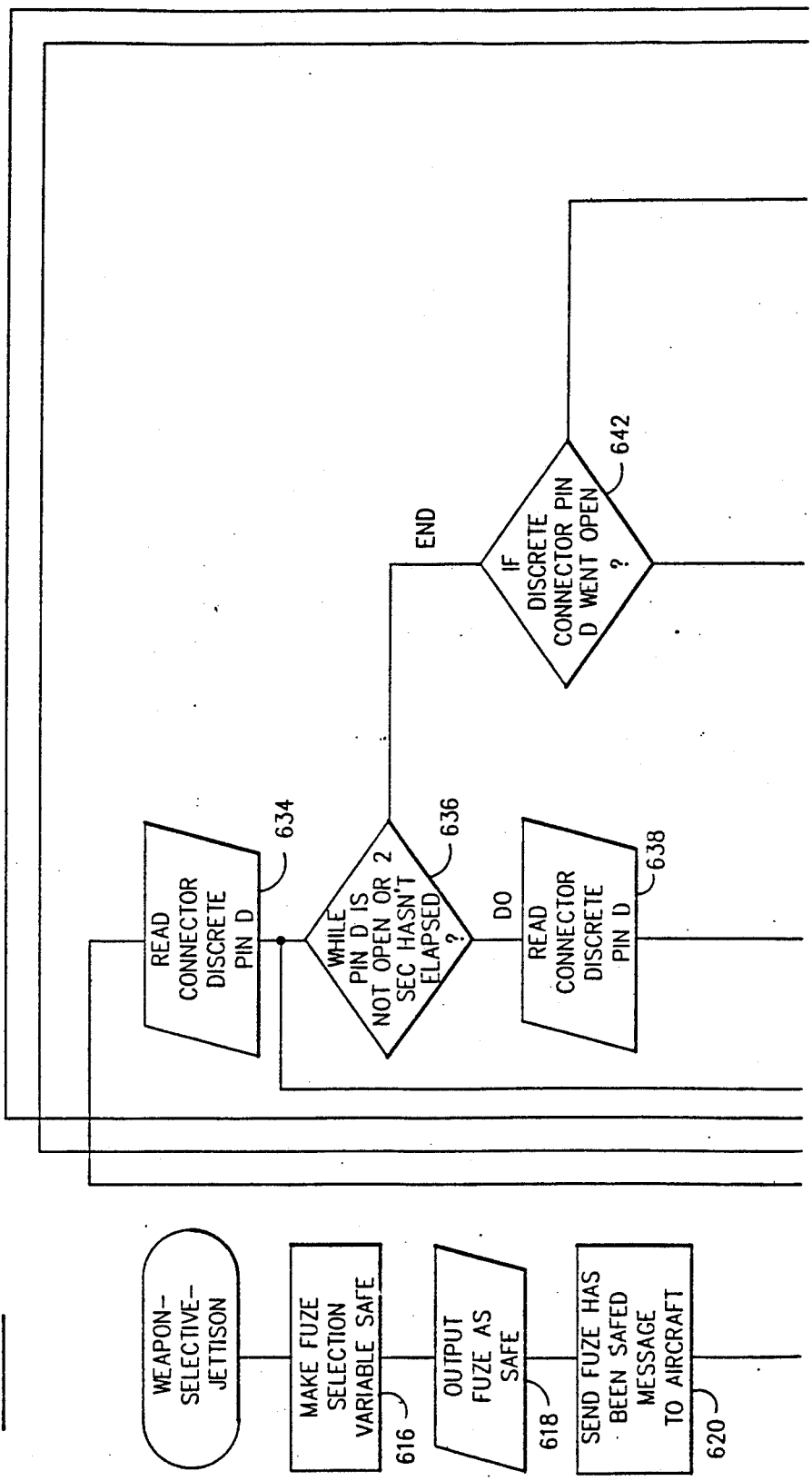

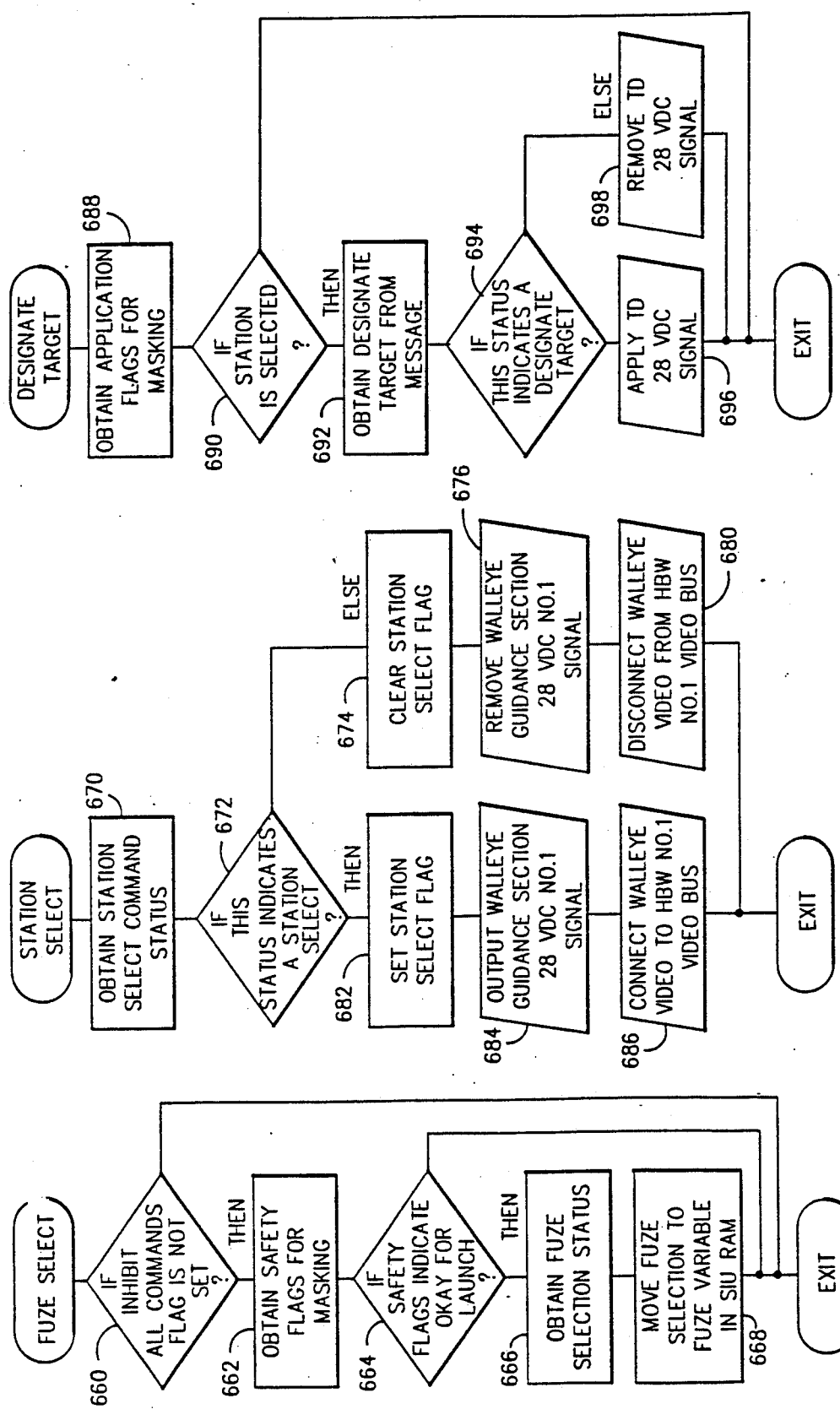

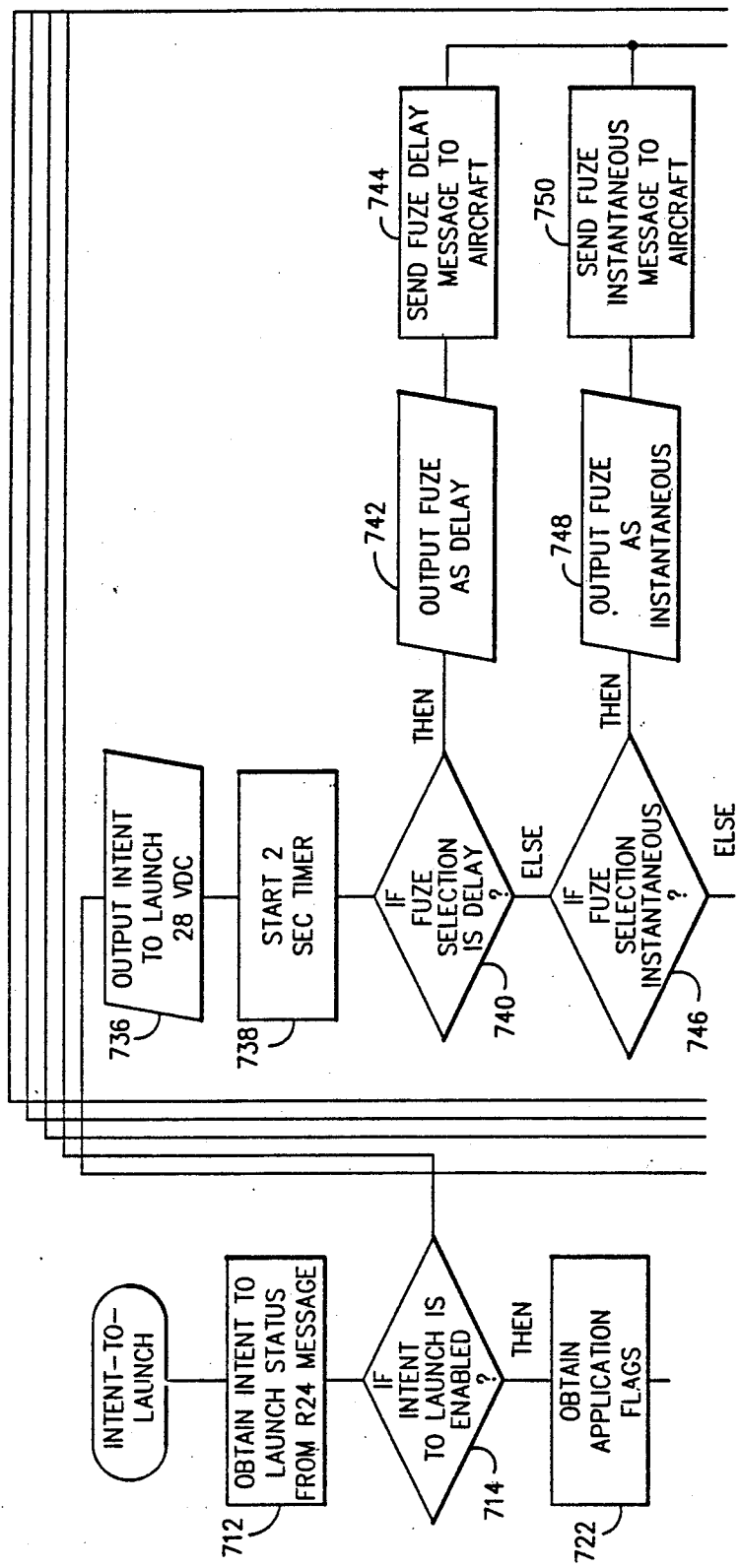

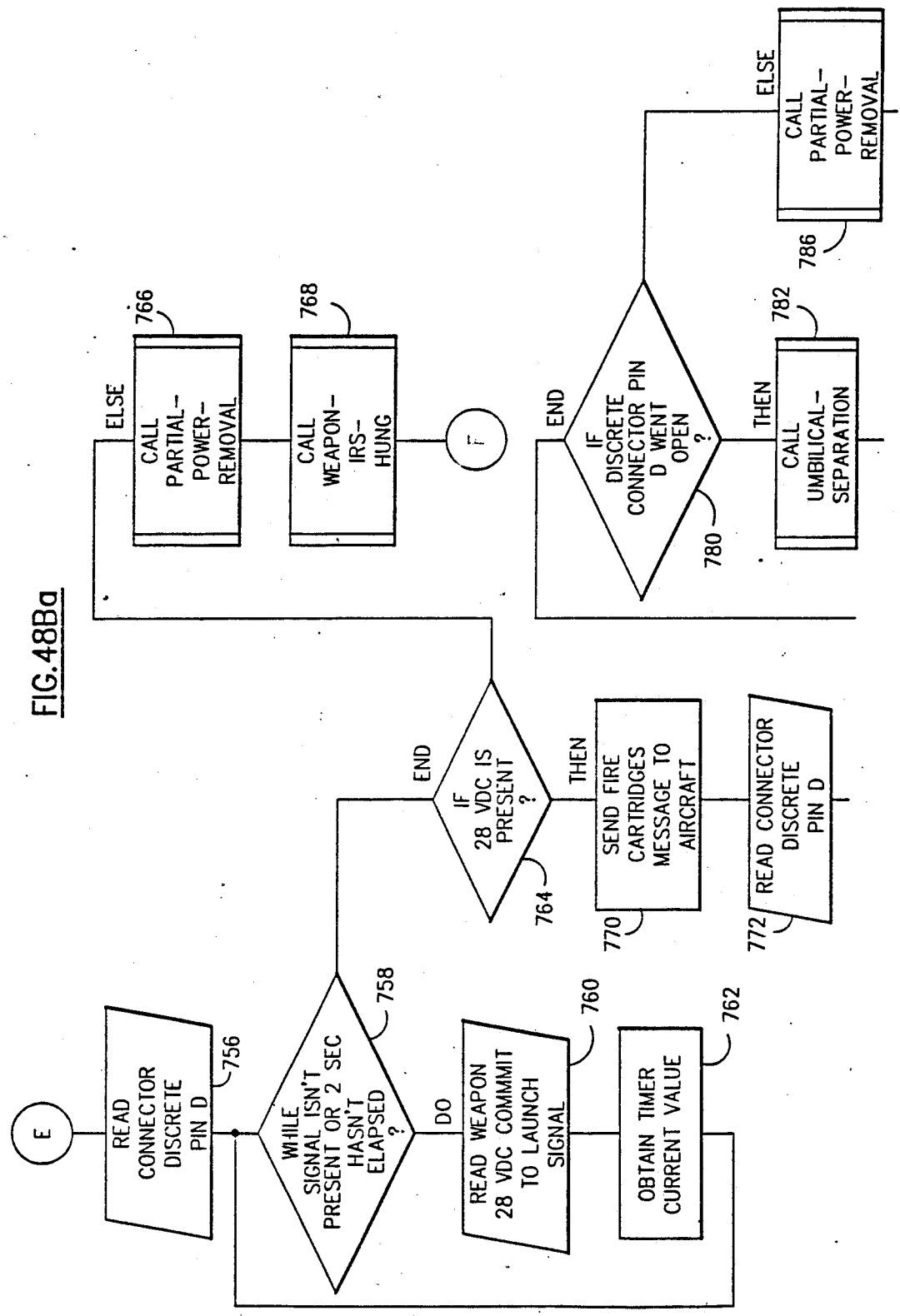

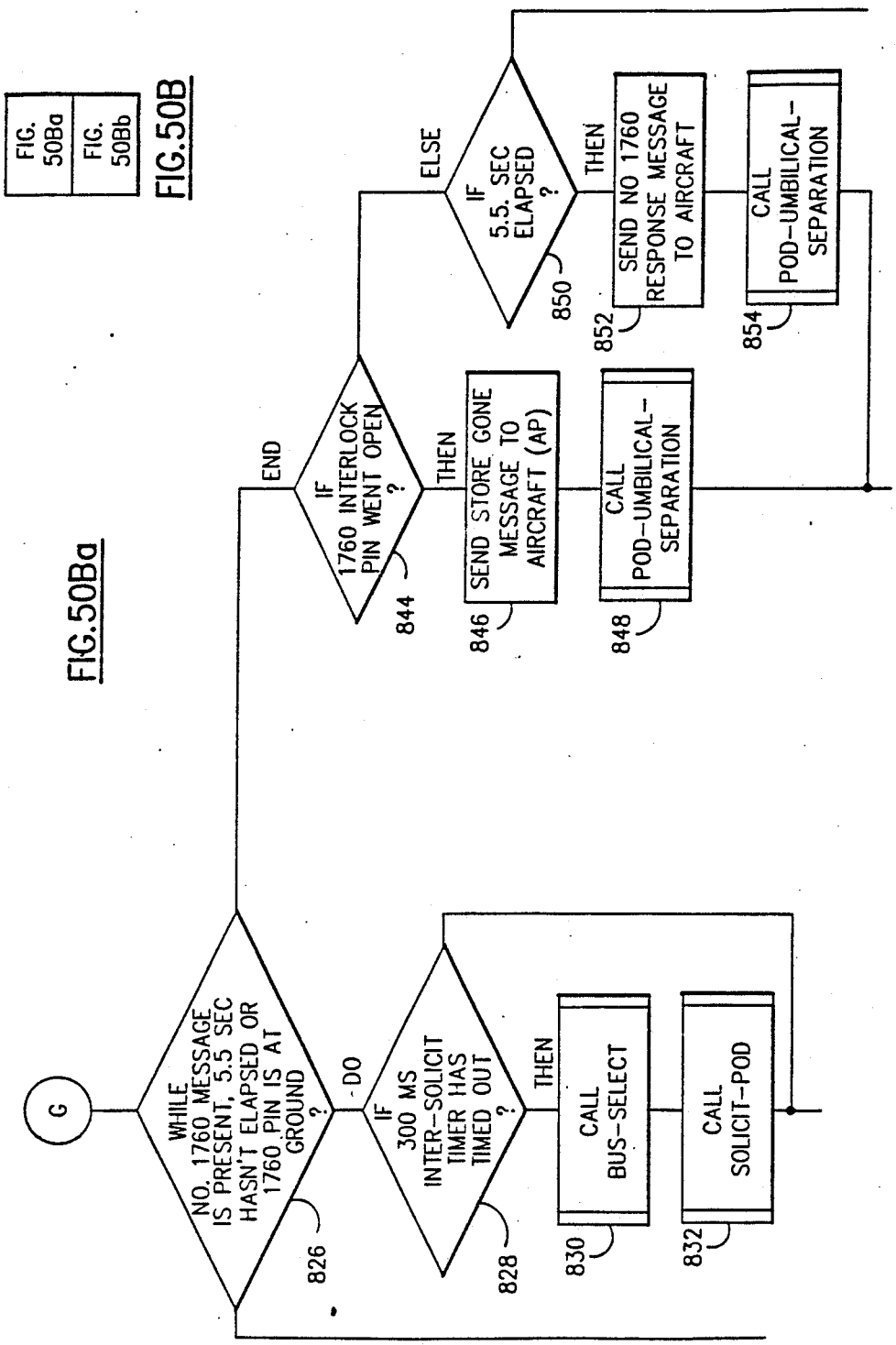

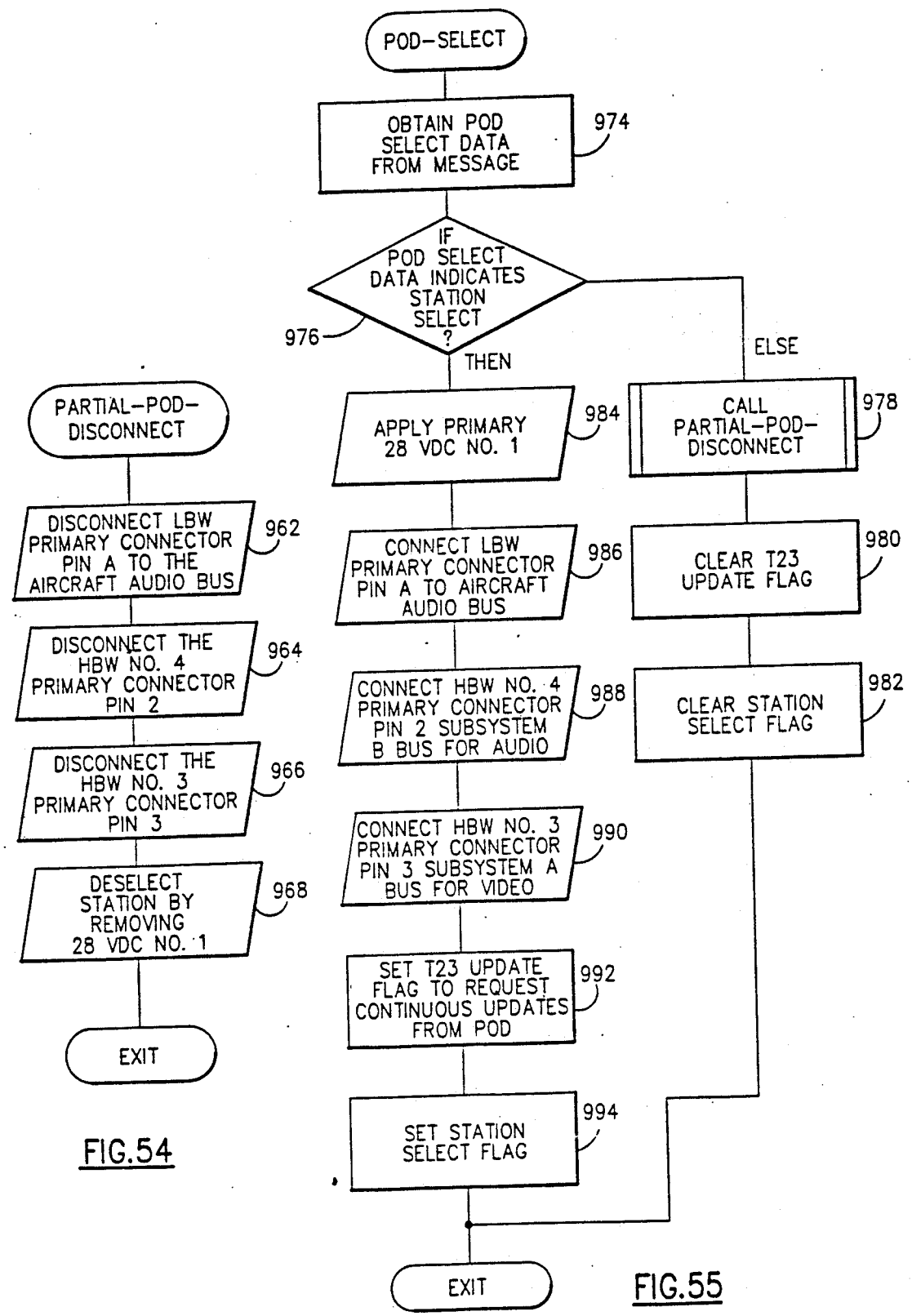

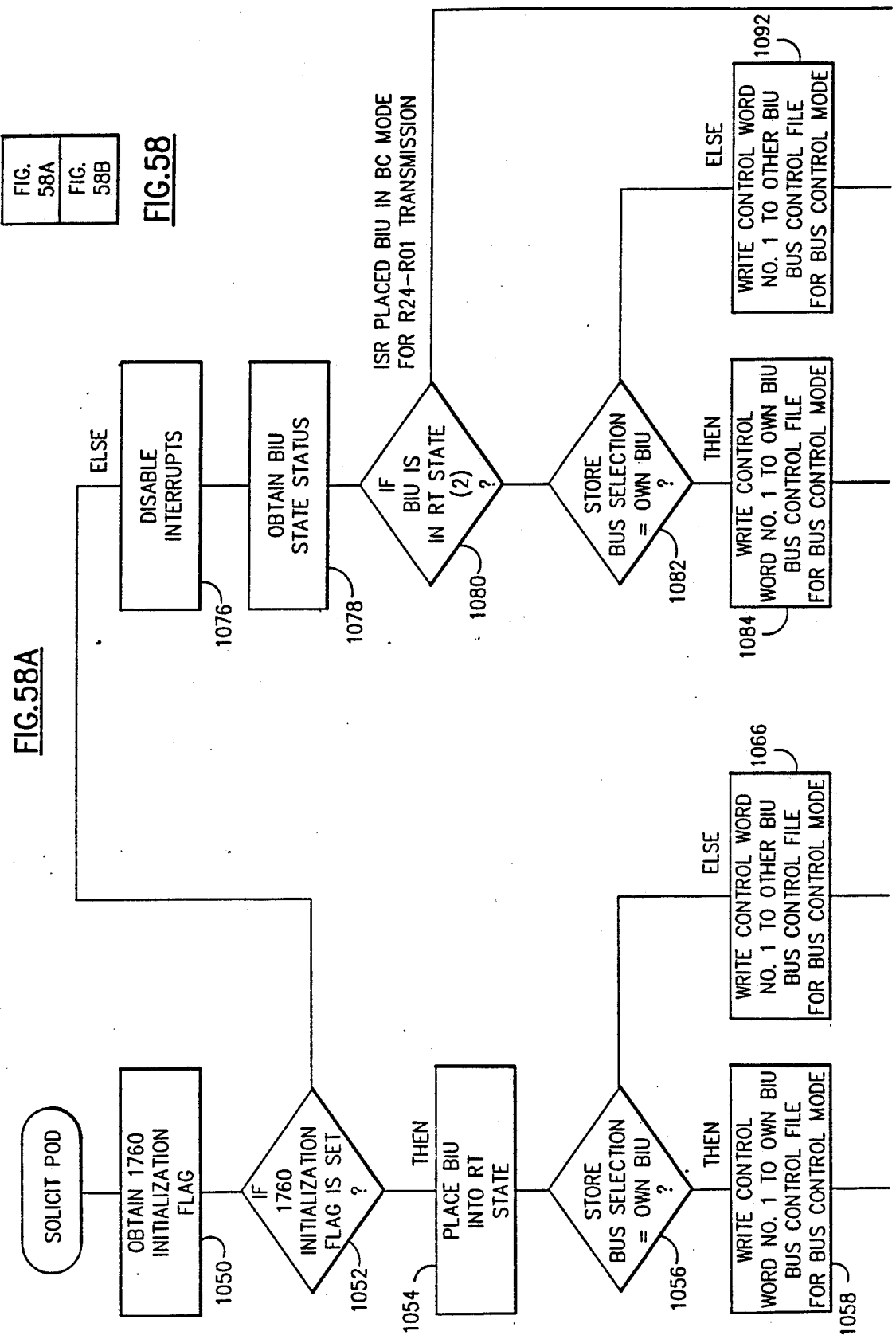

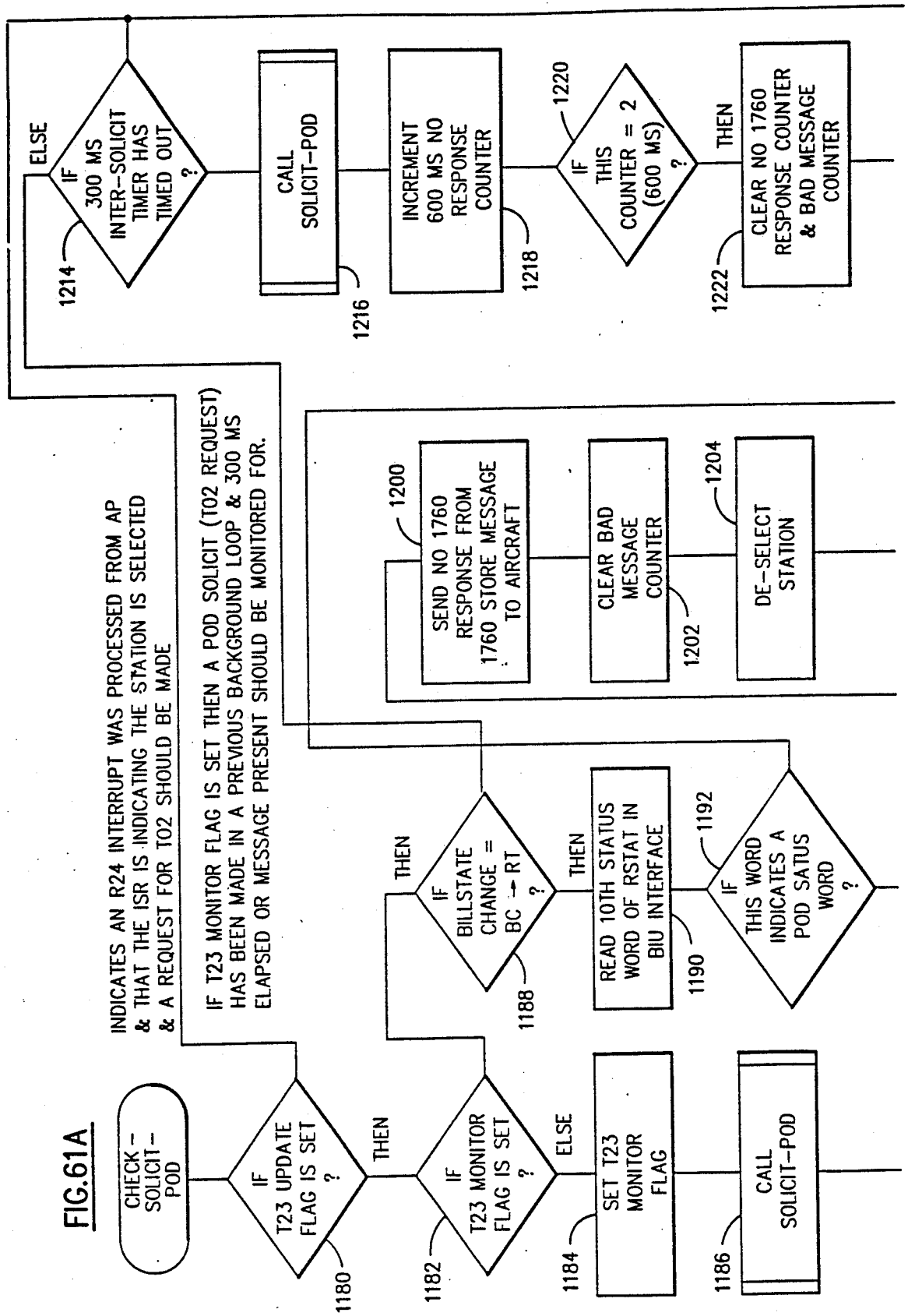

DISTRIBUTED STATION ARMAMENT SYSTEM

BACKGROUND OF THE INVENTION

This invention generally relates to armament systems; and more specifically, to an armament system that may be employed with a multitude of different types of weapons or stores.

An armament system for contemporary, complex weapons often includes a multitude of stations, each of which is adapted to be connected to a respective store to operate the store. For reasons of cost effectiveness and force readiness, it is highly desirable to design an armament system for these modern complex weapons so that each station of the armament system may be used with a multitude of different types of stores. An aircraft having such an armament system might be armed in a variety of different ways at different times. For example, the aircraft may be armed with a multitude of air-to-air missiles on one occasion, with a multitude of air-to-surface missiles on another occasion, and with an approximately equal mix of air-to-air and air-to-surface missiles on still another occasion.

The task of designing an armament system that has this flexibility is difficult because of the complexity of and differences between the weapons themselves. To elaborate, many of these modern weapons include a microprocessor and software programs to help operate the weapons, and different types of weapons may have quite different software programs that require different input data and that generate different output data. Moreover, different types of weapons operate in different ways and require different specific signals to actuate various weapon components in the proper manner and sequence. Any armament station that is used with a multitude of such weapon types must be able to generate all of the proper input data and signals for each weapon type, and to process properly all the output signals and data transmitted from each weapon type.

SUMMARY OF THE INVENTION

An object of this invention to provide an armament system with a multitude of stations, each of which may be employed to control a multitude of different types of stores.

Another object of the present invention is to provide an armament system, especially well suited for use on an aircraft, including a multitude of stations, each of which can accomodate a multitude of different types of stores.

A further object of this invention is to hold a multitude of store specific application programs in a central storage area of an armament system, and to transmit specific application programs selectively to the stations of the armament system to enable each armament station to control a selected store.

These and other objects are attained with an armament system for use with a plurality of different types of stores, and comprising a central unit, and a plurality of distributed stations. The central control unit holds a plurality of store specific application programs, and each of the plurality of store types is associated with one of the store specific application programs. Moreover, each of the store specific application programs is adapted to control the transmission of data between a store of an associated type and one of the distributed stations. The central unit is adapted to control the operation of the armament system and the transmission of data between the central unit and the distributed stations, and to transmit any of the store specific application programs to any of the distributed stations of the armament system.

BRIEF DESCRIPTION OF THE DRAWINGS

FIG. 11 lists various mode code commands that may be used in the operation of the armament system.

FIG. 12 illustrates a flag word which may be kept in the bus interface units of the armament system.

FIG. 13 identifies various specific functions that are performed by the software program for the bus interface units.

FIG. 14 identifies various items that are held in one of the memory sections of one of the bus interface units of a distributed station.

FIG. 15 generally indicates the components of the software program for the store interface units of the distributed stations.

FIG. 18 identifies the components of a microcontroller BIT word.

FIG. 19 identifies the components of a system data bus BIT word.

FIG. 20 identifies the components of an input/output BIT word.

FIG. 21 summarizes the memory locations in which each of the BIT words generated within a distributed station are held.

FIG. 23 summarizes each processing centers health status of the other processing centers within a distributed station, which are transmitted over lines L0–L11 of FIG. 22.

FIG. 24 is a chart identifying the response of each processing centers determined health status of a distributed station to various sets of values in lines L0–L11.

FIG. 28 identifies various signals transmitted between a distributed station and a Walleye Pod that is connected to the station.

FIG. 30 lists the messages that may be transmitted to or from a distributed station.

FIG. 31 summarizes the contents of an R01 message.

FIG. 32 summarizes the contents of a R24 message.

FIG. 33 summarizes the contents of a T02 message.

FIG. 34 summarizes the contents of a T23 message.

FIG. 34A summarizes the contents of a T07 message.

FIG. 35 identifies various flags employed with the Walleye weapon and Walleye Pod application software program.

FIG. 44 outlines the operation of the Walleye weapon fuse select function.

FIG. 45 outlines the operation of the Walleye weapon station select function.

FIG. 46 is a flow chart showing the operation of the Walleye weapon designate target function.

FIG. 54 is a flow chart generally outlining the operation of the Walleye Pod partial disconnect function.

FIG. 55 is a flow chart showing the Walleye Pod select function.

DETAILED DESCRIPTION OF THE PREFERRED EMBODIMENTS

Figure 1:
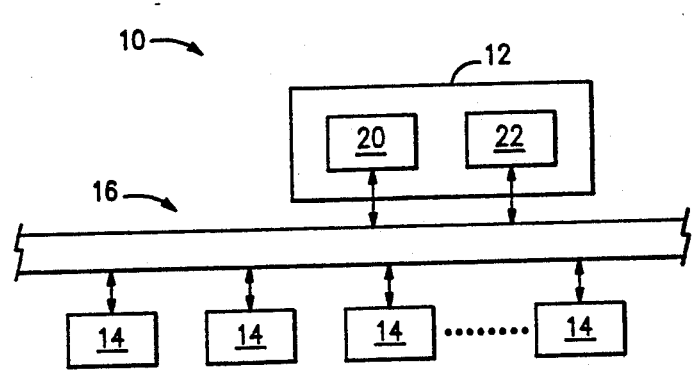
FIG. 1 illustrates a data processing system which may be used in the practice of the present invention.

FIG. 1 schematically illustrates data management system 10 generally comprising a central unit 12, a multitude of distributed stations or terminals 14, and data transmission means 16; and, preferably, central unit 12 includes control station 20 and data storage center 22. The central control station provides various control and monitor functions for the data management system, and this station is normally also used to connect system 10 to various peripheral devices that may be used to control selected aspects of the data management system and to provide further monitoring and data storage services. Data storage center 22 is provided to store various programs, discussed further below. Data transmission means 16 is used to transmit data between the central unit 12 and the distributed stations 14, and between those distributed stations themselves. Any suitable means 16 may be employed to transmit data between central unit 12 and the distributed stations 14. For example, this data may be transmitted by cables or wires that are physically connected to central unit 12 and to the distributed stations 14, or alternatively, this data may be transmitted by electromagnetic wave signals without requiring any direct physical connection between central unit 12 and the distributed stations 14. Preferably, as discussed below, transmission means 16 comprises a data bus; and more preferably, it comprises a pair of parallel, or redundant, data buses, each of which is connected to the central unit 12 and to each of the distributed stations 14.

System 10 may take many specific forms and be used in many specific applications. For example, the distributed stations 14 may be data input or output terminals controlled, at least in part, by central unit 12. As another example, system 10 may be used on a space craft, with each of the distributed stations connected to a mechanical device or mechanical equipment used to perform a specific experiment or task. As still another example, system 10 may be used in a factory, with each of the distributed stations connected to a work station, a robot or other device that may be controlled by central unit 12.

Figure 2:
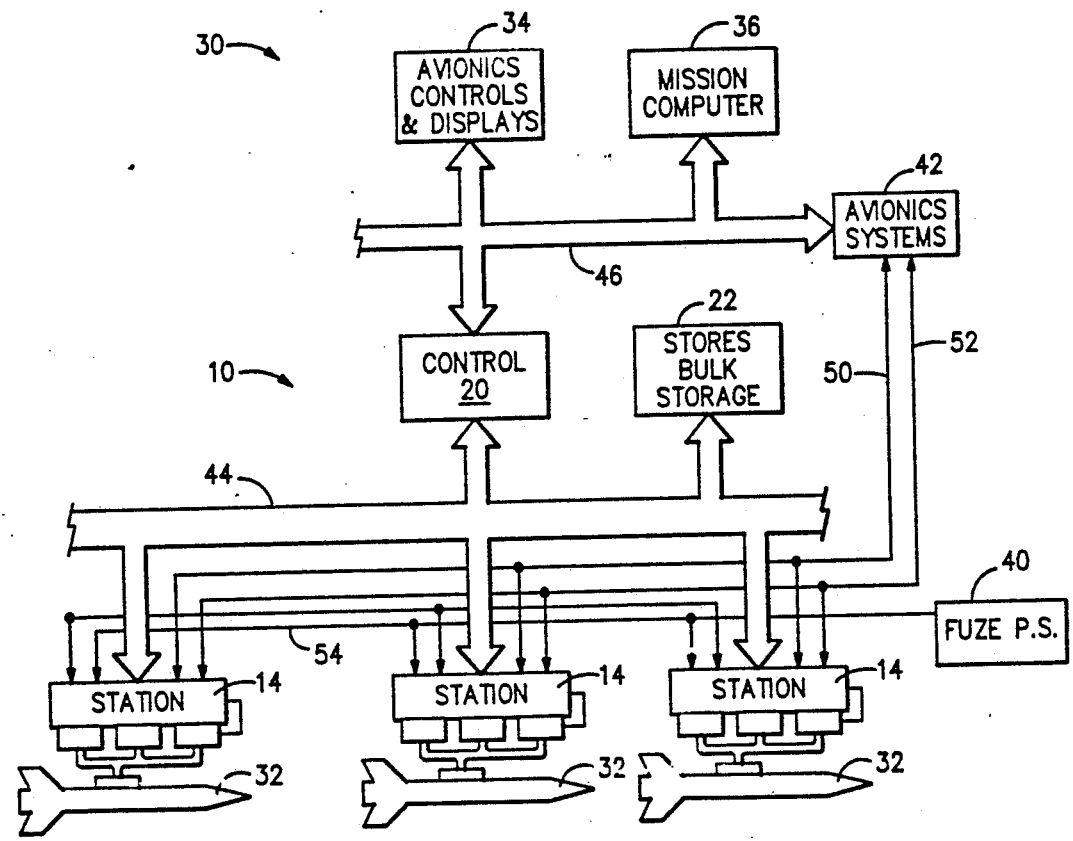
FIG. 2 illustrates an armament system incorporating the data processing system of FIG. 1.

Preferably, as illustrated schematically in FIG. 2, data management system 10 is employed as part of an armament management system 30, which is used to manage and operate a multitude of stores or weapons 32. In addition to data management system 10, armament system 30 preferably includes control and display unit 34, a general purpose computer, referred to as a mission computer 36, and a fuze power source 40. Armament system 30 is designed for use with a store carrying structure or member, and specifically for use with an aircraft, and the armament system is preferably connected to various other systems of that store carrying member, as represented by box 42 in FIG. 2.

Armament system 30 may be used with other types of weapon carriers, which may be mobile or stationary, such as ships, satellites or stationary land based weapon systems. It should be noted that FIG. 2 is a simplified schematic drawing of armament management system 30, with several conventional components omitted for the sake of clarity. In particular, typically, the stations 14 of the armament system are not used to support the weight of the stores 32, but are connected to the stores to transmit data and other signals between the stores and the armament management system; and suitable weight supporting structures, not shown, connect the stores to the store carrying member to carry the weight of the stores.

Armament system 30 may be used with a large number of different types of stores, which may be very different from each other. For example, the stores may be weapons, such as weapons referred to as AM-RAAM, WALLEYE II, HARM, or SIDEWINDER; the stores may be weapon control or monitoring equipment, observation equipment or other spying devices, the stores may be communication equipment, or the stores may be other military equipment such as electronic jamming devices. These various stores have substantially different capabilities and support requirements, and operate in very different manners. Nevertheless, as will be understood from the following discussion, armament system 30, because of its own unique capabilities, may be effectively employed with such a wide variety of stores.

System 30 includes data buses, power buses and other signal buses interconnecting the various elements of the armament management system. In particular, data bus 44 is connected to control station 20, central data storage member 22 and to each of the stations 14 to transmit data between and among these elements of system 30; and a second data bus, referred to as a missions avionics bus 46, is connected to control station 20, control and display unit 34, mission computer 36 and to the avionics systems 42 to transmit data between and among these elements. System 30 also includes a high band width bus 50 and a low band width bus 52 that connect each of the stations 14 directly to the avionics system 42, and a fuze bus 54 that connects each of the stations 14 to fuze power source 40. Any suitable data buses may be used in and with system 30, although preferably data bus 44 comprises two parallel, redundant buses (referenced in FIGS. 3, 4 and 5 as 44a and 44b, respectively) each of which is connected to each station 14, to control station 20 and to central storage area 22. Moreover, preferably data buses 44a and 44b satisfy the requirement set forth in military standard MIL-STD 1553, and thus are of the type referred to in the art as 1553 buses.

Armament management system 30 is designed to control a multitude of different types of stores; and each station 14 of system 30 may be used with at least a plurality of these types of stores. In the operation of system 30, each station is provided with software programs (such as programs describe below in detail) to control the store connected to that station. Specifically, each station 14 is provided with two programs: a first program—referred to as a store generic program—comprises software that is generic to all of the stations; and a second program—referred to as a store unique or store specific program—comprises software that is required by the specific store connected to the station. The store generic program is permanently stored in each station 14; and all of the store unique programs needed by system 30 may be initially stored in data center 22, and store unique programs may be subsequently transmitted to and stored in each of the individual stations 14, as required. Each of the individual stations 14 may contain more than one store specific program at any given time, with only one store specific program used at any particular time to control a store connected to the station 14.

Various store specific software programs are known in the art to control specific types of stores and to control the transmission of data between those stores and stations of an armament system. Many of these programs, with modifications within the ability of those of ordinary skill in the art and based on the discussion below, may be used in armament system 30. Also, any suitable procedure may be used to control the operation of system 30 and the transmission of data between central unit 12 and distributed stations 14, and in particular, to transmit any of the store specific application programs in central unit 12 to any of the distributed stations 14. For instance, an operator, using conventional input means, may instruct data center 22 to send a particular program to a particular distributed station, or control unit 20 may be provided with means to transmit a particular store specific software program from data center 22 to a particular distributed station in response to a request from that distributed station for that software program.

As discussed below in detail, generally the sequencing and timing of commands to the stores 32 are under the control of the stations 14, although for selected functions, a higher authority such as an operator, may be required to commit a store to those functions. Control and display unit 34 is provided to transmit data to and receive data and commands from the system operator; and in particular, the control unit provides the operator with control over and information about selected functions normally controlled by the crew of the aircraft.

Figure 3:
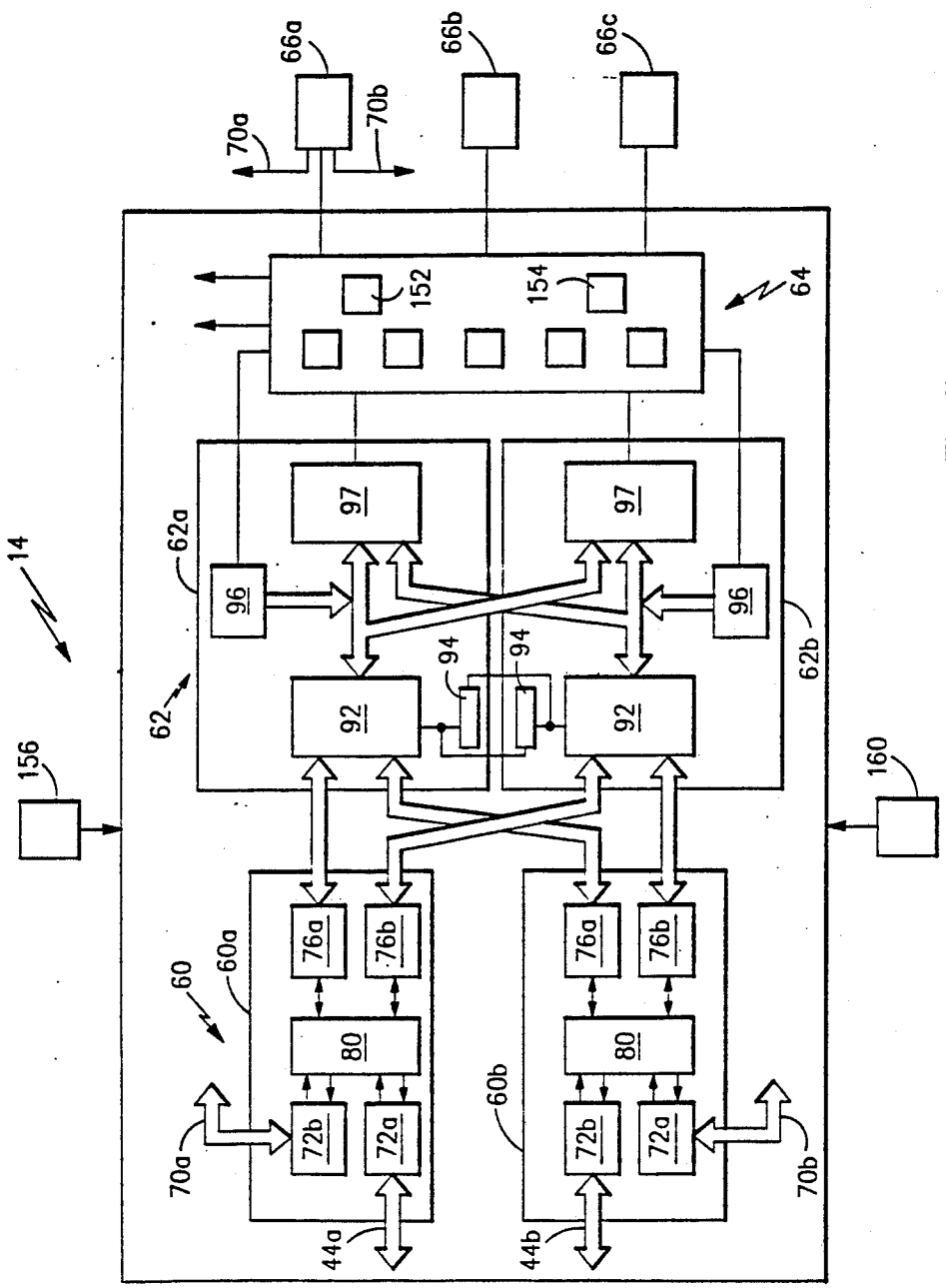
FIG. 3 schematically shows one of the distributed stations of the armament system of FIG. 2.
Figure 4:
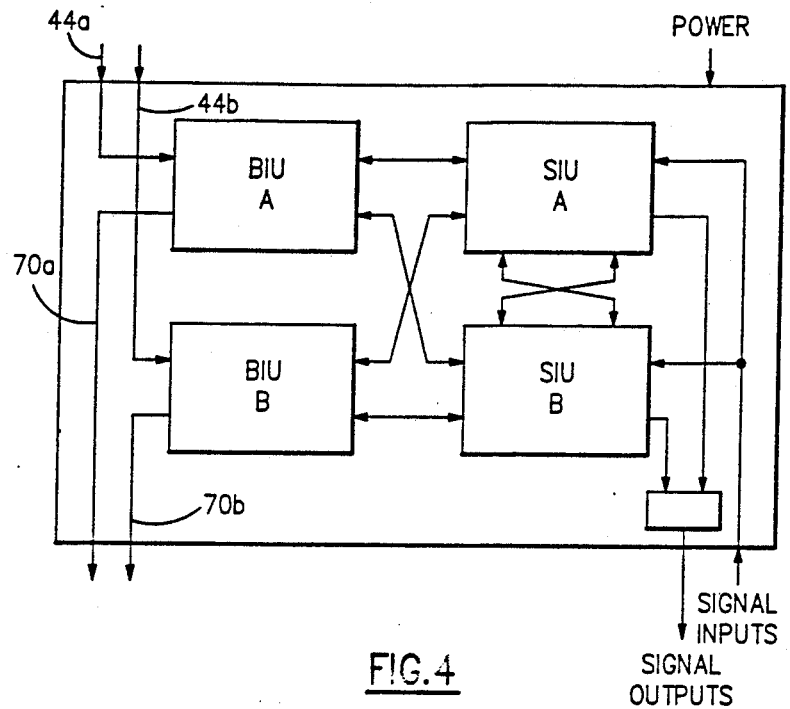
FIG. 4 schematically illustrates various paths over which data may be transmitted between components of the distributed station shown in FIG. 3.

The hardware of control station 20 and the distributed stations 14 are virtually identical and thus only one station 14, shown in FIG. 3, will be described herein in detail. Each station 14 is organized into three major sections a first section 60 comprising a pair of bus interface units 60a and 60b; a second section 62 comprising a pair of store interface units 62a and 62b; and a third section 64 comprising a plurality of interface or input/output circuits that are used to transfer data and signals between the station and a store connected to it. FIG. 3 also schematically illustrates a group of connectors 66a, b and c, discussed below, that are used to connect the station 14 to a store and to transmit signals and data between that store and the input-output circuits of the station.

To simplify this discussion, bus interface unit 60a is often referred to herein and in the drawings as the "A BIU," and bus interface unit 60b is often referred to herein and in the drawings as the "B BIU." Similarly, store interface unit 62a is often referred to herein as the "A SIU," while the store interface unit 62b is often referred to herein and in the drawings as the "B SIU." To further simplify reference to the interface units, on the one hand, the A BIU and the A SIU are often referred to as being associated with each other, and likewise, the B BIU and the B SIU are often referred to as being associated with each other; and on the other hand, the A BIU and the B SIU are often referred to as being not associated or unassociated with each other, and the B BIU and the A SIU are often referred to as being not associated or unassociated with each other.

Station 14 is preferably designed for use with a group of weapons referred to as 1760 or 1760 standard stores, as well as other weapons, referred to as non-1760 standard stores. To use the station with the 1760 stores, interface section 64 is provided with primary and auxiliary connectors 66a and b of the type referred to in the art as 1760 primary and auxiliary connectors respectively. In order to use the station with non 1760 standard stores, interface section 64 is provided with a third connector 66c, and additional input-output circuits to generate signals not needed by the 1760 standard stores.

Each station 14 of system 30 is fault tolerant and provides a high degree of safety and reliability even in the event of system faults or errors; and this reliability and safety is obtained by multiple interconnections between the BIUs and the SIUs and the input/output circuits of the station, which provide numerous data paths through the station. More specifically, with reference to FIG. 4, each BIU is connected to a respective one of the system data buses 44a and b so that the station can receive data from and transmit data to either of those system data buses. Each SIU is connected to each of the BIUs, an arrangement referred to as cross strapping, so that each SIU can transmit data to and receive data from each of those BIUs, and each SIU is connected to the other SIU (an arrangement also referred to as cross strapping) so that the SIUs can transmit data between themselves. Also, the output signals of either SIU may be conducted to interface section 64, and this interface section is further connected to each SIU to conduct feedback and other signals from the input/output circuits of section 64 back to the SIUs. Moreover, BIUs 60a and b are directly connected to store connector 66a via store buses 70a and b, respectively, providing the station 14 with the capability, referred to as "passthrough," to transmit data directly between the BIUs and that store connector 66a, and to thereby bypass the SIUs of the station.

With the above-described connections, data can be transmitted, for example, from data bus 44a, to the A BIU, then to the A SIU; and the A SIU can process this data and, in response, transmit a command to interface section 64. However, if for some reason, the A SIU is diagnosed as faulty, data from data bus 44a can be transmitted to the A BIU and then to the B SIU; and, in response, the B SIU can transmit the appropriate command to the interface section 64. Built in test functions, discussed below, are employed to determine the preferred data flow path through the station and the preferred locations in which to store data.

Figure 5:
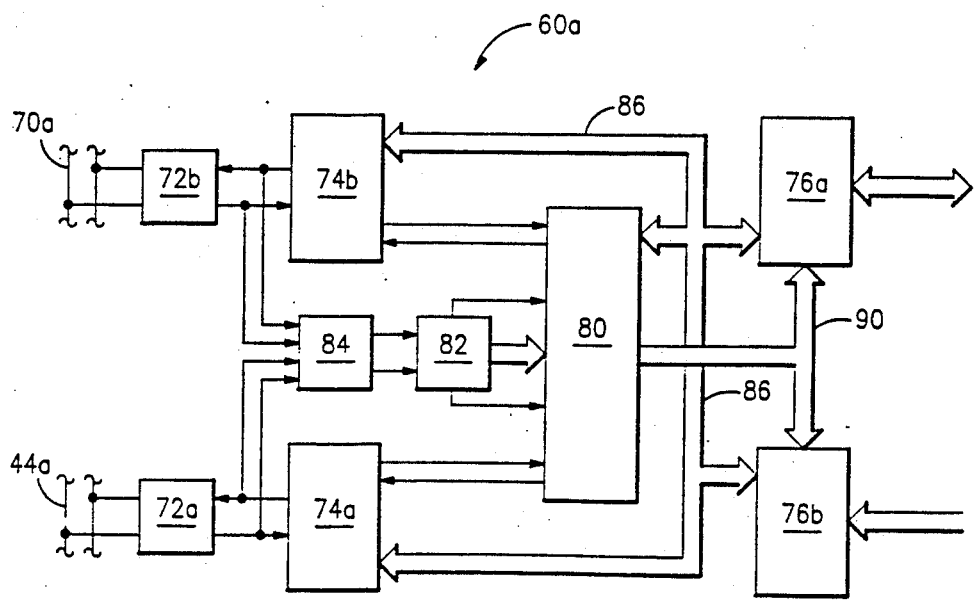
FIG. 5 shows one of the bus interface units of the station of FIG. 3.

The BIUs of the station 14 are substantially identical, and hence only one 60a, shown in FIG. 5, will be described herein in detail. Generally, the BIU includes two data bus transceiver and transformer units 72a and b, two data bus encode/decode units 74a and b, two dual port memories 76a and b, a microcontroller or processor 80, a monitor memory 82 and a dual bus monitor 84. Transceiver and transformer unit 72a is connected to data bus 44a and is provided to hold temporarily data received from the data bus and data about to be transmitted to that data bus; and, similarly, transceiver and transformer unit 72b is connected to store bus 70a to hold temporarily data received from the data bus and data about to be transmitted to that bus.

Encode/decode unit 74a receives data from the unit 72a and checks that data for various errors; and if none of these errors is detected, unit 74a transmits data to both memory units 76a and b. Encode/decode unit 74a also receives data from memory units 76a and b and prepares that data for subsequent transmission to data bus 44a. Likewise, encode/decode unit 74b receives data from unit 72b and checks that data for various errors; and if none of these errors is detected, unit 74b transmits the data to both memories 76a and b. Unit 74b also receives data from memories 76a and b and prepares this data for subsequent transmission to store bus 70a. As discussed in greater detail below, conventional pointer tables are stored in memory units 76a and b to direct data to, and to retrieve data from, the proper locations in these memory units. Units 72a and 74a are, together, often referred to as a B-chip; and likewise, units 72b and 74b, together, are often referred to as a B-chip.

The operation of the BIU is implemented and controlled via microcontroller 80, which may, for example, be an intel 8096 microcontroller that provides a read only memory containing up to 8K bits of software data. Preferably, each memory unit 76a and b is a dual port memory so that data may be transmitted to and from the memory unit by means of either of two ports. Units 74a and b, 76a and b and 80 are all connected together by a common bus 86. Preferably, a second data bus 90 connects microcontroller 80 to both memory units, and this second bus may be used to transmit to the memory units addresses for data received by the memory units.

Message buffer 82 is provided in the BIU to hold temporarily data to be transmitted to controller 80 from either data bus 44a or store bus 70a, and data to be transmitted to either of these buses from the microcontroller. For example, preferably buffer 82 is able to hold up to 32 messages of 32 data words each. The bus monitor circuit 84 is available to record the most recent data transmitted on the buses 44a and 70a, and, for instance, this monitor circuit may record the last 1K data words transmitted to the BIU over either of these data buses. This data is available to microcontroller 80, which periodically test that data to determine if the data received from the data bus lines are error free. Preferably, monitor circuit 84 is also used to generate various signals. For example, for timing purposes, the monitor circuit may generate a timing pulse at regular periods, such as every 64 microseconds, and the monitor circuit may generate a data signal whenever both system data buses are active at the same time. The monitor circuit may also generate a signal indicating that data has been received from an avionics system, and generate a signal identifying a received data message as either a command message or a data message.

Preferably, microcontroller 80 is provided with a terminal, not shown, such as a terminal referred to in the art as an RS-232 terminal, to connect the microcontroller directly to an external monitor or other device. This external device may be used, for example, to monitor data or any software programs stored in the microcontroller, for instance, possibly to debug any of those software programs, as well as to add data to or delete data from the microcontroller.

As described above, the station 14 includes two BIUs; and each BIU includes two transceiver and transformer units. One transceiver and transformer unit of each BIU is connected to a respective one of the system data buses 44a or b, and the other transceiver and transformer unit of each BIU is connected to store connector 66a via store bus 70a or b. In particular, as illustrated in FIG. 3, transceiver and transformer unit 72a of the BIU 60a is connected to data bus 44a, and transceiver and transformer unit 72b of the BIU 60b is connected to data bus 44b. Transceiver and transformer unit 72b of the BIU 60a and unit 72a of the BIU 60b are connected to connector 66a via store buses 70a and b. With this arrangement, data may be transmitted between either BIU and the store attached to the station either via one of the SIUs of the station, or directly via one of the store bus lines, a procedure that minimizes time delay in the transfer of data between the store and, for example, avionics bus 46. With this latter procedure, referred to as pass-through, there is no data recognition in the middle between the BIUs and the store.

Figure 6:
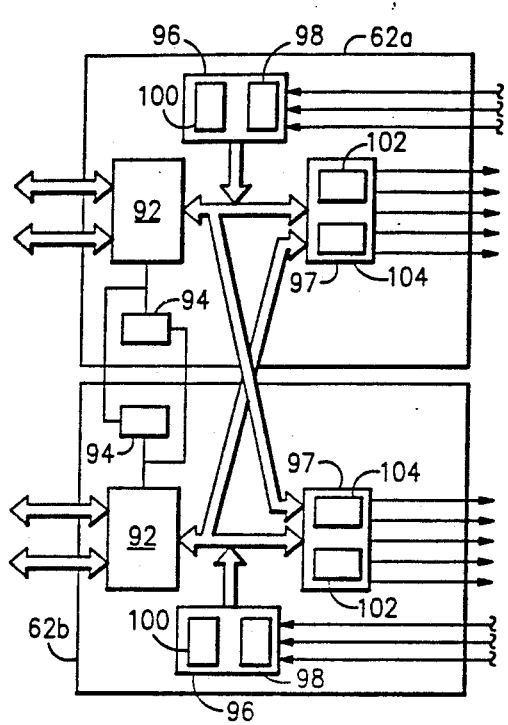
FIG. 6 shows the store interface units of the station of FIG. 3.

The two SIUs of the station are substantially identical, and these are shown in detail in FIG. 6. Generally, each SIU includes a controller 92, a memory unit 94, converter means 96 and an input-output latch driver 97. In turn, converter means 96 includes an analog-to-digital converter 98 and a digital-to-analog converter 100, and the latch driver includes a constant current source 102 and a current pulse source 104, of the type referred to as a TTL driver.

Controller 92, which, for example, may be an Intel 8751 microcontroller, includes a timer and operates the SIU control software and the store application software, both of which are discussed below. Memory unit 94 is provided to hold data, and analog-to-digital converter 98 is provided to convert analog input signals to digital data values suitable for processing by controller 92 and suitable for storage in memory unit 94.

Figure 7:
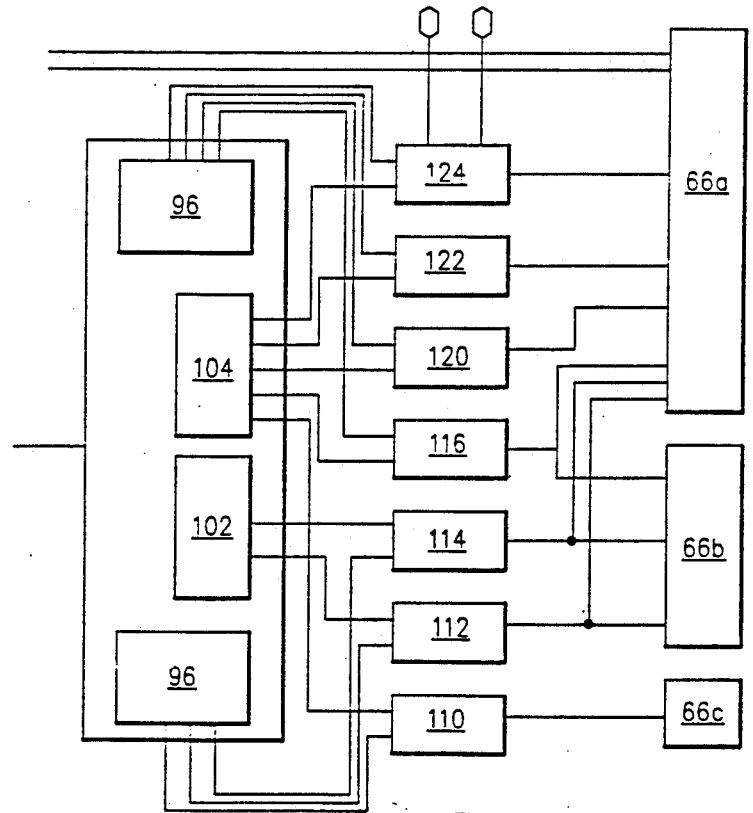
FIG. 7 shows the input/output interface section of one of the store interface units of the distributed station of FIG. 3.

As represented in FIG. 7, the interface section 64 of the station includes a discrete signal generator 110, a 28 V DC power switching circuit 112, a 115 V AC power switching circuit 114, an interlock circuit 116, a release-consent circuit 120, an address line circuit 122, and a high and low band width switching circuit 124. Discrete signal generator 110 is provided to supply a discrete signal, such as a 5 volt current pulse, to the store in response to receiving an activating pulse from an SIU; and power switching circuits 112 and 114 are provided to supply 28 V DC power and 115 V AC power, respectively, to the store in response to receiving appropriate actuation signals from an SIU. Interlock circuit 116 is provided to apply a positive voltage level to selected pins of connector plugs 66a and 66b, which, in a manner discussed below, is used to indicate whether a store is connected to station 14. Release consent circuit 120 is provided to supply an intent-to-launch signal to the store, also discussed below, and the address line circuit 122 includes a multitude of lines that are connected to the store to provide the store with a unique address. The high and low band width switching circuit 124 is provided to receive signals transmitted to the interface section 64 along either the high band width signal line 50 or the low band width signal line 52 and to transmit those signals to the store, and to receive selected signals from the store and to direct those signals onto either the high bandwidth line or the low bandwidth line, as appropriate. Circuits able to perform the above-discussed functions are well known in the art, and any suitable input-output circuits may be used in interface section 64.

Preferably, each of the power switching circuits 112 and 114 is connected to the store via a pair of parallel electrical relays (not shown), one of which is a solid state relay, and the other of which is an electromagnetic relay. When a switching circuit is activated to conduct power to the store, the solid state relay is used initially to conduct the power to the store, thus minimizing the emission of electromagnetic radiation as power to the store is established. Once power to the store is established, the electromagnetic relay, because of its lower resistance and, thus, lower power consumption, is used thereafter to conduct power to the store. Moreover, both of the power switching circuits include master relays (also not shown) electrically located in series with the above-discussed solid state relay and electromagnetic relay pair of the switching circuit, and these master relays are automatically opened to terminate power to the store in response to the detection of selected conditions. For example, the SIUs of the station 14 may be employed to detect these selected conditions and to open one or both of the above-mentioned master relays when one of these selected conditions is detected.

The SIUs selectively activate and deactivate the power switching circuits by means of the constant current source 102. More specifically, to actuate one, or both, of the power switching circuits, an SIU generates a signal that is conducted to the current source 102 and which causes that current source to generate a current, which is then conducted to one, or both, of the switching circuits 112 and 114 to actuate one, or both, of these circuits to supply the desired power to the store.

The address line circuit 122 preferably serves dual purposes. When station 14 is used with a 1760 standard store, this circuit is used to establish an address for the store; and when the station is used with a non 1760 standard store, the address circuit is used to deliver 28 volt 1 amp discrete current signals to the store.

Figure 8:
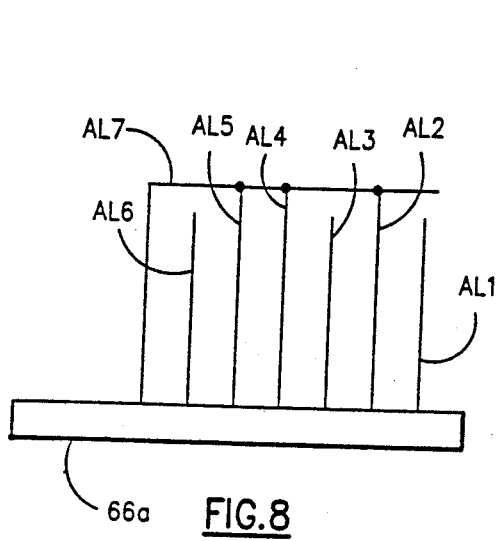
FIG. 8 schematically illustrates how an address may be established for the distributed station of FIG. 3.

FIG. 8 shows the address line circuit in greater detail; and this circuit includes seven lines AL1–AL7. Five of these lines, AL1–AL5, are used to identify an address value, line AL6 is used to identify the parity of that address, and line AL7 is connected to ground or zero electric voltage. Each of lines AL1–AL5 represent a binary place value; and this place value is set to zero or to one, respectively, by connecting or not connecting the line to the ground line AL7. Likewise, the parity line AL6 is set to zero or one, respectively, by connecting or not connecting the line to ground. For example, the binary address established by the connections shown in FIG. 8 is 00101. Alternatively, by connecting lines AL5, AL3 and AL1 to ground, but keeping lines AL4 and AL2 at a high voltage level, a binary address of 01010 may be established for the store attached to the station. Electro-mechanical or solid state relays (not shown) may be used to connect or disconnect lines AL1–AL6 to and from the ground line AL7, allowing the address value of the store to be readily changed.

Alternatively, address circuit 122 may be designed so that a human operator is needed to connect and disconnect the address lines AL1-AL6 from the ground line, providing a semi-permanent address for the store attached to the station.

The high bandwidth, low bandwidth and audio switching circuits 124 use mechanical and solid state relays (not shown) in a conventional manner to conduct the high band width video, low band width video and audio signals between the store connected to station 14, and other stations of system 30, or between that store and other aircraft systems. Typically, current pulses from the TTL driver 104 are used to drive and to control these switching circuits 124.

Additional input-output circuits may be used with station 14. For example, preferably a gating circuit (not shown) is used to conduct the fuze voltage to the store. Typically, fuze power source 40 is capable of providing an electric current at a multitude of voltage levels, and a fuze gating circuit, including a multitude of relays, is provided to selectively transmit the desired fuze voltage to the store when appropriate.

Figure 9:
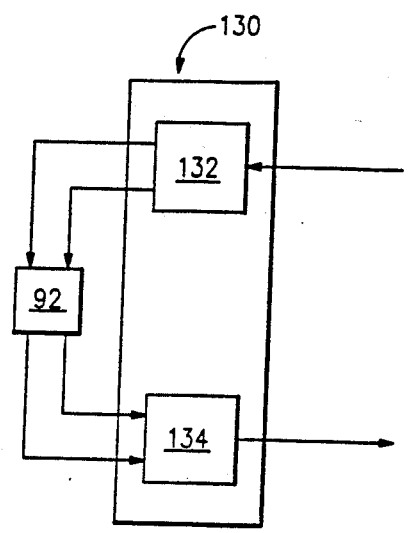
FIG. 9 shows an input/output circuit which may also be used in the input/output interface section shown in FIG. 7.

The interface section 64 may also be provided with an input-output circuit of the types schematically illustrated at 130 in FIG. 9, to decode signals from and to encode signals to the AIM-9 sidewinder missile. To elaborate, the AIM-9 sidewinder missile generates a signal identifying its position in polar coordinates, and any direction change commands sent to the missile must also be in a signal identifying a direction change in polar coordinates. Input-output circuit 130 includes a decoder 132 to transform the signal from the sidewinder missile into two signals expressing the position of the missile in standard x-y coordinates, and an encoder 134 to transform any change of direction command expressed in x-y coordinates, into a signal expressing this direction change in polar coordinates. For example, the two signals generated by decoder 132 may be conducted to one of the SIU processors 92, which may determine if the direction of the missile should be changed and, if appropriate, to generate signals identifying a new direction for the missile in x-y coordinates. These latter signals may then be transmitted to encoder 134, which transforms the signals into one expressing the new direction in polar coordinates, and then transmits that signal to the missile.

The interface section 64 is preferably further provided with feedback circuits, schematically represented by box 152 of FIG. 3, to sense output signals of various input-output circuits, and to transmit feedback signals to the SIUs to identify the values of those output signals. For example, an overcurrent sensing circuit (not shown) may sense the output of each of the 28 V power switching circuits, and transmit a signal to the SIUs whenever the current in the output line from these power switching circuits rises above a preset level. Also, preferably, interface section 64 includes voltage sensing circuits, schematically represented by box 154 in FIG. 3, to sense the voltage levels of various pins of connector 66a, b and c, and to transmit to the SIUs signals indicating these voltage levels. Any suitable current or voltage sensors or detectors may be used for the above-discussed purposes.

FIG. 3 shows how the various components of the station 14 are connected together. One memory unit of each BIU is connected to the controller of one SIU, and the other memory unit of each BIU is connected to the controller of the other SIU, and the controller of each SIU is connected to the memory unit of the other SIU. More specifically, memory 76a of the A BIU and memory 76a of the B BIU are both connected to controller 92 of the A SIU, and memory 76b of the A BIU and memory 76b of the B BIU are both connected to controller 92 of the B SIU. Controller 92 of the A SIU is connected to memory 94 of the B SIU, and controller 92 of the B SIU is connected to memory 94 of the A SIU.

In addition, the latch driver 97 of either SIU may be used to transmit signals to the input/output circuits of interface section 64, and the interface section is connected to the analog-to-digital converter of both SIUs to conduct feedback signals to those converters. In the operation of the SIU, the controller 92 transmits a command signal to the latch driver 97 of the SIU, the latch driver transmits a command signal to one of the input-output circuits of the SIU, and this input-output circuit transmits a signal to the store. This signal may also be transmitted back to the analog-to-digital converter of the SIU, which converts this signal to a digital value and transmits that value back to controller 92, and this value may then be compared to a test value, generated by or stored in the controller, to determine if the signal generated by the input-output circuit was the proper signal.

With the above-described connections, each SIU controller 92 has access to data in either of the BIUs, as well as to data in the other SIU. Also, the controller 80 of each BIU has access to both memory units 76a and b of the BIU and, via these memory units, to the controllers 92 of both SIUs. Moreover, preferably, the processor 80 of each BIU is also connected to the processor 92 of each SIU by a wire or line to transmit interrupt signals, discussed below, directly between these processors. For the sake of clarity, these hard wire connections between the processors of station 14 also are not shown.

As assembled in station 14, the A SIU and the A BIU form a first processing pair, and the B SIU and the B BIU form a second processing pair. Preferably, an independent power supply 156, 160 is provided for each of these processing pairs, allowing station 14 to operate effectively even if one of the power supplies becomes inoperative. Moreover, preferably both of these power supplies are connected to the latch drivers of both SIUs so that each latch driver can receive power in the alternative from either of these power supplies. With this arrangement, power will be supplied to both of the latch drivers of the station even if one of the power supplies 156, 160 becomes inoperative.

The transmission of data between and among control station 20 and distributed stations 14 of system 30 is preferably controlled by control station 20, which is thus referred to as the bus controller. With modifications within the skill of those ordinary skill in the art, system 30 may be designed so that the bus control functions may be passed among all of the stations of the system. Generally, the bus controller is responsible for transmitting data bus commands, participates in data transfer, receives status responses, and generally monitors the system status.

Data is transmitted to and from the control station and the distributed stations of system 30 via system data bus 44 in the form of "messages," each of which consists of one or more "words." Three types of words are used in this data transmission: status words, command words and data words. For example, the first word in a message may be a command word, the command word may be followed by multitude of data words, and the last word in the message may be a status word. Generally, all control messages originate with the bus controller and are transmitted to a single receiver or to multiple receivers. Data words are used to communicate data between and among the stations, while command words and status words are used to manage data flow through the system.

Generally, each BIU of each station 14 maintains a status word to indicate various conditions of or related to that station; and normally each time a station 14 transmits a message, the status word of the station is included in the message so that the station that receives the message is also advised of the status of the transmitting station. Command words are transmitted from one station to another to command the latter station to take some type of action. There are three types of command words: commands to receive a message, commands to transmit a message, and commands, referred to as mode-code commands, that instruct a station to take a particular action or to change the way in which the station is functioning.

Figure 10:
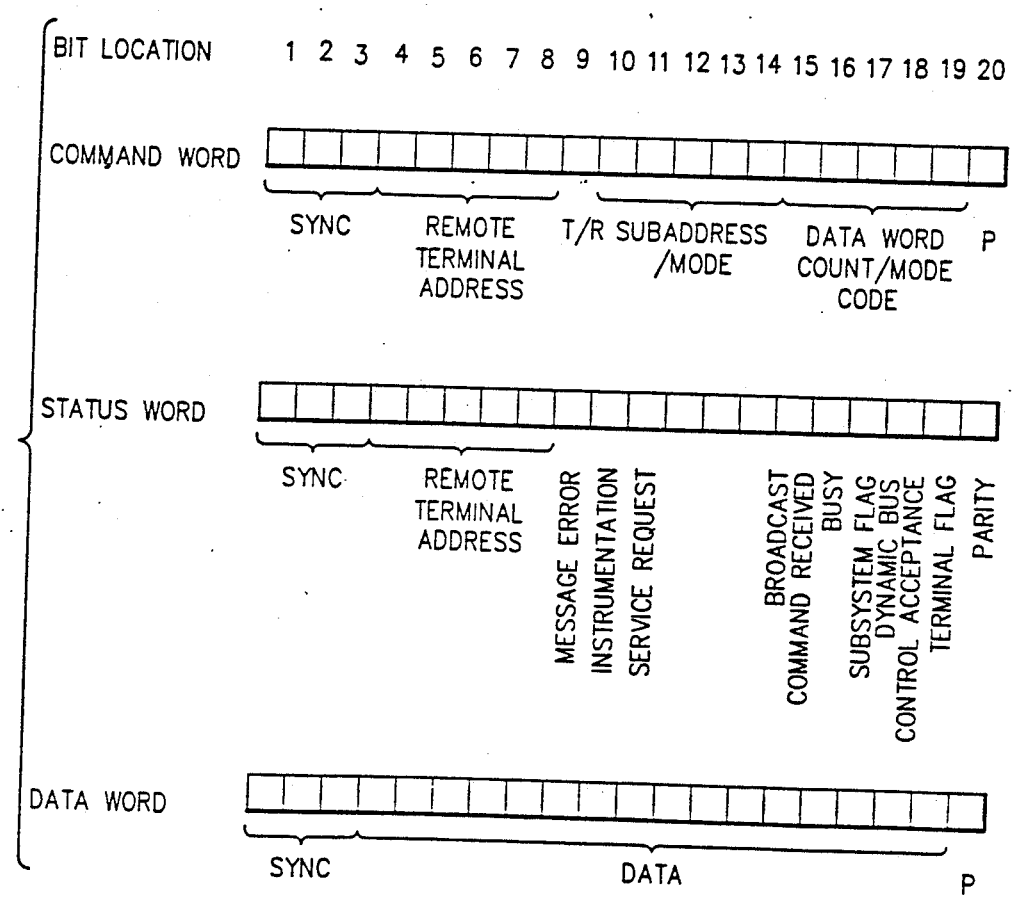
FIG. 10 shows the formats for various words transmitted between the stations of the armament station of FIG. 2.

Any suitable format may be used for the status, command, and data words, although preferably this format is of the type set forth in military standard MIL-STD 1553, and FIG. 10 illustrates this preferred format. Similarly, the messages may be transmitted over the data buses in any suitable procedure, although preferably the procedure also is that set forth in military standard 1553.

With reference to FIG. 10, each command word includes 20 bits. The first three bits, in bit locations 1 through 3, provide a wave form referred to as a synch wave form, which separates the word from any preceding word and synchronizes the receiving terminal with the command word. Bit locations 4 through 8 give the address of the remote terminal for which the command is intended. If the command is not a mode-code command, bit location 9 identifies the command as either a command to receive a message or a command to transmit a message. For example, if the command is not a mode code command, the value of one at bit location 9 may be used to identify the command as a command to transmit, while a value of zero at bit location 9 may be used to identify the command as a command to receive.

Bit locations 10 through 14 are used to indicate either a remote terminal subaddress, or to identify the word as a mode-code command. More specifically, any one of the values zero through 31 may be stored in the field comprising bit locations 10 through 14; and certain of these values may be reserved to identify the word as a mode-code command, with the other, non-reserved values identifying a subaddress in the receiving terminal. For example, the values zero and 31 may be used to identify the word as a mode-code command, while values 1 through 30 may be used to identify a subaddress in the receiving terminal or station. As explained in greater detail below, this subaddress is used to find an area in the BIU memory from which a message is to be taken (if the command is a command to transmit a message), or to which a received message is to be stored (if the command is a command to receive a message).

If the word is a mode-code command, then bit locations 15–19 specify the mode-code; however, if the word is a transmit or receive command, then bit locations 15 through 19 indicate the number of words in the message to be transmitted or received. Preferably, a maximum of 32 data words may be transmitted or received in any one message. Finally, bit location 20 identifies the parity of the word.

Each remote terminal or station is assigned a unique address value and that station accepts all words having the address value of the terminal. Also, preferably one selected address value, referred to as the "broadcast value," is not assigned to any of the terminals, but all stations will accept words having this one address value. Thus, each station accepts words having either its respective address value or the broadcast address value, and preferably these are the only words that the terminal will accept. For instance, in a system having 31 stations, each station may be assigned a respective one address value between zero and 30, with an address value of 31 being used as the broadcast address value.

The mode codes are employed to put the receiving station into certain states and to help select the manner in which data is routed through the terminal or station. Certain mode codes do not require the transfer of any data words, and for these mode code, the t/r bit of the command word is set to a value of one. Other mode codes require that one data word be transferred; and for these mode codes, the t/r bit of the command word indicates the direction in which that data word is transferred—that is, either to or from the station that receives the command. FIG. 11 lists the mode code functions used with system 30 and the values used to identify these codes.

Mode codes zero through 8 are not transmitted with any data words, while mode codes 16 to 21 are transmitted with a data word. As will be understood, some of the mode codes should not be addressed to the broadcast address because it is possible that two or more remote terminals may simultaneously transmit responses onto system data bus 44. For example, the transmit status word function should not be addressed to the broadcast address since this might result in several status words being transmitted on the system data bus at the same time.

The dynamic bus control function is an offer by a bus controller to a remote terminal to transfer control of the data bus 44 to that remote terminal. Whether this offer is accepted or rejected by the receiving terminal depends on the dynamic bus control acceptance bit or flag, discussed below, in the status word of that terminal. If this bit is set to a value of one, the receiving terminal accepts the bus control offer; while if this bit is set to zero, or is clear, the bus control offer is rejected. In either case, the terminal receiving the bus control offer transmits its status word back to the offering terminal, so that this terminal knows whether the offer was accepted or rejected. If the offer was rejected, the offering terminal remains as bus controller and may offer bus control to other remote terminals. Once a bus control offer is accepted, the offering terminal relinquishes bus control, and the accepting terminal starts to operate as the bus controller.

The synchronize function instructs the receiving terminal to reset its internal timer, and after receiving this command, the receiving terminal transmits its current status word to the bus controller that originated the command. The synchronize with data word function instructs the receiving terminal to synchronize according to information contained in an accompanying data word, and this data word may be provided with any suitable synchronization data After receiving this synchronize with data word command, the receiving terminal transmits its current status word back to the terminal from which the command was transmitted. This function may be used to facilitate coordination between the active bus controller and the terminal or terminals to which the command is transmitted.

The transmit status word function instructs the receiving station to send to the bus control station the status word associated with the most recent valid command word received by the former station before this transmit status word command.

The initiate self test mode command causes the remote terminal to initiate a self test within the terminal. Any suitable self tests may be used with stations 14, and several are described below. Typically, after allowing time to complete the self tests, this mode code command is followed by a transmit BIT word command, which orders the receiving station to transmit to the bus controller a word, referred to as a BIT word, that indicates the test results. The transmit BIT word command also causes the remote terminal to transmit its status word to the bus controller. For example, built in tests may be used to detect circuitry failures, power failures, encoder-decoder failures, and protocol errors.

The transmitter shut down function is used to disable a BIU transmitter of a station, and the override transmitter shut down function is used to enable a BIU transmitter. When an SIU of a station receives a transmitter shut down command via one of the BIUs of the station, the SIU disables the transmitter of the other BIU of the station; and when an SIU receives an override transmitter shut down command via one of the BIUs of the station, the SIU enables the transmitter of the other BIU of the station. After receiving either a transmitter shut down command or an override transmitter shut down command, the remote terminal transmits its status word back to the bus controller.

The selected transmitter shut down and the override selected transmitter shut down functions are normally only used in systems having redundant data buses. The former function instructs a remote terminal associated with one data bus to disable a transmitter associated with another data bus, and the latter function instructs a remote terminal associated with one of the data buses to enable a previously disabled transmitter associated with another of the data buses.

The inhibit terminal flag bit function instructs a terminal to set the terminal flag bit, discussed below, in its status word to indicate an unfailed condition regardless of the true condition of the terminal; and the override inhibit terminal flag bit function cancels the inhibit terminal flag bit function, so that the terminal flag bit in the status word of the terminal indicates the actual condition of the terminal. When a remote terminal receives either the inhibit terminal flag bit or the override inhibit terminal flag command, the remote terminal transmits its status word back to the bus controller.

The reset remote terminal command causes a remote terminal to return to an initialized state or condition. After receiving such a command, a terminal first returns its current status word to the bus controller, and then resets to an initialized state.

The transmit vector word command instructs a remote terminal to transmit to the bus controller both the status word of the remote terminal and a service request data word, which is conventionally provided in a 1553 bus interface unit to contain information about specific services being required by the remote terminal.

The transmit last command word function instructs a remote terminal to transmit its status word and a data word having bits 4 through 19 of the most recent command word received by the terminal other than a transmit last command word command.

A status word also includes 20 bits and the first three bit locations provide a synch wave form used to separate the word from any preceding word and to synchronize the receiving terminal with the status word. The next five bit locations give the address of the terminal transmitting the status word. The next three bits are referred to as a message error bit, an instrumentation bit and a service request bit respectively. Bit locations 12-14 are not used, and the next six bits are referred to as a broadcast command received bit, a busy bit, a subsystem flag bit, a dynamic bus control acceptance bit and a terminal flag bit respectively. The last bit location in the status word gives the parity of the word.

The message error bit is used to indicate whether one or more of the data words associated with the most recent command word received from the bus controller had failed a validity test applied by the remote terminal. Several validity tests are standard in 1553 systems, such as those used to test the format of the word and the address of the word, and these are discussed in greater detail below. If all of the data words associated with the most recent command word passed all applied tests, the message error bit is set to a value of one. If any one or more of those words failed any one of the applied tests, however, the message error bit is set to zero.

The instrumentation bit may be used to distinguish the status word from a command word. To do this, bit location 10 of all command words is set to a value of one, while the instrumentation bit of each status word is set to a value of zero. Doing this, of course, reduces the number of sub addresses that may be identified by the command word. The use of the instrumentation bit for this purpose is optional, and if it is not used for this purpose, the instrumentation bit is set to zero.

The service request bit indicates whether the terminal needs service. For example, normally the bit may be set to a value of zero to indicate that no service is needed, and the bit may be set to a value of one when the terminal needs service.

Bit locations 12 through 14 of the status word are not used, and each of these bits is set to a value of zero.

The broadcast command received bit indicates whether the most recently received valid command word was addressed to the broadcast address. Whenever such a command is received, bit location 15 is set to a value of one; and, when a command is received that is not addressed to the broadcast address, this bit location is set to zero.

The busy bit indicates whether the remote terminal is able to transmit data to and receive data from its subsystems in response to a command from the bus controller. For each of stations 14, the subsystem of the station is the store attached to the station. A value of one at the busy bit indicates a busy condition, in which the remote terminal is not able to transmit data to or receive the data from the store in response to a bus controller command to do so, while a value of zero at the busy bit indicates that the remote terminal is able to transmit and receive such data.

The subsystem flag bit, at bit location 19 of the status word, is used to indicate to the bus controller that a fault condition exists in one of the subsystems of a remote terminal. A value of one at this bit location indicates the presence of such a fault, while a value of zero indicates the absence of any such faults.

The dynamic bus control acceptance bit is used to indicate whether a remote terminal has accepted or rejected a dynamic bus control offering. Normally, this bit is set to zero. To accept a bus control offer, a terminal sets this bit to a value of one, and transmits its status word back to the terminal that made the offer. To reject a bus control offer, a terminal transmits its status word, with the dynamic bus control acceptance bit at a value of zero, back to the terminal that made the offer.

The terminal flag bit is used to indicate whether a fault has been detected or sensed in a terminal. If such a fault has been detected or sensed, this bit location is set to a value of one, while a value of zero at this bit location indicates the absence of any such fault.

The parity bit is provided to help detect any errors that may occur as a status word is transmitted or detected. This bit is given a value of one or zero depending on whether the sum of the values of the other bits of the status word is odd or even, respectively.

Any suitable procedures may be used to reset the values at status bit locations 8 through 11 and 15 through 20. For instance, in accordance with standard 1553 practice, these bit locations may be reset to zero upon receipt of selected command words.

A remote terminal transmits a status word whenever it receives a valid command word and the proper number of contiguous valid data words, or when the terminal receives a single valid word associated with a mode code.

After transmitting a command to receive word, the bus controller then transmits a message to the remote terminal; and if this message is properly prepared and formatted, the number of data words in the message is equal to the value in the word count field of that command to receive word. After receiving a valid command to receive, a station then accepts the following number of message words specified in the word count field of the command to receive. If this message is a valid message, the entire message is then transmitted to a buffer area in one of the memory units of the BIUs of the station.

After a station receives a valid command to transmit, one of the BIUs of the station assembles the appropriate message and subsequently transmits that message to system bus 44.

Each BIU, specifically the transceiver and transformer units thereof, includes a number of flags, schematically represented in FIG. 12, that are used to indicate various conditions. A first flag is used to indicate when a valid mode code has been received; and normally this flag has a value of one, and the flag is set to zero when a valid mode code has been received. A second flag is used to indicate when a complete message has been received; and normally this flag has a value of one, and the flag is set to zero when a complete message has been received. A third flag is used to indicate when an invalid message has been received; and normally this flag has a value of one, and the flag is set to zero when a received message is detected as invalid. A fourth flag is used to indicate when a valid command has been received, and normally this flag is set to one, and the flag is set to zero when a valid command has been received by the transceiver and transformer.

In the operations of the BIUs, at any given time, data messages are accepted by only one of the transceiver and transformer units of the BIU, but this one unit transmits messages to both memory units of the BIU so that both of these memories hold the same data. Also, data messages that are to be transmitted to a data bus from a BIU are transmitted from one of the memory units of the BIU to one of the transceiver and transformer units thereof, and thence to the data bus connected to that transceiver and transformer unit. The specific memory unit from which the data message is taken and the specific transceiver and transformer unit to which that message is transmitted, are determined by the built in test procedures, discussed below.

BIU Operating Program

All of the BIUs of system 30 are provided with identical software programs, which are located in the micro controllers of the BIUs; and for example, the software program in each BIU may have up to 8k bytes of data. As listed in FIG. 13, the BIU software provides four general groups of functions, referred to as executive, remote terminal, bus control and SIU interface. The Executive group of functions are provided to control various internal operations of the BIU itself; and this group includes four functions referred to as Initialization 162, Built in test 164, B-chip control 166 and Timing 168. The Remote Terminal group of functions is provided to accept data from and to transmit data to the system data buses; and this group of functions includes five functions referred to as Receive 170, Transmit 172, Mode Codes 174, Passthrough 176 and Address 178. The Bus Control group of functions is invoked to control operation of the system data buses; and this group includes six functions referred to as Dynamic Bus Control 180, Path Control 182, Feature Control 184, Transmit 186, Receive 188 and RT-to-RT 190. The SIU interface group of functions is provided to transmit data to and to receive data from the SIUs of the station; and this group includes three functions referred to as Interupt 192, Master Select 194 and Cooperative Tests 196.

The initialization function 162 is invoked, first, whenever power is applied to the station after a period during which power was not applied (a condition referred to herein as power reset or power-on-reset), and second, whenever a command for re-initialization is transmitted to the BIU. Such a command may come over the system data bus 44, or from one of the SIUs of the station. When invoked, the initialization function establishes all of the desired or necessary initial values in the BIU. Also, the initialization function determines, or reads, the address of the station from the address input-output circuit of the station, as well as the associated parity value, and stores both of these values in both memories 76a and b of the BIU. The initialization function also sets the POR flag in the BIU BIT flag word, discussed below, to indicate that initialization has occurred, and transmits a master controller interupt to both SIUs of the station. It should be noted that the time during which the initialization function is operating is the best opportunity to perform certain built in tests, discussed immediately below, since no data-generating activity will have been performed at that time.

The Built-in-Test, or BIT, function 164 includes a plurality of tests; and these tests can be grouped into three classes, depending on the affect of the tests on the BIU. Class I tests are those which replace memory or register data with arbitrary test values, and preferably these tests are conducted only after power has been re-applied to a station or when a reinitialization will follow the test. Class II tests are those that do not interfere with normal operation of the BIU, and these tests may be conducted on a periodic basis. Class III tests are those that may be conducted only during specific BIU operations in which the test is conducted in response to the transfer of selected data.

The BIT function accepts as input data all of the contents of both memory units 76a and b of the BIU and the contents of the memory section of the processor 80. If desired, this function may be designed to accept other input data, such as data indicating the status of various input-output circuits.

When invoked, the BIT function checks or verifies the accuracy of selected data, and the preferred manner for doing this depends on the data being verified. To check the accuracy of a memory unit, for instance, values are written into all of the locations of the memory unit and then these locations are read to determine the values stored therein. If the value that is read at a particular location is different than the value that was written into that location, then the test function indicates an error. Preferably, the values that are used for these tests are those that are susceptible to typical memory faults. Program memories are verified by procedures, referred to as checksum procedures, in which the binary values of all of the data in a program are added and then compared to what that sum should be if all the data in the program are accurate. Other suitable tests may be conducted, for example, to identify faults in the communication paths of the station, as well as failed micro controllers. The results of the BIT function are summarized in the BIU BIT flag word discussed below.

It is quite possible that transient errors will occur due to electromagnetic noise. Accordingly, it may be desirable to introduce various time delay periods in the operation of the BIT function. Further, instead of taking certain action in response to the detection of a single error, it may be desirable to conduct a test a plurality of times, to keep a count of the number of times a data location is sensed as being incorrect or faulty, and to take remedial action only when that error count reaches a certain number. Such a procedure, in effect, acts as a filter so that the station does not take any remedial action in response to errors caused by electromagnetic noise and other non-serious transient effects.

The B-chip control function 166 is provided to set various parameters of and related to the B-chips, including the B-chip flag words discussed above, to desired initial conditions. This function also monitors the operation of the B-chips and selects a preferred B-chip of the station to receive and transmit data. This B-chip control function accepts as input data the interupt signals transmitted to the BIU via either of the system buses 44a and b. When the B-chip control function is invoked, the BIU processor receives from each B-chip the current value of each of the flags listed in FIG. 12.

The B-chip control function also transmits to each of the B-chips, the address of the station and bus control commands that may be required by other functions of the BIU; and the B-chip control function monitors and controls the transmission of data between the B-chips and the memories 76a and b of the BIU, and this may be done in any conventional or suitable manner.

The timing function 168 of the BIU software provides a time base for all BIU operations, preferably with the resolution of one millisecond. More specifically, a millisecond count value is kept in a selected memory unit of the BIU; and when invoked, the timing function reads that current millisecond count and increases that count by one each time a one millisecond interupt is transmitted to the processor from the timer of the station. This function will also reset the current millisecond count to a value of zero whenever a valid synchronize or synchronize with data word command is transmitted to the station.

The remote terminal receive function 17 is invoked when a valid command word is transmitted to the station. In particular, with reference to FIG. 14, when a valid command word is transmitted to a station, that word is transfered to and temporarily stored in a trial buffer area of one of the memory units of the BIU. Once the command word is so stored, the terminal receive function decodes the word count field of the command word to determine the number of words in the message following the command word, and then this number of following words transmitted to the station are also sent to and stored in the trial buffer area of the "preferred" memory unit. If the number of received words does not equal the value of the word count field of the command word, or if the invalid message flag of the BIU status word is set, then the message is abandoned and the BIU processor resets the invalid message flag of the BIU status word. Otherwise, the sub-address field of the command word is then decoded. This sub-address field gives the location in the buffer area of both memory units of the BIU at which the message is to be stored. Once this latter address is found, the message is then transmitted to and stored in the addressed locations in the buffer areas of both memories 76a and b. Preferably, the message is loaded first into the buffer area of a "preferred" memory unit, and then loaded into the buffer area of the other memory unit. When the message has been loaded into both buffer areas, the BIU processor generates a message received interrupt signal that is transmitted to both SIUs of the station. Once the message has been properly loaded into the buffer areas, the processor also clears, or resets, the message complete flag in the B-chip flagword and, if it had been set, the mode code flag of the BIU status word.

The remote terminal transmit function 172, generally, processes transmit commands and prepares messages for transmission to the system data bus 44. When a valid command to transmit is received by a station, that command word is transferred to and temporarily stored in the trial buffer area of the preferred memory unit of the BIU. The terminal transmit function decodes the sub-address field of the command word, and this sub-address identifies the location in the buffer area of the memory unit having the actual words that are to be subsequently transmitted by the station The BIU processor also decodes the word count field of the command word and transmits this number of words from the addressed locations of the preferred buffer area, to the B-chip that received the command to transmit word. When the message has been transmitted from the preferred memory to the proper B-chip, the BIU processor generates a message transmitted signal that is conducted to the SIUs. This function of the processor also resets the complete message received flag and, if appropriate, the mode code and the invalid message received flags of the B-chip that received the command to transmit word.

The mode code function 174 identifies and invokes other software functions that are to be performed by the processor of the BIU in response to mode code command words sent to the BIU. In particular, upon receipt of a valid mode code command word, the processor decodes the word count field of that word to determine an index value that identifies the function to be performed by the BIU. These functions and the associated index values are listed in FIG. 11.

Most of these functions are performed by the B-chip itself; however, some require action by the processor. For instance, in response to receiving a mode code command word having a value of zero in the word count field, the processor invokes the dynamic bus control function, discussed below; while if the BIU receives a mode code command having a value of 1 or 17 in the word count field, the processor invokes the timing function to reset the timer count, as described above. Mode code command words having values of 2, 6, 7, 18 or 19 in the word count field invoke functions performed by the B-chip and require no specific response by the processor of the BIU; and mode code command words having values of 4, 5, 16, 20 or 21 cause the BIU processor to invoke the SIU but otherwise require no direct response by the processor of the BIU. When the BIU receives a mode code command word having a value of 3 in the word count field, the processor invokes the BIT function and then the reinitialization function; and a mode code command word with a value of 8 in the word count field causes the processor to invoke the initialization function. A mode code value of 30 causes the BIU to transmit a single-word system configuration word, and a mode code value of 31 causes the processor of the BIU to invoke the passthrough function, discussed immediately below.

The BIU has a passthrough state of operation in which one of the store buses is connected to one of the system buses so that the bus controller can communicate directly with the store, bypassing the BIU processor, the memory units of the BIU and the SIU. Preferably, switches (not shown) are located in or between the transformers of each BIU to configure the BIU selectively in the passthrough mode. In particular, with reference to FIGS. 3 and 5, when these passthrough switches of the A BIU are closed, they directly connect transceiver and transformer units 72a and 72b of that BIU to directly connect bus line 44a with store bus 70a. However, when these passthrough switches are open, they route data from transceiver and transform unit 72a to encoder/decoder unit 74a, and they route data from transceiver and transformer unit 72b to encoder/decoder unit 74b. Analogously, when the passthrough switches of the B BIU are closed, they directly connect transceiver and transformer units 72a and 72b of the BIU to directly connect bus line 44b with store bus 70b; and when these passthrough switches are open, they route data from each of transceiver and transformer units 72a and 72b of the B BIU, to encoder/decoder units 74a and 74b thereof respectively.

The passthrough function 176 is used to switch the BIU into and out of the passthrough mode. When a mode code command word is received having a value of 31 in the word count field, the passthrough function is invoked and this function examines the counter field of that code word. If this field has a non-zero value, the above-mentioned switches are closed or actuated to switch the BIU into the passthrough mode of operation. As long as the BIU is in this passthrough mode, the value in the counter field of the mode code word is decreased by one each millisecond, and when this value reaches zero, the above-mentioned switches are opened or deactuated to return the BIU to the non-passthrough mode of operation. The BIU can be returned earlier to the non-passthrough mode of operation by transmitting to the BIU a mode code command word having a value of 31 in the word count field and a zero value in the counter field. After receiving such a mode code word, the counter field is searched; and upon detecting a zero value therein, the BIU processor immediately returns the BIU to the non-passthrough mode of operation.

The remote terminal address function 178 determines the address of the station from the signals conducted to the processor from the address input-output circuit, and transmits this address to the B-chips of the station, which use the address to determine whether to accept data being transmitted on system data bus 44. The remote terminal address function also compares the address parity bit in words transmitted to the station with the address parity bit established by the address input-output circuit of the station; and if an address parity bit in a word transmitted to the station differs from the address parity bit established by the address input-output circuit, the remote terminal function sets the address parity bit in the BIU status word to a value of one, indicating an address parity error.

The dynamic bus control function 180 may be provided to permit the BIU to accept a bus control offer, to assume bus controller operations of system 30 and to pass the bus control function to another station of system 30. The dynamic bus control function is invoked whenever a valid bus offer mode code command is transmitted to the station. When this function is invoked, the processor examines the dynamic bus acceptance flag of the BIU's status word. If that flag is not set, the BIU refuses the bus control offer, and the dynamic bus control function ends. However, if the bus acceptance flag of the status word is set, indicating that the BIU status word has been modified by the SIU to indicate readiness for bus controller operations, the BIU changes to the bus controller state.

The appropriate commands and messages transmitted by a terminal 14 during operation as a bus controller of system 30 may be stored, respectively, in the bus control file and in the message receive and transmit area of each memory of the BIU, these commands and messages may be indexed in any suitable manner to enable the terminal 14 to operate as the bus controller of system 30.

For example, during operation as a bus controller of system 30, the BIU may transmit commands from the bus control file of the BIU memories, and the BIU may examine each transmitted command word for the presence of the bus control offer mode code and the address of the remote terminal receiving that bus control. Upon detecting the transmission of a bus offer mode code to a remote terminal, the dynamic bus control function will repeatedly transmit that mode code to the other remote terminals of system 30 in numerical order according to their address values (with the address value of 31 being followed by the address value of one), until either a bus control offer is accepted, or all of the remote terminals of system 30 have rejected the offer.

In the former case, the terminal accepting the offer becomes the bus controller while the terminal making the offer returns to a remote terminal status; and in the latter case, the terminal making the offer remains as bus controller and invokes the next function in the bus control file.

The BIU is also placed in the bus controller state by the SIU to transmit commands and messages from station 14 to the store connected to it; and these commands are taken from the bus control files of the BIU memories, while the messages are taken from the receive and transmit message areas of the BIU memories. More specifically, the bus control file includes a multitude of bus control records, and each control record, in turn, includes two words: a control word, which establishes a function to be performed by the BIU, and an operand word, which is a 1553 command word identifying, among other things, the address of the store to which the command word is to be transmitted, and whether the command word is a command to transmit or a command to receive.

Each BIU memory unit also includes a bus control index or file pointer, which identifies the number or address of the bus control record to be performed next by the BIU. This index is set to zero during initialization of the BIU, and the index is normally increased by one each time a bus control record is performed. The value of this bus control index may also be changed by the SIU to select the next operation of the bus controller.

When the BIU is in the bus controller state, the bus controller path control function 182 identifies or selects the next bus control function to be performed by the BIU; and in particular, this function identifies or selects the address of the bus controller record having the function to be performed next by the BIU.

The records of the bus control file include the following path control directives:

i) if error, retry on other bus N times,
ii) restart bus control file,
iii) enter rt state,
iv) skip record if the reply service request flag is off, and
v) skip record if the reply busy flag is on.

The bus controller path control function parses records of the bus control file for these directives. If directive (i) is detected in a particular record, data is transmitted over one of the store buses, up to N times, according to the function specified in the record. Then, if no status word is transmitted back to the bus controller, or if the message error flag is set in the status word or words transmitted back to the bus controller, this function of the record is performed again, up to N times, over the other of the store buses. After the function has been performed N times over each of the store bases, the bus control function pointer is advanced to the next record in the bus control file.

If the "restart bus control file" directive is detected, then the address value in the bus control function pointer is reset to zero, so that the next bus control function to be performed is the one having an address of zero. If the "enter rt state" directive is detected, the address value in the bus control function is advance by one and the BIU is returned to the remote terminal state.

If directive (iv) is detected in a record, the service request flag of the last status word received by the terminal is tested. If this service request flag is set, the command of the current record is performed. However, if this service request flag is not set, the command of the current record is not performed and the address value in the bus control function pointer is advanced by one.

If directive (v) is detected in a particular record, the busy flag of the last status word received by the terminal is checked. If this busy flag is not set, the command of that particular record is performed; but if this busy flag is set, the command of that particular record is not performed, and the address value in the bus control function pointer is advanced by one.

If none of the directives is present in a particular record, then the bus controller transmits a command or message as required by that record, and then the address value in the bus control function pointer is increased by one.

It should be noted that, as explained below, the SIU may also change the address value in the bus control function pointer, to provide an adaptive response to message data received by the station.

The bus controller feature control function 184 selects various features used during operation of a remote terminal as a bus controller. The records of the bus control file may also include the following feature directives: i) wait n milliseconds, ii) begin on one millisecond edge, iii) primary bus first, iv) secondary bus first, and v) rt to rt.

The bus control feature control function parses records of the bus control file for these directives. When directive (i) is detected, the counter n is decreased by one each millisecond, and when this counter reaches zero, the bus controller feature control function permits the bus controller path control function to select the next bus control file record whose function is to be performed by the BIU.

If directive (ii) is detected in a particular record, the function of that record is delayed until the current millisecond count word indicates that the next millisecond time period has begun. If the "primary bus first" directive is detected in a particular record, the function of that record is transmitted to the store bus or the system data bus, via the then preferred B-chip; and if the "secondary bus first" directive is detected in a particular record, the function of that record is transmitted to the store bus, or the system data bus 44 via the then non preferred B-chip. If the "rt to rt" directive is detected in a given record in the bus control file, the command word of that record and the command word of the next record in the bus file are used, respectively, as the receive command and transmit command words in a remote terminal to remote terminal message transmitted by the bus controller to a remote terminal.

The SIU interrupt function 192, generally, identifies to the SIU the function that the BIU has just completed. In particular, when the BIU completes a function, the BIU processor generates an interrupt pulse signal and a data value identifying the completed function, and the signal and data value are transmitted to both SIUs of the station. The BIU generates such an interrupt signal and data value under the following circumstances:

i) at the completion of the initialization function and entry of the BIU to the ready state,
ii) at the automatic entry of the BIU to the ready state in response to a command received from the system data bus,
iii) at the automatic entry of the BIU to the remote terminal state in response to a command received from the system data bus,
iv) at entry of the BIU to the remote terminal state after the BIU completes operation as a bus controller,
v) at entry of the BIU to the bus controller state as the result of the BIU accepting a bus controller offer,
vi) at entry of the BIU into a test state at the end of a test of the communication memories 76a and b of the BIU,
vii) upon receipt by the BIU of a "synchronize with data word" mode code command, viii) when the BIU is functioning as a remote terminal and the BIU completes the transmission of a message, and ix) when the BIU is functioning as a remote terminal and the BIU completes the reception of a message.

The master select function 194 compares the BIT flag words, discussed below, generated by the two SIUs of the station and identifies the preferred SIU from which commands and transmission data are accepted. This preference also establishes the order in which the SIUs receive transmission data from the BIUs.

Preferably, the master select function compares the BIT flag words for the two SIUs arithmetically and chooses the SIU with the smaller value as the preferred or selected SIU. When the BIUs choose a selected SIU, this is indicated by setting the SIU preference flag in the BIU flag word of the communication memory associated with the non selected SIU—that is, the SIU that was not chosen as the selected SIU. This set flag word indicates that the BIUs will not accept from the non-selected SIU, commands to change the state of the BIU or commands for the BIU to perform bus control operations. Data will be transmitted to the non selected SIU, though, to maintain its data fields current.

The cooperative test function 196 helps perform several tests, referred to as hand shake tests, that are conducted between the SIUs and the BIUs. These tests are designed to assure that various micro controllers are active, and to assure that the BIUs and the SIUs are communicating with each other via the dual port memories.

In one test, each memory unit of the BIU has a flag, referred to as a "dead BIU micro controller flag." Normally, this flag is clear or at a first value indicating that the BIU is active; however, the SIU directly connected to the memory unit periodically automatically sets this flag to a second value indicating that the BIU is inactive. If the BIU processor is active, it periodically checks the dead BIU flag; and, if that flag is set at the second value, the BIU processor clears this flag or resets it to the first value. The SIU also periodically checks the dead BIU flag. If the flag is clear, the SIU assumes that the BIU is active; while if the flag is set, the SIU assumes that the BIU has become deactive. Each BIU memory unit also has a second flag, referred to as a dead SIU microcontroller flag, which has first and second values indicating, respectively, that the SIU is active and deactive. Normally, the dead SIU flag is clear or at the first value, however it is periodically set to the second value by the BIU. If the SIU is active, it periodically checks the status of this flag; and if the flag is set, the SIU will clear this flag or reset it to the first value. The BIU also periodically checks the status of the dead SIU flag. If the flag is clear, the BIU assumes that the SIU is active; however if the dead SIU flag is in the second value, the BIU assumes that the SIU is not active.

With a second type of test, the SIU will store a specific message in a selected portion of one of the BIU memory units, the BIU processor will copy the data in each location in the memory unit into the memory location having the next highest address value (although the contents of the highest memory location preferably are simply cancelled), and then the SIU will check to determine if the data has been properly shifted. If the data has been properly shifted, the SIU will assume that it is communicating properly with the BIU via the BIU memory unit.

SIU Operating Program

With reference to FIG. 15, the SIU software is comprised of a generic operating system 202 referred to as the kernel, and a plurality of specific store application programs, represented in FIG. 15 by boxes 204a-d. The SIU kernel includes two kinds of functional software: a first kind 202a is capable of managing (and in the absence of a store specific application program, will manage) all of the input/output functions of the SIU; and a second kind 202b to perform system management functions.

The SIU kernel is capable of accepting input data from the BIUs of the station, and from the discrete and analog sensor lines of the SIU. The input data from the BIUs may be from data messages transmitted on the system data bus 44. These bus messages from a particular BIU are made available to the SIU via the communication memories 76a, b that are accessable to both the BIU and the SIU. The discrete and analog sensor data may represent store output signals or feedback measurements of signals sent to the store. Generally, the SIU kernel makes these input data available to an SIU default function, which performs basic functions in the absence of any suitable store specific application program. For example, an application program may be transmitted to the station via the system data bus 44 in the form of input data bus messages. In the absence of any application program, the SIU default function accepts operation command messages, verifies their accuracy and performs the commanded tasks or generates the commanded output values.

The microprocessor 92 of each SIU operates the kernel software of the SIU, and the two SIUs of each station contain identical kernel software. The SIU kernel is activated by four interrupt signals: (i) an interrupt signal from either BIU indicating there has been a power restart, (ii) an interrupt from the associated BIU indicating that this BIU has completed a task, (iii) an interrupt from the non associated BIU indicating that this BIU has completed a task, and (iv) a timer interrupt from the timer of the SIU.

The SIU kernel has five operating states: an initialization state, an application program test state, an application load state, a default operation state, and an error trap state.

Figure 16:
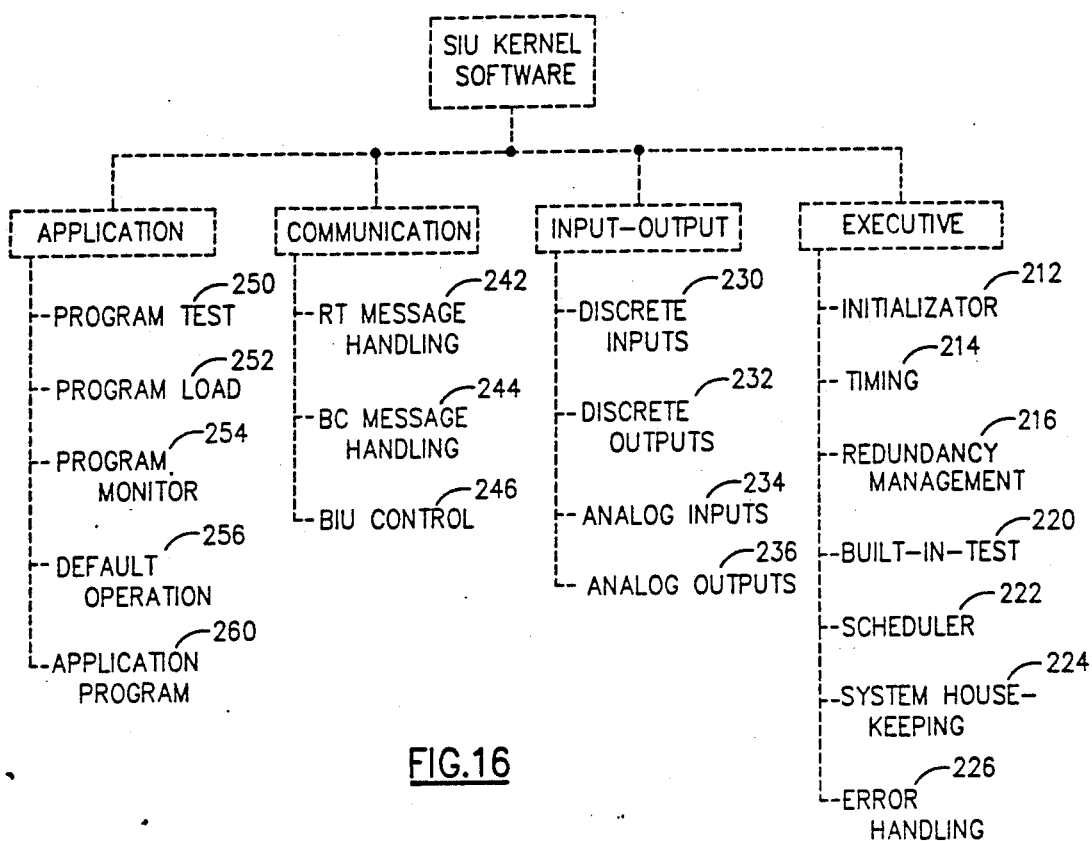
FIG. 16 lists the specific functions performed by the store generic application program for the store interface units of the distributed stations.

Generally, as listed in FIG. 16, the functions of the SIU kernel can be divided into 4 main categories: executive functions, bus communication functions, store input/output functions, and application program functions. The executive group of functions includes seven specific functions, referred to as initilization 212, timing 214, redundancy management 216, built-in-test 220, scheduler 222, system housekeeping 224, and error handling 226. The store input/output group includes four specific functions, referred to as discrete inputs 230, discrete outputs 232, analog input 234, analog output 236; and the bus communication group of functions includes three specific functions referred to as RT message handling 242, BC message handling 244 and BIU control 246. The application group of functions includes five particular functions, referred to as program test 250, program load 252, program monitor 254, default operation 256 and application program 260.

The initialization function 212 of the kernel is invoked whenever power is applied to the SIU after a period during which power was not applied, and whenever a command for reinitialization is transmitted to the SIU over the system data bus 44. When invoked, the initialization function establishes all of the desired or necessary initial values in the SIU. The initialization function also sets the communication memories 76a, b of both BIUs of the station to command that the BIU operate in the remote terminal state of operation, and the initialization function sets a power-on-reset flag (referred to as the POR flag) in the BIU to indicate that the initialization function is completed. The initialization function may invoke various built-in-test functions of the SIU, especially the class I built in test functions described below; and when complete, the initialization function may pass control of the kernel program to a main loop that could invoke such functions as program test, default operation and program load functions.

The timing function 214 controls the real time clock of the SIU; and in particular, the SIU includes a timer that generates a timing pulse once every millisecond. Upon receipt of this timing pulse, SIU processor 92 simply increments the real time clock counter by a value of one.

The redundancy management function 216 helps the SIU determine which processors and data are to be used during normal operation of the station 14. For example, the processor of each SIU compares its own BIT words and quality indicators, and the BIT words and quality indicators of the other SIU and of both BIUs, and the state words of both BIUs; and on the basis of this comparison, the SIU processor determines which processes will run and which data source will be used (as the "preferred path") during the next series of communications transmitted to or received from the system data bus This function also records the state of the station in the status words of the BIUs and SIUs.

The built in test function (referred to as the BIT function is provided, first, to determine whether the SIU is operational before committing the SIU to a particular mission, second, to detect faults or errors in the SIU during a mission, either to select alternate modes of operation to minimize the effect of those faults, or to alert the user of these faults, and third, to identify faults following a mission to facilitate diagnosing and repairing or replacing faulty elements of the SIU.

The BIT function of the SIU software also includes a plurality of tests, and these tests can be grouped into three classes, depending on the effect of the test on the SIU. Class I tests are those which replace memory or register data with arbitrary test values, and preferably these tests are conducted only at a power-on-reset or when a reinitialization will follow the test. Class II tests are those that do not interfere with normal operation of the SIU, and these tests may be conducted on a periodic basis. Class III tests are those that may be conducted only during specific SIU operations in which the test is conducted in response to the transfer of selected data.

When invoked, the SIU BIT function checks or verifies the accuracy of selected data, and the preferred technique for doing this depends on the data being verified. To verify the accuracy of memory units 94, values are written into all of the locations of the memory units and then these locations are read to determine the values stored therein. If the value that is read at a particular location is different than the value that was written into that location, then the test function indicates an error. Preferably, the values that are used for these tests are those that are susceptible to typical memory faults. Program memories are verified by checksum procedures in which the binary values of all of the data in a program are added and then compared to what this sum should be if all the data in the program are accurate. Other suitable tests may be conducted, for example, to identify faults in the communication paths of the SIU, as well as failed microcontrollers. The outputs of the SIU BIT function are summarized in the SIU BIT flag word, described below.

The discrete inputs function 230 reads discrete data values from discrete output circuits of the store and transmits those values to the system data bus 44. With the preferred embodiment, when this function is invoked, processor 92 (normally via a store specific application program), reads the discrete values of all of the discrete output cicuits of the store, one at a time and in a particular order; and, after all of the desired circuits have been read, the read values are transmitted to the BIU and then to the system data bus, in that same particular order. For instance, each discrete output circuit of the store may be assigned a unique address; and, during a given discrete value read cycle, the values of the discrete output circuits are read, one at a time in numeric order according to the value of the address, starting with the output circuit having the lowest address value. Then, after values have been read from all of the discrete output circuits, these values are transmitted to the BIU, for subsequent transmission to the system data bus, in the order in which the values were read from the discrete output circuits.

The discrete outputs function 232 receives discrete values from the system data bus, via the BIU, and transmits those values to discrete input circuits of the store, also normally via a store specific application program. In a preferred arrangement, a multitude of discrete values are transmitted to the SIU from the BIU in a given order; and after values for all of the discrete input circuits have been received, those values are transmitted to the discrete input circuits of the store in that given order, with each such value being transmitted to a respective one of the discrete input circuits of the store. For example, the discrete input circuits of the store may receive those values in numeric order according to the values of the addresses of the input circuits, starting with the discrete input circuit having the lowest address value.

The analog inputs function 234 reads analog data values from analog output circuits of the store (normally via a store specific application program), converts these analog values to digital values, and then transmits those digital values to the system data bus via the BIU. With a preferred embodiment, when this function is invoked, analog values are transmitted to the analog-to-digital converter 96 of the SIU from all of the analog output circuits of the store, one at a time and in a particular order, and these values are converted to binary numbers. After binary values have been obtained from all of the analog output circuits, these values are transmitted to the BIU, and then to the system data bus, in the order in which the corresponding analog values were transmitted to the analog-to-digital converter. For instance, each analog output circuit of the store may be assigned a unique address; and during a given analog value read period, the values of the analog output circuits are transmitted to the analog-to-digital converter one at a time in numeric order according to the values of the addresses of the output circuits, starting with the output circuit having the lowest address value. After a binary value is generated from an analog value, that binary value is transmitted to processor 92. Then, after binary values have been transmitted to the processor from all of the analog output circuits of the store, these values are transmitted to the BIU, for subsequent transmission to the system data bus, in the order in which the binary values were transmitted to the processor.

The analog outputs function 236 receives binary values from the system data bus, via the BIU, converts those binary values to analog values, and transmits the analog values to the analog input circuits of the store, also normally via a store specific application program. In a preferred arrangement, a multitude of binary values are transmitted to the SIU from the BIU in a given order; and after values for all of the analog input circuits have been received, those values are transmitted to the digital-to-analog converter 100 in the same order in which they were received. The digitial-to-analog converter converts each binary value to an analog signal, and these signals are transmitted to the analog input circuits of the store in the order in which the corresponding binary values were transmitted to the converter 100, with each analog value being transmitted to a respective one of the analog input circuits of the store. For example, the analog input circuits of the store may receive those analog values in numeric order according to the values of the addresses of the input circuits, starting with the input circuit having the lowest address value.

The RT message handling function 242 provides the SIU software processes with access to messages transmitted to the BIU of the station, via the system data bus, from other remote terminals. When a message is received by the BIU (which is signaled by the message received interrupt signal from the BIU), the RT message handling function copies the message and stores it in the SIU memory. The RT message handling function also informs the SIU function waiting for the message that the message has arrived. This other SIU function might be, for example, the application program function 260, the default operation function 256 or the application loading function 252.

The BC message handling function 244 provides the SIU software with a capability to send command messages to other stations of system 30 via the system data bus or via the store data buses. When invoked, the BC message handling function collects command words and command directives from the SIU function that is requesting the message transmission, and arranges these words and directives in the memory unit of the BIU which, at that time, is the preferred BIU to use for message transmission (which is determined by the redundancy management function). The BC message handling function sets the dynamic bus acceptance flag in the status word of the BIU, and sets the bus control in progress flag in the SIU memory. If the preferred BIU is ready to transmit the message, then the BC message handling function changes the state word of the BIU to bus controller. When the BIU has finished transmitting this message, the BIU transmits an interrupt signal to the SIU; and in response, the bus control in progress flag is cleared. The BC message handling function also allows a requesting function of the SIU software to check the status word received in the most recent transmission to the BIU, and to change the status word of the BIU.

The BIU control function 246 determines the causes of interrupt signals from the BIUs, and this may be done in any suitable manner. For instance, the BIU control function may check the SIU internal state words, the BC completion flag, and the BIU state word to determine if an interrupt has been caused by one of the following circumstances:

i) completion of BIU initialization and entry of the BIU into the ready state, ii) automatic entry of the BIU into the ready state as a result of a command from the system data bus, iii) automatic entry of the BIU into the remote terminal state as a result of a command received over the system data bus, iv) entry of the BIU into the remote terminal state at the end of a bus control operation, v) entry of the BIU into bus controller state as a result of a bus offer, vi) entry of the BIU into the test state at the end of a test of one of the communication memories 76a and b, vii) receipt by the BIU of a "synchronize with data word" mode code, viii) completion by the BIU of a remote terminal transmit message, and ix) completion by the BIU of a remote terminal receive message.

Upon determining the cause of the BIU interrupt, the BIU control function then invokes any BIU routine required. For example, interrupts caused by conditions (viii) and (ix) listed above, require that the RT message handling function be invoked. In addition, preferably, for interrupts caused by conditions (ii), (iii) and (v) through (vii), a record is made of the interrupt; and when interrupt (iv) is received, the BC completion flag is set.

The program test function 250 is provided to verify the integrity of the loaded application program, and this can be done in any suitable manner. For example, this may be done by a checksum procedure. With this procedure, the SIU processor is provided with a value that is equal to what should be the sum of the binary values of all of the words in the application program. In operation, the program test function adds the binary values of all of the words in the application program stored in the SIU and compares this sum to the above-mentioned provided value. If this sum equals the provided value, the application program is considered to be good, and otherwise the application program is considered to be bad. The program test function preferably transmits this test result to the kernel.

The program load function 252 loads the application program into the SIU memory whenever program loading is requested, and any suitable procedure may be followed to do this. Preferably, the program loading function is activated by either a request from another function of the SIU kernel, or by a message transmitted to the station over the system data bus from a remote terminal; and preferably, this request includes information about the size of the application program and an address in the SIU memory at which the loading of the application program is to start. After receiving the request and the associated information, the program data messages are received and stored sequentially in the SIU memory. After the completion of the transmission of the program data messages, the program load function checks to determine if the size of the loaded application program is what it should be, as indicated by the data accompanying the loading request. If the number of program data messages is less than expected, then the program loading is considered incomplete; and in this case, the loading incomplete flag is set in the SIU bit flag word, and the SIU kernel enters the default-operation state. If the program loading is complete, the SIU kernel enters the program test state.

The program monitor function 254 verifies that an operating, loaded application program is properly functioning, and any suitable monitor function may be employed for this purpose. Preferably, the program monitor function is activated periodically, either at regular or irregular periods; and if an application program is operating, the monitor function checks selected data in the SIU memory to determine whether that data are consistent with the current process information. If the current selected data are consistent with the current process information, normal operation of the application program resumes. However, if the selected data are not consistent with the current process information, a program run-away flag is set in the SIU BIT flag word, and the SIU enters the error state of the kernel program.

The default operation function 256 is activated when no application program is loaded in the SIU memory, and it provides for the direct transfer of data between the BIU and the SIU input and output terminals. In particular, in response to receiving a command for data at one or more of the input-output circuits of the SIU, the default operation function obtains that data and transmits it to the BIU for subsequent transmission to the terminal issuing the command. The default operation function may also be used to request that an application program be loaded in the SIU memory, and to activate the program load function. Any suitable procedures may be used to perform the above-described tasks of the default operation function.

The scheduler function 222 allocates the use of the SIU processor to the various other functions of the SIU software, and this allocation may be done in any acceptable manner. Preferably, as requests are made to activate SIU program functions, the functions are listed in a queue, referred to as the active process queue; and when the SIU processor completes one function, the processor begins the next function in the active process queue. If, when the SIU processor completes a function, there is no other function waiting to be performed, the scheduler function may use the processor to perform low priority system work, such as class II BIT tests, discussed above, or the system housekeeping function, discussed below.

The system housekeeping function 224 is provided to perform selected routine tasks when the application program process temporarily releases control of the processor. For example, the system housekeeping function may invoke the redundancy control function to redetermine the preferred BIU to receive and transmit messages, and may invoke the SIU BIT functions to perform tests on the SIU.

The error handling function 226 maintains a record of sensed or detected errors; and, after the detection of certain errors or a given number of errors (selected or identified by the programmer or operator), this function will limit the SIU activity to a minimum, and in particular, will terminate operation of the SIU. An error index is maintained of selected errors or conditions considered to be serious enough to justify terminating the SIU processor. After detecting an error, the error handling function checks the current error index to determine if the error requires so reducing the SIU activity; and if the error does require this, the error handling function will limit the activity of the SIU accordingly. If the error does not require limiting the SIU activity, normal operation of the SIU will resume. Also, preferably a count is kept of the number of sensed or detected errors; and each time an error is detected, this count is increased by a value of one.

Built In Test Words

Figure 17:
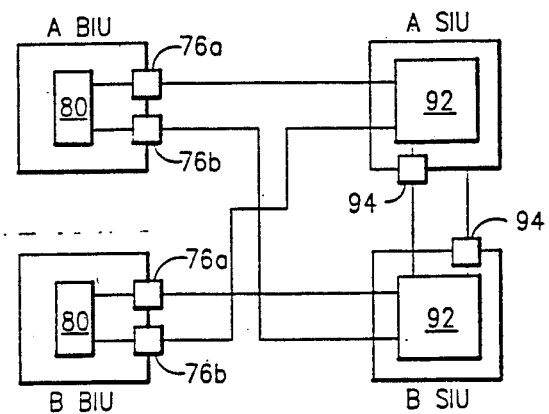
FIG. 17 schematically illustrates the memory areas of a distributed station to which each processor thereof is directly connected.

Each station 14 of system 30 uses three types of BIT words, referred to as microcontroller BIT words, a system data bus BIT word, and an input/output BIT word. Generally, with reference to FIG. 17, a group of microcontroller BIT words are generated by each processor of the station and stored in the station memories accessable to that processor. In particular, processor 80 of the A BIU generates two microcontroller BIT words and stores a respective one of these BIT words in each memory unit 76a, b of the A BIU, and processor 80 of the B BIU generates two microcontroller BIT words and stores a respective one of these BIT words in each memory unit 76a, b of the B BIU. Processor 92 of the A SIU generates three microcontroller BIT words and stores a respective one of these bit words in each of memory unit 94 of the B SIU, memory unit 76a of the A BIU, and memory unit 76b of the B BIU. Processor 92 of the B SIU generates three microcontroller BIT words and stores a respective one of these bit words in each of memory unit 94 of the A SIU, memory unit 76b of the A BIU, and memory unit 76a of the B BIU.

The format for the microcontroller BIT word is shown in FIG. 18. The zero bit, or POR flag, is normally at a zero value and is set by the controlling microcontroller when power is initially applied or reapplied to the station after a period during which power was not applied to the station. Bit number 1, or the program checksum fault flag, is normally at a zero value and is set at a value of one when the controlling microcontroller detects any program memory checksum error. Bit number 2, or the communication memory fault flag, is normally at a zero value and is set to a value of one if, at the time power is reapplied to the station, the processor that controls the BIT word detects a fault in the communication path through the memory unit in which the BIT word is held. Bit number 6, or the program runaway flag, is normally at a zero value and is set to a value of one by software routines located at the beginning and end of spare areas in the memory unit in which the BIT word is held. If one of these software routines is invoked, it is possible that one of the microcontrollers that has access to the memory unit in which the software is located, is not operating properly. If one of these software routines is invoked (a condition referred to as "runaway") power may be reset to the station, and this would invoke the initialization routine or function which would clear the program runaway flag.

Bit number 7, or the dead processor flag, is used, as described above, to indicate whether the processor that controls the BIT word is operating. The zero value or clear state of this flag suggests that the controlling processor is active, while the one value or set state of this flag suggests that the controlling processor may be inactive. Initially this flag is clear, and the flag is periodically set by the various microcontrollers that have access to the memory in which the flag is located. The controlling processor, if active, also periodically checks the flag and will clear it if the flag has been set. Thus, if the controlling processor is active, the dead processor flag should not remain set for an extended period of time; and if this flag does remain set for an extended period of time, this may indicate that the controlling processor has become inactive.

The microcontroller 80 of each BIU also generates two system data bus BIT words, and stores one of these words in each of the memory units 76a, b of the BIU. The format for the system data bus BIT word is shown in FIG. 19.

Bit number 0, or the B-chip POR flag, is normally at a zero value or clear, and it is set to a value of one whenever power is reapplied to the station to indicate that the B-chips have been reinitialized. This flag may be used to indicate that the terminal address held in the B-chips may differ from the address that had previously been assigned to the terminal, for example, by the system controller. To elaborate, normally the address for a station is established by the address input/output circuit of that station, and this address values is transmitted to the B-chips of the station immediately following a power reset. Occasionally, this address may be changed by data transmitted to the station from the system bus controller. Upon a power reset, however, the address value obtained from the address input/output circuit of the station is retransmitted to the B-chips, and thus any prior address change transmitted to the station from a bus controller has been lost.

Bit number 1, or the RT address parity flag, is normally at a zero value or clear, and this flag is set to a value of one whenever there is a discrepency between the parity of the address of the station and the address parity bit in a word transmitted to the station. This flag is not used to prevent the station address value from being loaded into the B-chips, but is kept to indicate that there may be an error in the address.

Bit number 2, or the last received message data fault flag, is normally at a zero value or clear, and this flag is set when an error has been detected in a message transmitted to the BIU over the system data bus.

Bit number 3, referred to as the BC-to-RT reversion flag, is normally at a zero or clear value, and this flag is set to a value of one if, while the BIU is in the bus controller mode, the BIU receives a command from another terminal also in the bus controller mode. This flag, when set, indicates a period of system recovery after a period during which one of the terminals operates as a bus controller by default. For example, it is possible that none of the terminals of system 30 will accept a bus controller offer, in which case a first terminal is forced into a bus controller mode by default. While this first terminal is operating as a bus controller, a second terminal may willingly accept the bus controller offer, in which case the BC-to-RT reversion flag is set in the system data bus BIT word of the former terminal, indicating to this terminal that it may cease to operate as bus controller.

Bits numbers 4 and 5, referred to as BC response flags, are normally clear or at a zero value, and these bits are set to a value of one if, when the station is operating as a bus controller mode, the station transmits a command over the primary or secondary system data buses, respectively, and no response is received by the station.

Bits numbers 6 and 7, referred to as RT activity flags, are normally clear or at a zero value, and these bits are set to a value of one if, when the station is operating as a remote terminal, the terminal does not receive any messages over the primary or secondary system data buses, respectively, over a given length of time. These flags, when set, may indicate that the system data buses are not performing properly.

The input/output BIT words are generated by the two SIU microcontrollers and indicate the conditions of the i/o circuits of the station. Each SIU microcontroller generates three input/output BIT words and stores a respective one of these word in each of the three memory units immediately accessable to the microcontroller—that is, processor 92 of the A SIU stores the input/output BIT word that it generates in each of memory unit 76a of the A BIU, memory unit 76b of the B BIU, and memory unit 94 of the B SIU; and processor 92 of the B SIU stores the input/output BIT word that it generates in each of memory unit 76b of the A BIU, memory unit 76a of the B BIU, and memory 94 of the A SIU.

The format for the input/output BIT word is shown in FIG. 20. Bit numbers 0 and 1 are normally clear or at zero values, and these bits are set to values of one whenever, respectively, all of the inputs of the input-output circuits of the station are at zero or one values, either of which is an indication of possible fault in the input-output circuits Bit number 5, the output/input mismatch flag, is normally at a zero value or clear, and this flag is set to a value of one when an incorrect output of the i/o circuits is dectected. In particular, the processor 92 of each SIU is preferably provided with a table identifying the correct output signals that should be generated by the input-output circuits in response to particular input signals conducted to interface section 64 from the processors. Feedback circuits are preferably provided to conduct the output signals of the input-output circuits back to the processors 92, which can then determine if the output signals have their correct values; and if an incorrect output signal is detected, the processor sets the output/input mismatch flag to a value of one.

Bit number 6, referred to as the EEPROM program incomplete flag, is normally clear or at a value of zero, and this bit is set to a value of one when an incomplete store specific application program is transmitted to the SIU. Bit number 7, referred to as the EEPROM program checksum flag, is normally clear or at a value of zero, and this bit is set to a value of one when a checksum test detects a fault in a store specific application program loaded in the SIU memory.

FIG. 21 summarizes the locations for all of the above-described BIT words.

The various BIT words stored in each terminal may be transmitted to other terminals of system 30 over the system data bus 44. Preferably, these BIT words are transmitted in pairs; and, in particular, whenever a microcontroller BIT word is transmitted from one of the BIU memory units, either the input/output BIT word or the system data bus BIT word from that same memory unit is also transmitted with that microcontroller BIT word.

Each BIU examines the microcontroller BIT words and the input/output BIT words in each of the memory units 94 of the two SIUs, and selects a preferred SIU from which the BIU will receive controls and data to be transmitted to the system data bus. For example, if there are no error flags set in any four of these BIT words, each BIU selects the associated SIU as the preferred SIU; that is, the A BIU selects the A SIU as the preferred SIU, and the B BIU selects the B SIU as the preferred SIU. However, if an error flag is set in either the microcontroller BIT word or the input/output BIT word in the memory unit of one of the SIUs, while no error flags are set in those BIT words in the memory of the other SIU, the latter SIU will be selected as the preferred SIU.

Figure 22:
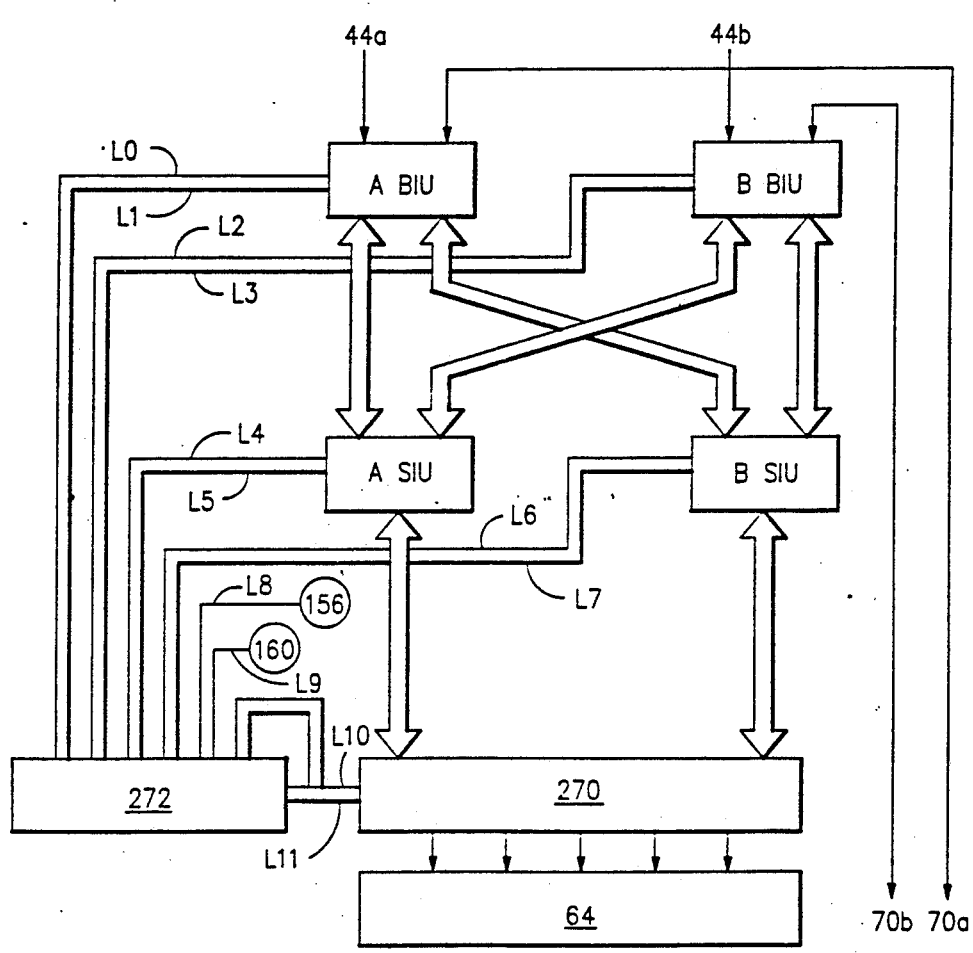
FIG. 22 schematically illustrates the select logic which contains a steering device and a logic control device that are used to determine which BIU and SIU processor of a distributed station is the selected data path, and which SIU processor is selected to control the input-output interface section of the distributed station.

The various BIT words are also used to select the preferred SIU to transmit data to the input/output circuits of the station. In particular, with reference now to FIG. 22, two independent data paths are provided to conduct data from the system data bus to the interface section 64. The first, or "A" data path, is from either BIU, and then through the A SIU; and the second, or "B" data path, is from either BIU and then through the B SIU. Selector gate 270 is provided to control which data path is employed; and this gate, in turn, is controlled by steering logic device 272, which selects the preferred data path on the basis of various input signals supplied to the logic device from the microcontrollers and the power supplies of the station.

Generally, if an error flag is set in the microcontroller BIT word generated by a processor of one of the BIUs, the BIU is considered to be bad; but if no such error flags are set, the BIU is considered to be good. If an error flag is set in either the microcontroller BIT word or the I/O circuit BIT word generated by an SIU, that unit is considered to be bad, but if no such error flags are set in those BIT words, the SIU is considered to be good. Various signals are conducted to the control steering logic device 272 from the BIUs and the SIUs of the station to summarize the status of those BIUs and SIUs.

The A BIU conducts signals to the control steering logic device over lines L0 and L1 to indicate the status of this BIU and of the two SIUs as detected by the A BIU. If the A BIU detects itself as bad, a zero value is transmitted over both of lines L0 and L1; and if the A BIU detects itself as good, and detects both SIUs as good, then one values are transmitted over lines L0 and L1. If the A BIU detects itself as good, the A SIU as good, and the B SIU as bad, a one value is transmitted over line L0 and a zero value is transmitted over L1; and if the A BIU detects itself as good, the A SIU as bad, and the B SIU as good, a zero value is transmitted over line L0 and a one value is transmitted over line L1.

Similarly, the B BIU conducts signals to the control steering logic device over lines L2 and L3 to indicate the status of this BIU and of the SIUs as detected by the B BIU. If the B BIU detects itself as bad, zero values are transmitted over both lines L2 and L3; and if the B BIU detects itself as good and detects both SIUs as good, one values are transmitted over both lines L2 and L3. If the B BIU detects itself as good, detects the A SIU as good, but detects the B SIU as bad, then a zero value is transmitted over line L2 and a one value is transmitted over line L3; and if the B BIU detects itself as good, detects the A SIU as bad, but detects the B SIU as good, a one value is transmitted over line L2 and a zero value is transmitted over line L3.

The SIUs also transmit signals to the steering logic device over lines L4–L7 to indicate the status of various BIT words and to indicate which BIU is the active BIU—that is, the BIU that is currently selected to receive data from the system data bus. More specifically, if the A SIU detects itself as bad, zero values are transmitted over both of lines L4 and L5; and if the A SIU detects itself as good, detects the B SIU as bad, and detects the B BIU as the active BIU, then one values are transmitted over lines L4 and L5. If the A SIU detects itself as good, detects the B SIU as good, and detects the A BIU as the active BIU, then a zero value is transmitted over line L4 and a one value is transmitted over line L5; and if the A SIU detects itself as good, detects the B SIU as bad, and detects the A BIU as the active BIU, then a one value is transmitted over line L4 and a zero value is transmitted over line L5.

Similarly, if the B SIU detects itself as bad, zero values are transmitted over both of lines L6 and L7; and if the B SIU detects itself as good, detects the A SIU as bad, and detects the B BIU as the active BIU, then one values are transmitted over lines L6 and L7. If the B SIU detects itself as good, detects the A SIU as good, and detects the A BIU as the active BIU, then a zero value is transmitted over line L6 and a one value is transmitted over line L7; and if the B SIU detects itself as good, detects the A SIU as bad, and detects the B BIU as the active BIU, then a one value is transmitted over line L6 and a zero value is transmitted over line L7.

The two power supplies which provide power to the station 14 also test their output signals, and each of the power supplies, or test circuits associated therewith, conducts a one value over lines L8 and L9, respectively, when the power supply changes from a power off state, wherein the power supply does not supply power to the station, to a power-on state in which the power supply provides power to the station.

The steering logic circuit selects the SIU to be the active SIU—that is, the SIU from which data and commands are transmitted to the system data bus 44, and which is used to control the input-output circuits of the station. If the A SIU is selected as the active terminal, a one value is transmitted from the steering logic circuit to the selector gate over line L10; while if the B SIU is selected as the active terminal, a one value is transmitted from the steering logic circuit to the selector gate over line L11. The values transmitted over lines L10 and L11 are also conducted back and used as inputs to the steering logic circuit device itself, which uses these values when making its next selection for the active SIU.

FIG. 24 is a table that indicates which SIU is selected as the active SIU by the steering logic circuit in response to the input signals conducted to that circuit over lines L0–L11. In this table, the zero and one values over lines Lo–L11 have the above-discussed meanings, and an x indicates that the particular value on a given line has no affect on the selection of the active SIU. The select column indicates which SIU is chosen as the active SIU, whether the terminal should be reset or reinitialized, or whether the most recently selected SIU should remain as the selected SIU.

The preferred action selected by the steering logic circuit—whether to reset the terminal, or to select one of the SIUs as the active SIU—is based on various factors. It is believed that these factors can be best understood by considering various operating conditions of the station; and in particular, normal operating conditions, reinitialization conditions, the condition in which a fault exists or is detected in one of the BIUs or in one of the SIUs, the condition in which a fault is detected in more than one of the interface units, and the condition in which there are possible conflicting logic signals from the interface units.

Under normal operating conditions, there are no error flags in any of the BIT words, all of the processors 80 and 92 are detected as being in good conditions and zero values are present in lines L8 and L9, indicating that there has been no power reset. Under these conditions, the signals for the terminal input/output circuits may be taken from either the A SIU or the B SIU, and the preferred action is to choose the A SIU if the A BIU is the active BIU, and to choose the B SIU if the B BIU is the active BIU. Since the system bus controller selects the active BIU, this procedure enables the bus controller to select, from outside the station 14, the data path through the station.

Start-up conditions are considered to be those in which one or both of the power supplies transmits a one value to the steering logic circuit. Normally, the fact that such a value is received from only one of the power supplies does not indicate that power has actually been reapplied to the terminal. Instead, most likely, this only indicates that there has been a transient change in that one power supply, and hence the normal response to this condition is simply to take the power for the station from the other of the power supplies. If some other fault exists in the station, the preferred response is to hold the currently active SIU as the active SIU, at least until the transient change in the one power supply has passed. A true terminal start or re-start is indicated by one values in both lines L8 and L9, and this causes the station to be reinitialized.

In the case of a fault in just one of the BIUs, the selection of the active SIU is, in effect, controlled by the external bus controller, which selects the fault free BIU to supply data to and to receive data from the system data bus. Since both SIUs have access to the data in both BIUs, a fault in one of the BIUs usually does not affect the ability of either SIU to operate normally. A signal that a fault exists in one BIU, coupled with an indication from one of the SIUs that this BIU is the active BIU, is a logic conflict, and the preferred response is to hold the currently active SIU as the active SIU.

If a fault exists in just one of the SIUs, then usually all four of the interface units, including the bad SIU, identify this SIU as bad. Signals from three interface units identifying one of the SIU as bad is a clear indication that the other SIU should be selected as the active SIU. Signals from two of the interface units that one of the SIUs is bad, while indicating that there may be a fault, also is a logic conflict, and the preferred response is to hold the currently active SIU as the active SIU, at least until the logic conflict ends.

If faults are detected in two interface units, then normal station operation is still possible if one BIU and one SIU are fault free; and if this is the case, that fault free SIU is selected as the active SIU. If there is any indication, though, that two BIUs or two SIUs are faulty, the preferred response is to hold the currently active SIU as the active SIU, until there is an indication of a fault free path through the station. Holding the currently active SIU as the active SIU is also the preferred response if there is a discrepency between signals identifying the condition of a particular interface unit—that is, one signal identifies the unit as good, while another signal identifies the unit as bad. Such a discrepency does not necessarily indicate that a fault exists in the terminal, but may be, for example, the result of data being stored in one SIU before being stored in the other SIU, or the result of normal delays in the transmission of data from one memory unit to another.

The Walleye Weapon and Walleye Pod

As mentioned above, armament system 30 is particularly well suited for use with two general types of aircraft stores or weapons, referred to in the art as 1760 stores and non-1760 stores. To better understand system 30, two specific stores with which the system may be used will be described. The first store, referred to as the Walleye II weapon, is a non-1760 store, and the second store, referred to as the Walleye Pod, is a 1760 store. Also described below are store specific application programs which have been designed for use with these stores.

Figure 25:
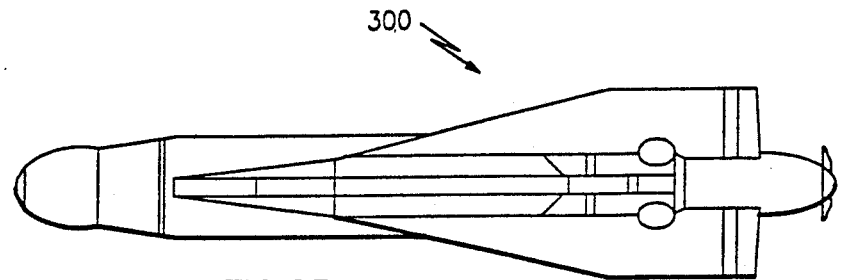
FIG. 25 is a simplified outline of a Walleye II weapon.

The Walleye II weapon, generally outlined at 300 in FIG. 25, is an air-to-surface glide bomb used to deliver a high explosive warhead to tactical surface targets. The weapon comprises a gyroscopically stabilized television camera, an internal power supply, and control means to track a target and to generate guidance signals that may be used to help guide the weapon to the target. The Walleye II weapon also contains a video transmitter and a receiver to receive control signals from a remote control Pod, allowing an operator to monitor and change the point at which the weapon is aimed as the weapon is in flight to a target.

Figure 26:
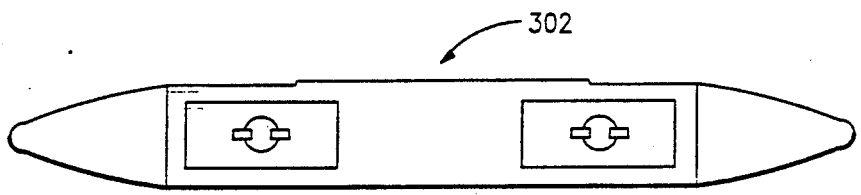
FIG. 26 is a simplified outline showing a Walleye Pod.

The Walleye Pod, generally outlined at 302 in FIG. 26, is mounted on an aircraft to transmit data between that aircraft and various other weapons, both to control and to monitor those other weapons. These weapons may be mounted on or have been launched from the same aircraft on which the Walleye Pod is mounted, or the weapons may have been launched from another aircraft. The Walleye Pod is capable of transmitting audio and video signals to the other weapons and receiving audio and video signals from those weapons by electromagnetic waves, and recorders are contained in the Pod to record audio and video signals from the weapons. Normally, the Walleye Pod is held on an aircraft for a complete flight, although in an emergency, the Pod can be jettisioned from the aircraft.

When either a Walleye II weapon or a Walleye Pod is mounted on an aircraft, data is transmitted between the aircraft and the store by means of an umbilical cord (shown in FIG. 2) that is connected to the store and to the connectors 66a, 66b, and 66c of one of the stations of armament system 30. More specifically, a first end of each umbilical cord is connected to two or all three of the connectors 66a, 66b and 66c of one of the stations 14, and a second end of the umbilical cord is connected to a store. Each station 14 includes a multitude of signal and power lines that lead to external pins on connectors 66a, 66b and 66c; and, in use, these pins are connected to mating receptacles of an umbilical cord to conduct signals and power between the store and the armament station. Because of this arrangement, various signals transmitted between the store and the distributed station 14 to which the store is connected, are often referred to by letters or numbers identifying the pins of connectors 66a, 66b or 66c used to transmit the signals. Many of the signals conducted to the store are continuously conducted thereto whenever the signal is generated by the distributed station and the store is connected to the station; and to prevent one of these signals from being applied to the store, the distributed station ceases to generate the signal. For other signals, switches are employed to selectively conduct or not conduct the signals to the store.

Figure 27:
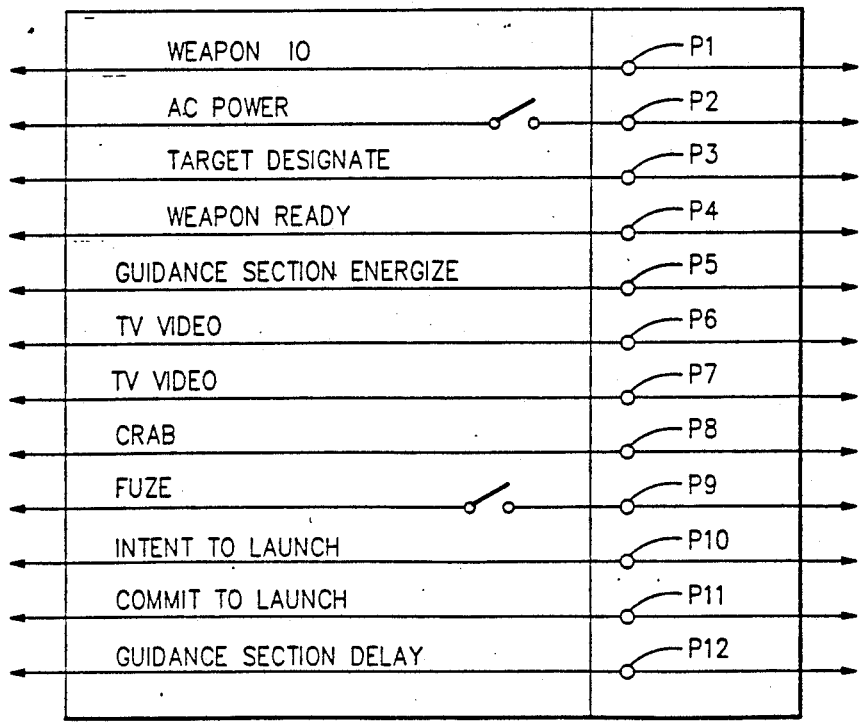
FIG. 27 lists various signals transmitted between a distributed station and a Walleye II weapon that is connected to the station.

With reference to FIG. 27, in use, the following signals are conducted between the Walleye weapon and the aircraft on which it is mounted:
 i) a weapon identification signal,
 ii) an alternating current power signal,
 iii) a target designate signal,
 iv) a weapon ready signal, v) a guidance section energize signal,
vi) television video signals,
vii) a CRAB signal,
viii) a fuze signal,
ix) an intent to launch signal to the weapon,
x) a commit to launch signal from the weapon, and
xi) a guidance section delay signal.

The weapon identification signal is provided by connector pin P1, which is commonly referred to as Pin D. Generally, armament station 14 applies a positive voltage to this pin; but when the Walleye weapon is connected to the pin, that weapon reduces the voltage of pin P1 to a zero or ground level. Thus, if the store is not present, pin P1 has a positive voltage potential; however, if the store is present, this pin is at ground and has a zero voltage level. A message indicating whether the store is present is conducted from the distributed station 14 to control station 20; and this information is used to determine whether power should be applied to the store, whether other store control signals should be conducted to the station, and to help maintain an inventory of stores attached to armament system 30.

The AC power signal preferably is a 115 V AC, 400 hertz, 3 phase power signal applied to the store via a plurality of pin connectors, represented in FIG. 27 by pin P2, and this power is supplied from the aircraft when that AC power is available and the store is attached to the armament station. This AC power is normally terminated when the distributed station indicates that the weapon is no longer present, which is indicated by the voltage potential of connector pin P1 changing from ground to a positive value.

The target designate signal is a 28 V DC signal applied to the store by the station 14 via connector pin P3 to hold the television camera of the weapon in a fixed position. If a station has received a station select command, discussed below, and the store is present, then the target designate signal is normally supplied to the weapon, even if a target has not yet actually been designated. An operator, such as the pilot or crew of the aircraft, can interrupt the target designate signal by actuating a target designate switch, and this is done to release the weapon television camera from its fixed position and to allow the camera to be aimed at a target. Also, the target designate signal is usually terminated when the weapon leaves the station.

The weapon ready signal is provided by the voltage level of connector pin P4. Generally, the armament station 14 applies a positive voltage to this pin; but when the Walleye weapon is operating under its own power (which generally occurs when the weapon air turbine output voltage becomes greater than 102 V AC, which normally occurs at an approximate air speed of 180 knots), the Walleye weapon changes the voltage level of pin P4 to zero or ground. Thus, when the weapon is not operating under its own power, pin connector P4 has a positive voltage potential; and the pin has a zero voltage level when, and for as long as, the weapon operates on its own power. Armament station 14 transmits to control station 20 a signal identifying the voltage level of pin P4 to indicate whether the weapon is operating under its own power, and preferably this signal is continuously transmitted to the control station regardless of whether the armament station has received the station select command or the weapon select command, discussed below.

The guidance section energize signal is a 28 V DC signal applied to the weapon over pin connector P5 to apply power to the guidance section of the weapon, and this signal is applied to the weapon after the station has received both the station and weapon select command words. The guidance section energize signal remains applied to the weapon until the station and weapon deselect command words are transmitted to the station.

The television video signals are conducted from the weapon to the station via a multitude of pin connectors, represented in FIG. 27 by connectors P6 and P7, and thence to a monitor or display on the supporting aircraft. The television video signals are conducted from the weapon to the station when, and for as long as, the guidance section energize signal is conducted to the weapon.

The CRAB signal is conducted to the weapon via pin connector P8 to enable the television camera of the weapon to return toward a centered position therein. Preferably, station 14 normally applies a positive voltage signal to pin P8 to maintain that pin at a positive voltage level, and the CRAB signal is transmitted to the weapon by terminating that positive voltage signal and placing this pin connector P8 at a zero or ground voltage level. Preferably, the CRAB signal is only conducted to the weapon when the station to which the weapon is attached, has received a station select command and a crew operator acutates a CRAB switch to conduct this signal to the weapon.

The fuze signal is applied to the weapon over connector pin P9; and, as discussed in detail below, this signal is applied to the weapon in response to a sequence of events initiated when an operator actuates a bomb switch, and the fuze signal, terminates when the bomb switch is deactuated.

The intent-to-launch signal to the weapon is applied over pin connector P10 to initiate release of the weapon from the aircraft; and to conduct this signal to the weapon, the operator actuates the bomb switch. The signal will be applied to the weapon only under certain circumstances, discussed below; and to launch the weapon from the aircraft, the bomb switch must remain actuated until the weapon is separated from the aircraft. Once the bomb switch is deactuated, the intent-to-launch signal ends.

The commit-to-launch signal from the weapon is conducted to the station via connector pin P11. This signal is conducted to the armament station in response to the intent-to-launch signal to the weapon and after various internal safety checks are completed, as discussed below. The commit-to-launch signal from the weapon is conducted to the armament station as long as the intent-to-launch signal to the weapon is applied, or until the weapon separates from the aircraft. The commit-to-launch signal from the weapon may be directly used to actuate the bomb rack cartridges, or as a command to the control station to fire those cartridges. With this latter mode, the armament control station 20 will monitor for the commit-to-launch signal from the weapon and respond to this signal by transmitting a message to the aircraft to actuate the bomb rack cartridges.

The guidance delay signal is applied to the weapon via pin connector P12 to prevent the guidance section of the weapon from being activated until the weapon is released from the aircraft. This signal is applied by maintaining pin P12, and the mating receptical of the weapon connector, at a zero voltage level. Once the weapon separates from the armament station, the voltage level of that mating receptical changes to a positive value. Preferably, the guidance section of the weapon becomes active approximately 2 seconds after the weapon separates from the armament station.

With reference to FIG. 28, the following signals are conducted between the Walleye pod and the aircraft on which it is mounted:
  i) a weapon identification signal,
  ii) a terminal address signal,
  iii) an alternating current power signal,
  iv) a direct current power signal,
  v) a station select signal,
  vi) an audio signal, and
  vii) a video signal.

The weapon identification or weapon present signal is provided by connector pin P13. Generally, armament station 14 applies a positive voltage to this pin; however, when the Walleye Pod is connected to the pin, that weapon reduced the voltage of pin P13 to a zero or ground level. Thus, if the store is not present, pin P13 has a positive voltage potential; however, if the store is present, this pin is at ground and has a zero voltage level. A message indicating whether the store is present is conducted from the distributed station 14 to control station 20.

The terminal address signal is conducted to the address input/output circuit of the station from the store, via pin P14, to identify the address of the terminal.

The AC power signal preferably is a 115 volt AC, 400 hertz, 3 phase power signal applied to the store via a plurality of pin connectors, represented in FIG. 28 by pin P15, and this power is applied from the aircraft when that AC power is available and the store is attached to the armament station. This AC power is normally terminated when the distributed station indicates that the weapon is no longer present, which is indicated by the voltage potential of connector pin P13 changing from ground to a positive voltage. A 24 volt DC power signal is normally applied to the store via pin connector P16. As previously mentioned, switches are used to selectively conduct the AC and DC power signals to the store.

The station select signal is a 28 volt DC signal applied to the store via connector pin P17. This signal is applied when a station has received a station select command, discussed below, and the store is present.

An audio signal is normally transmitted from the Walleye Pod to the supporting aircraft via connector pin P18; and one or more switches may be used to selectively conduct these signals from the store to the aircraft. Similarly, video signals are conducted from the store to the supporting aircraft via a plurality of pins, represented in FIG. 28 by pins P19 and P20, and switches are used to selectively conduct these signals from the store to the supporting aircraft.

One specific example of the use of system 30 to launch a Walleye Weapon will now be described.

Walleye II weapon preparation begins as soon as aircraft power is available. The distributed station to which the weapon is attached preferably performs a self-test to determine that it is capable of controlling the store. After it is determined that a Walleye is present, AC power is applied to the weapon, and a Target Designate signal is also supplied to maintain the weapon TV camera caged in its present position.

Preflight checks can be performed by sending a Walleye ground test message to the distributed station via the system data bus, and a preflight check can be accomplished as follows:

1) Power, either external or internal, is applied to the aircraft. As a result of this, a 3 phase AC power and the Target Designate signal are applied to the weapon.

2) The Walleye ground test mode of operation is selected. This activates the aircraft Target Designate switch and sends a message to the distributed station to place it in a ground test mode (in this mode, the distributed station will not transmit an intent-to-launch signal to the weapon).

3) A station select message is sent to the distributed station. The station responds by applying the Walleye Guidance Section energize signal to the store, and by connecting the Walleye video output line to the aircraft High Band Width video bus 52.

4) The distributed station removes the target designate signal, which allows the weapon to track a target. A simulated or a real target can be presented for the ground check.

5) The Target Designate signal is reapplied to the weapon. This cages the weapon TV camera in its present position.

6) A CRAB command is sent to the distribted station; and in response, that station applies the CRAB signal to the store, causing the TV camera of the weapon to return toward the weapon boresight. It takes about 6 to 8 seconds for the weapon camera gyro scope to reach the boresight position.

7) A CRAB terminate command is sent to the distributed station. In response, the CRAB signal is terminated, and the weapon TV camera becomes fixed in its present position.

8) A station deselect message is sent to the distributed station. That station then disconnects the Walleye video output from the aircraft High Band Width video bus.

9) A message is sent to the distributed station to deselect the ground test mode, and that station returns to normal operation.

10) Aircraft power can be removed or left on, depending on whether the aircraft is to be flown in the immediate future. If power is removed and later reapplied, the distributed station performs a POR self test and reapplies power to the Walleye.

The following in-flight checks can be performed to verify functions of the Walley weapon and to harmonize the Walleye weapon.

1) A "weight off wheels" check can be conducted to insure that the aircraft is airborne; and if the check is positive, a "wow" signal is sent to the distributed station. This signal is the first of three signals that the distributed station must receive before that station will transmit to the weapon an intent-to-launch signal.

2) A "landing gear handle up" check can be done to insure that the aircraft is in a cruise or tactical configuration; and if the check is positive, a "landing gear handle up" signal is sent to the distributed station. This is the second of the three signals that the distributed station must receive before that station will transmit to the weapon an intent-to-launch signal.

3) A station select message can be transmitted to the distributed station. That station responds by applying the Walleye guidance section energize signal to the weapon. The distributed station also connects the Walleye video output to the aircraft High Band Width video bus 52, and monitors for the weapon power ready signal, which indicates that the weapon is operating on its own power. If this signal is detected, then the distributed station will send a "Weapon Ready" message to the control station.

4) A Master Arm Switch is activated; and in response, a "Master Arm On" signal is sent to the distributed station. This is the third and final signal that the station must receive before it will transmit to the weapon an intent-to-launch signal. The Master Arm On signal also activates the aircraft Target Designate and Bomb Button switches.

5) A Target Designate message is sent to the distributed station, and the target designate signal is removed from the weapon, allowing the weapon to track a target A pilot or operator may observe the weapon track the target on a TV display to confirm weapon operation.

6) A Target Designate End message is sent to the distributed station, and the target designate signal is reapplied to the weapon. This results in caging the weapon TV camera in its present position.

7) A CRAB message is sent to the distributed station over the system data bus. In response, the distributed station applies the CRAB signal to the weapon causing the weapon TV camera gyroscope to return toward the weapon boresight.

8) A deselect CRAB message is sent to the distributed station via the system data bus. The distributed station ends the CRAB signal, caging the weapon TV camera gyroscope in its present position.

9) Next, the aircraft is flown to position a well defined target within the cross hairs of the Walleye video display, and the Target Designate message is sent to the distributed station over the system data bus. The distributed station removes the Target Designate signal which allows the weapon to track the target.

10) Next, the pilot or operator verifies that the weapon is tracking the target and flies the aircraft to put the weapon gun sight on the target. When this is done, the "Target Designate" switch is deactivated to send the Target Designate terminate message over the system data bus to the distributed station. This station then reapplies the Target Designate signal to the weapon, and this cages the weapon TV camera in its present position.

11) A "Master Arm Off" signal is sent to the distributed station over the system data bus.

12) A "Deselect Station" message is sent via the system data bus to the distributed station. The station then disconnects the Walleye video output line from the aircraft High Band Width video bus 52. The distributed station also sends a "Weapon Not Ready" message to the armament control station over the system data bus.

The weapon is now confirmed operational and is harmonized with its sight system.

The target acquisition and release cycle of the Walleye II weapon system operation starts as the aircraft enters enemy territory. This phase of the Walleye II weapon system operation comprises the following steps.

1) The Master Arm Switch is actuated or turned on. This activates the Target Designate and Bomb Button switches, and sends the "Master Arm On" message to the distributed station over the system data bus. This message is the third of three signals that the distributed station must receive in order to enable that station to transmit the intent-to-launch signal to the weapon.

2) The station select message is sent via the system data bus to the distributed station, and that station responds by applying the Walleye guidance section energize signal to the weapon. The distributed station also connects the Walleye video output signal to the aircraft High Band Width video bus 52, and monitors for the weapon power ready signal. If that signal is received, then the distributed station will send a Weapon Ready message to the control station. The pilot or operator then selects the fuse value as either safe, delay, or instantaneous, and a message is sent to the distributed station identifying the selected fuse value. This is an information command, and will not be executed until an intent-to-launch signal is received.

3) In response to receiving the fuze message, the distributed station provides the following signals: (i) prior to the intent-to-launch signal, the line leading to connector pin P9 is maintained open; and (ii) upon receiving the intent-to-launch signal, the line leading to connector pin P9 is (a) maintained open if the "fuze safe" option was selected, (b) supplied with $-195$ V DC if the "fuze delay" option was selected, and (c) supplied with $+195$ V DC if the "fuze instantaneous" option was selected.

4) The aircraft is then flown to visually acquire the target and aim the weapon at the target. While this is being done, the Target Designate switch is actuated to send the "Target Designate" message to the distributed station. That station removes the Target Designate signal, which allows the weapon to track the target.

5) An operator or pilot views the television signals from the weapon to verify that the target is within the displayed cross hairs. As required, the Target Designate switch may be deactuated, the aircraft may be maneuvered and the Target Designate Switch may be reactivated to position the center of the target within the cross hairs displayed on a TV monitor. The CRAB operation can be used to drive the weapon TV camera gyroscope back toward the weapon boresight if the target moves off the TV display.

6) When the target is observed on the television display, the Target Designate switch is maintained actuated to continue tracking the target.

7) The Bomb Button is then actuated to send the "Intent-to-Launch" signal to the distributed station, indicating that the Master Arm switch is actuated and that the Bomb Button switch is actuated. In response, the distributed station conducts to the weapon, the intent-to-launch signal and the appropriate electrical fuzing voltage. The distributed station monitors for the commit-to-launch return signal from the weapon.

8) If the commit-to-launch signal is detected, the distributed station sends the "Fire Cartridges" message to the control station via the system data bus. Preferably, once the intent-to-launch signal has been transmitted to the distributed station, the control station repeatedly sends requests for a status message from the distributed station to receive the "Fire Cartridge" message, or the control station transfers bus control to this specific distributed station. The distributed station also monitors the discrete connector pin D to determine that the weapon is gone.

9) (a) If the weapon is detected as being gone, the AC power is removed, the target designate signal is removed, and the guidance section energize signal is removed. The distributed station also opens the fuze line, opens the TV video lines leading to pins P6 and P7, and sends the "Store Gone" message to the aircraft over the system data bus. (b) If the weapon is not detected as being gone within two seconds after the intent-to-launch signal is transmitted by the distributed station to the weapon, then the weapon is declared hung. The distributed station removes the Target Designate and the Guidance Section Energize signals, and opens the fuze line and the TV video signal lines from the weapon. The distributed station sends a "Weapon Hung" message to the control station, monitors the weapon status, and when requested, reports this status to the control station.

The Walleye Weapon & Pod Application Software

Figure 29:
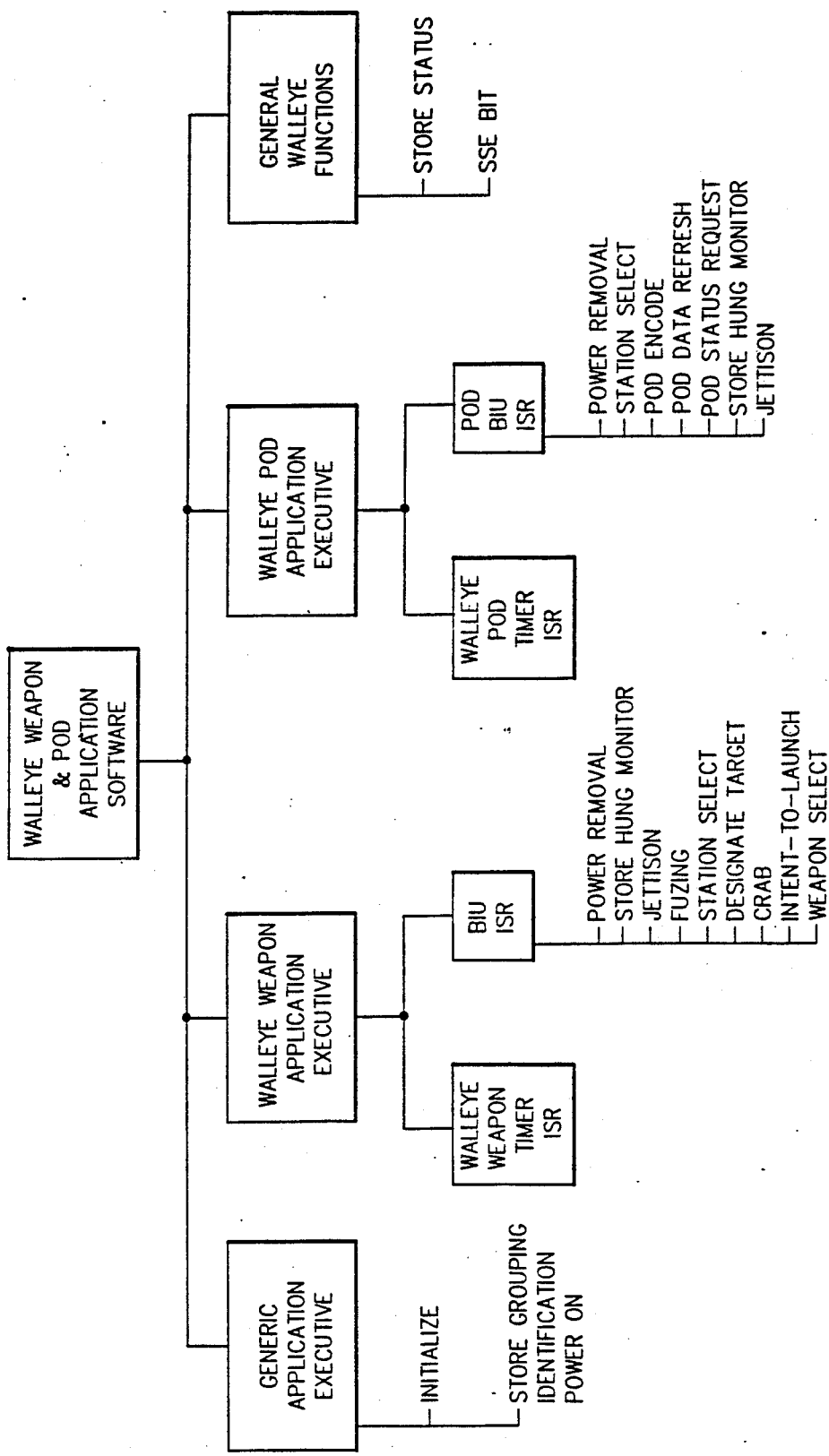
FIG. 29 lists specific functions performed by the Walleye weapon and Walleye Pod application software program.

The following paragraphs describe two specific application software programs that provide control of the Walleye weapon and the Walleye Pod at the station 14 in which the software is loaded, and the various functions of the programs are listed in FIG. 29. Generally, when it is invoked by the kernel, the Walleye application program will cause power to be applied to the store, and will check various signals transmitted to the armament station from the store to verify that these signals are as they should be. The application program will transmit various data to the control station 20, and signals that it is ready to operate the store by setting various flags. On commands from the control station, the application program will test the Walleye weapon, prepare it for launching, and launch the weapon. The application program also performs various store management functions, such as terminating power to the store, and jettisoning the store from the aircraft. The input-output circuits of the armament station control the supply of power to the store, and provide access to various discrete input and output signals to and from the store. The store buses 70a and b of the BIUs provide access to other input and output signals to and from the store.

Before discussing the specific functions of the Walleye Weapon and Walleye Pod application software programs, it may be helpful to describe various flags that are used by or with the application programs, and to describe the messages that are used to communicate between control station 20 and the distributed stations 14 and the stores connected to those distributed stations.

Five types of messages are used to transmit data between a control station, a distributed station and a store connected to that distributed station, and, as listed in FIG. 30, these messages are referred to as an R01 message, and R24 message, a T02 message, a T23 message and a T07 message. Generally, an R01 message is send by the distributed station to control the Walleye Pod; and, as outlined in FIG. 31, this message includes data idendifying the Pod for which it is intended and data needed to control the Walleye Pod and any weapon that the Pod itself is used to control.

The R24 message is sent to a distributed station from the control station to control either a Walleye weapon or a Walleye Pod connected to the distributed station. The R24 message includes the contents of an R01 message for retransmission to a Walleye Pod (or other 1760 store) connected to the distributed station. FIG. 32 outlines the contents of an R24 message. The message includes a safety flag word indicating values for the armament safety override flag, the master arm flag, the weight off wheels flag, the landing gear handle flag and the ground test flag. This message also includes a jettison flag word including an intent to jettison bit or indicator and a jettison arm bit or indicator; a weapon control flag word including a station select bit or indicator, a target designate bit or indicator, an intent to launch indicator, a CRAB bit or indicator and a weapon select bit or indicator; a fuze control flag word including a word identifying a fuze value, either safe, instantaneous or delay; and a loadout word identifying the message as being either for a Walleye weapon or a Walleye pod.

A T02 message is sent to a distributed station from the Walleye Pod, in response to a request for this message from the distributed station. As outlined in FIG. 33, the T02 message identifies the Pod and reports conventional Pod related data.

The T23 message is sent to the control station from a distributed station in response to a command for this message from the control station. With reference to FIG. 34, the T23 message includes the contents of the most recent T02 message received by the distributed station from the Walleye Pod attached to it. The T23 message may also include selected data identifying various conditions relating to the station, and selected data identifying various conditions relating to the application program loaded in the station.

As outlined in FIG. 34A, a T07 message indicates the status of various conditions of a distributed station, such as the status of its fault tolerance and redundancy capabilities, and a T07 message also is sent to the control station from the distributed station in response to a command from the control station for this message.

FIG. 35 lists the flags used by or with the Walleye Weapon and Pod application programs. The ISR direction flag is set and cleared at various points during the application program to determine whether interrupt signals should be passed to the application programs. In particular, when this flag is set, the interrupts from the BIU will be passed to the specific functions of the Walleye application programs; however, when this flag is clear, those interupts will not be passed to the functions of the application programs but will be handled within the kernel.

The load out command is a flag used by system controller 20 to indicate the type of store for which a command or message is meant. The inhibit all commands flag is used to inhibit the transmission of weapon related commands from the control station to the store attached to the distributed station at selected occasions. Specifically, when this flag is clear, it will not inhibit the transmission of those weapon related commands; however, when this flag is set, it will prevent the transmission of those weapon related commands to the store. The station select flag is used to indicate that a particular station has received a station select command. If the station has not received this command, this flag is clear; and this flag is set when a particular station receives the station select command. The weight off wheels flag is used to indicate whether the aircraft is airborne. This flag is clear when the weight of the aircraft is on its wheels, and this flag is set when the weight of the aircraft is not on its wheel. The landing gear handle flag is used to indicate when or whether the aircraft is cruising in flight. This flag is clear when the landing gear of the aircraft is in position to land the aircraft; and the flag is clear when the landing gear is in its normal position when the aircraft is cruising in flight.

The master arm flag is normally set, and it is cleared by an operator as an initial step to prepare to launch the weapons from the aircraft. The armament safety override flag also is normally set; and it must be cleared by an operator of the aircraft in order to launch any weapon therefrom. The ground test flag is used to prevent the launching or jettisoning of stores from the aircraft. Normally this flag is clear; and it is set by an operator to conduct tests of the armament system when the aircraft is on the ground. The store type ISR direction flag is used to determine whether to pass interrupt signals from the BIU to specific functions of the Walleye weapon or Walleye Pod interrupt service routines. Normally when this flag is set, those interrupts will be passed to the appropriate interrupt service routines; however, when this flag is clear, those interrupt signals will not be passed to the Walleye weapon or Walleye Pod interrupt service routines.

The store hung flag and the weapon ISR hung flag are used to indicate whether the store connected to a station has been detected as being hung. Normally, these flags are clear, and they are set when a store has been detected as being hung. The loadout present flag is used to indicate whether a message has been assembled in the BIU for transmission to the control station. Normally, this flag is clear, and it is set when such a message has been assembled and is waiting to be transmitted to the control station.

The 1760 message present flag is used to indicate whether the BIU has received a message from a 1760 store. Normally, this flag is clear, and it is set when the BIU has received such a message. The status message handshake flag is used to indicate that a new status message has been received by the BIU. Normally, this flag is clear, and it is set when such a status message has been received.

The jettison enable flag is used to instruct a station to jettison the store attached thereto. Normally, this flag is clear, and it is set to indicate to the station that it should initiate a process to jettison the store attached thereto. The weapon select flag is used to indicate that a station has received a weapon select command. Normally this flag is clear, and it is set when the station receives that weapon select command.

The 1760 initialization flag is used to indicate that certain initialization functions are being performed to the 1760 store. Normally, this flag is clear, and it is set during the period in which those initialization functions are being performed. The store bus preference flag is used to indicate which store bus is preferred to transmit signals from the station to the store. When this flag is clear in a particular SIU, the store bus directly connected to the BIU associated with that SIU is preferred store bus—that is, for example, when the store bus preference flag in the A SIU is clear, the store bus directly connected to the A BIU is preferred by the A SIU for transmitting signals between the station and the store connected to it. When the store bus preference flag is set in a particular SIU, the store bus directly connected to the BIU that is not associated with that SIU is the preferred store bus—that is, for example, when the store bus preference flag in the A SIU is set, the store bus directly connected to the B BIU is preferred by the A SIU for transmitting signals between the station and the store connected to it. The store mismatch flag is used to indicate that a station has received a message identifying a store that is different than the store for which the store specific application software loaded in the SIU is designed. Normally this flag is clear, and it is set when such a mismatch has been detected.

The 1760 solicit response flag is used to indicate that a store message is present within the BIU during the initialization phase for a 1760 store. This flag is normally clear, and it is set when, during the initialization phase for a 1760 store, a message for the store has been received by the BIU. The T23 update flag is used to indicate to the SIU that it should request a T02 messages from the store connected to the station. Normally, this flag is clear, and when it is set, the SIU will normally start soliciting the store for those T02 messages.

The T23 monitor flag is used to indicate whether a T02 message has been received by the store connected to the station. Normally, this flag is clear, and it is set after soliciting for a T02 message. The flag is then cleared after the T02 response message has been received by the controlling station. The armament bus preference flag is used to indicate the preferred system bus to transmit data to the system control station. When this flag is clear, the system bus that is directly connected to the BIU associated with the SIU is the preferred system data bus; and when this flag is set, the data bus directly connected to the BIU not associated with the SIU is the preferred system data bus.

The first part of the Walleye pod and Walleye weapon application programs to receive control of the store from the kernel is the generic application executive. Generally, this executive sets application related variables, flags and buffers to initial conditions or values; and this application executive program determines whether a store is present at the station and, if so, whether the store is a Walleye II or a Walleye pod. If a store is present, the generic application executive generates a signal for transmission to the control station indicating that a store is present and the type of store that it is. In addition, the generic application executive program causes various initial power signals to be applied to the store, and then passes processing control to the proper store portion of the application programs—either the Walleye II or the Walleye Pod portion of the application programs.

Figure 36A:
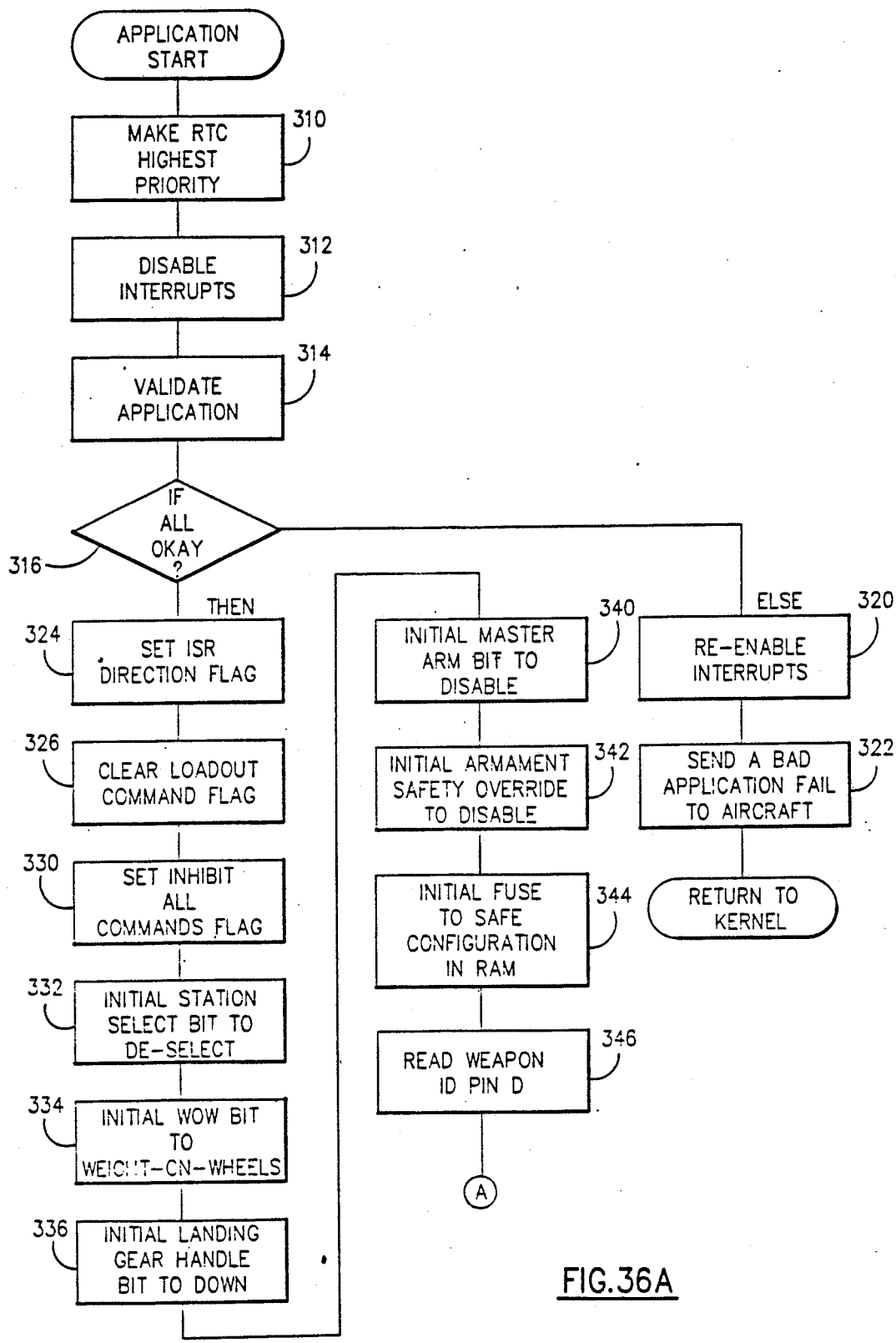
FIG. 36A and FIG. 36B, which consists of FIGS. 36Ba and 36Bb, comprise a flow chart illustrating the operation of the generic application executive function of the Walleye weapon and Walleye Pod application software program.
Figure 36B:
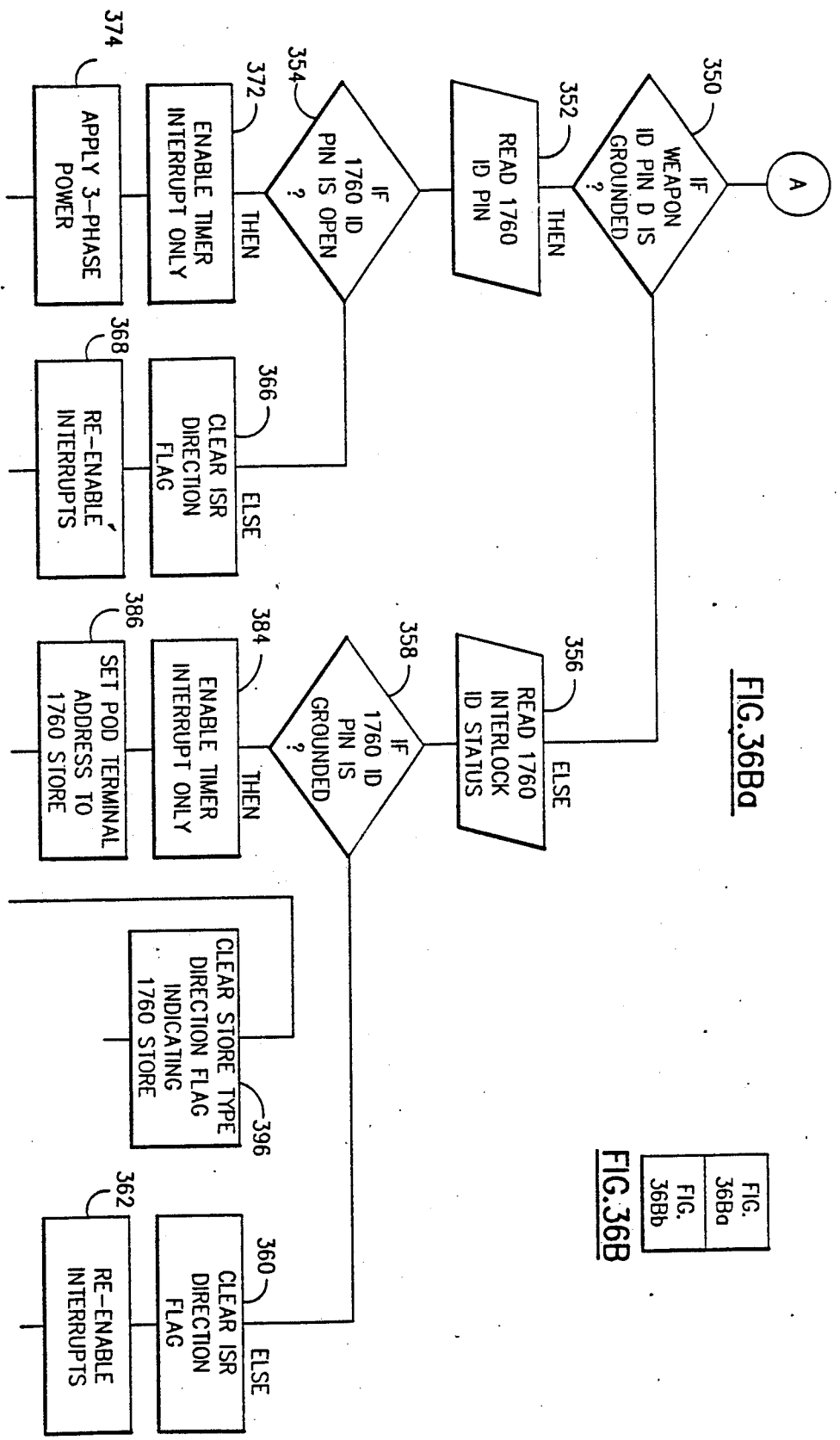
Figure 36B:
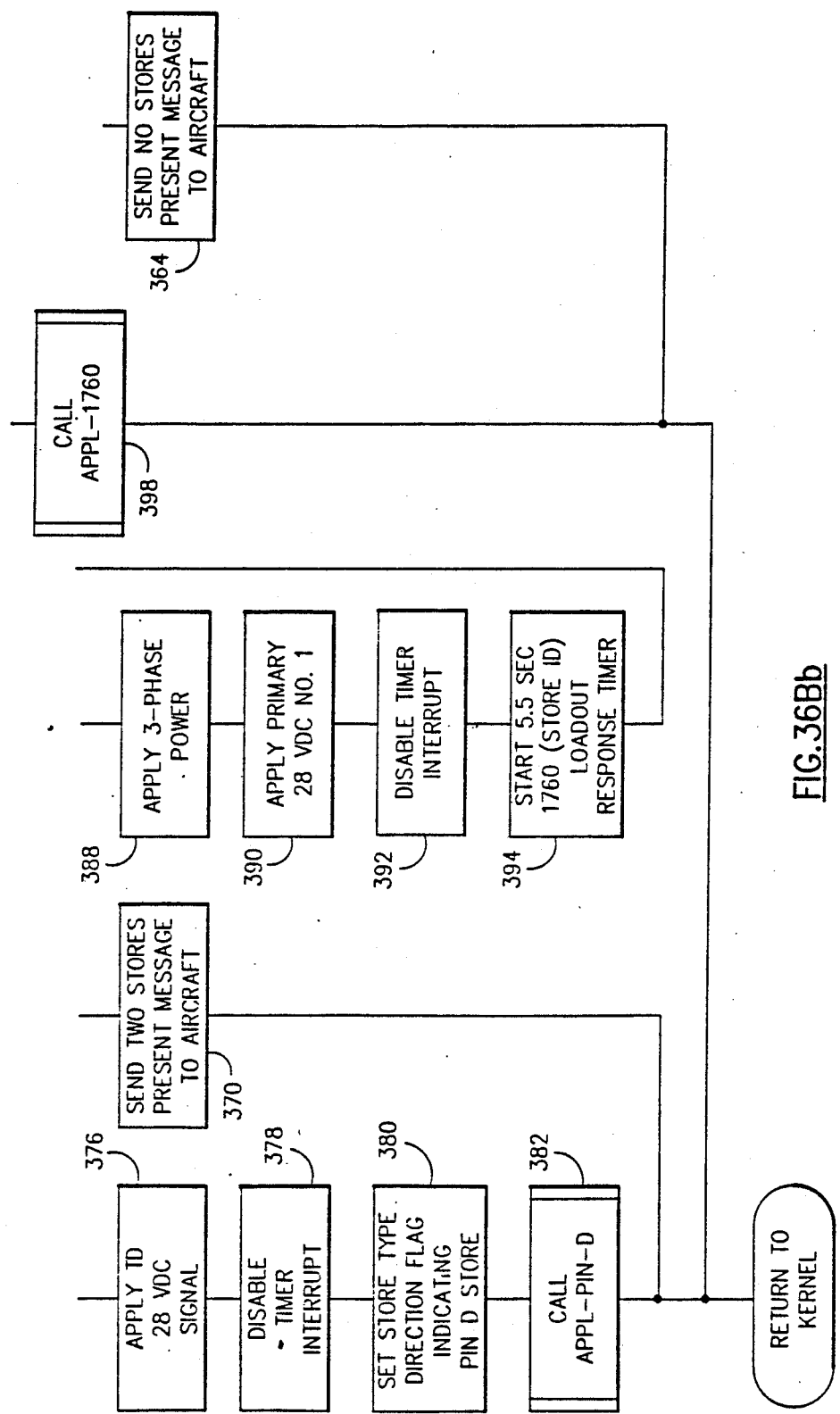

More specifically, with reference to FIGS. 36a and 36b, upon being invoked, the generic application executive at step 310 gives the SIU real time clock a higher priority over any interrupts from the BIU, at step 312 disables all interrupts, and at steps 314 and 316 checks to determine whether a valid store specific application program is stored in the SIU. If no such store specific application program is stored in the SIU, the generic application program at step 320 re-enables all interrupts, at step 322, loads a bad application message into the BIU for future transmission, and then returns processing control of the SIU to the kernel. However, if a valid store specific application program is loaded in the SIU, the generic application executive sets the ISR direction flag and clears the loadout command flag at steps 324 and 326 respectively. With the ISR direction flag set, the SIU kernel passes any interrupt signals that it receives onto the application program; and with the loadout command flag cleared, the SIU will not request any application program from the armament panel.

The generic application executive then sets the inhibit all commands flag at step 330 so that, at least for the time being, weapon related commands are not received by the station; and then at step 332, the generic application executive clears the station select flag, to indicate that this station has not received a station select command. Next, the generic application executive places the weight off wheels flag, the landing gear handle flag, the master arm flag, the armament safety override flag and the fuse value at initial conditions or values at steps 334, 336, 340, 342 and 344 respectively. In particular, the weight off wheels flag is set to indicate that the weight of the aircraft is on its wheels, the landing gear handle flag is set to indicate that the landing gear is down and in position for the aircraft to land, the master arm flag is set to the disable state, the armament safety override flag is set to the disable state, and the fuse flag is set to the safe state. The generic application executive may also be used to set the ground test flag to the disabled state. After these flags are set, the generic application program, at steps 346, 350, 352, 354 and 356 and 358, then determines if a store is present and, if so, what type of store it is. To do this, the generic application program detects the voltage levels of pin D and of the 1760 ID pin. If both of these pins are at a high voltage level, this indicates that no store is present and the generic application executive clears the ISR direction flag and re-enable the interrupts at steps 360 and 362, and, then at step 364, a no store present message is loaded into the BIU for future transmission. If both pin D and the 1760 ID pin are at a low or zero voltage level, this indicates that two stores are present, which is an error. In this case, the generic application executive clears the ISR direction flag at step 366, re-enables the interrupts at step 368, and then, at step 370, a two stores present message is loaded into the BIU for future transmission.

If pin D is at a low or zero voltage level and the 1760 ID pin is at a high voltage level, this indicates that the Walleye II weapon is present at the station. The timer interrupt is enabled, the three phase 115 V AC phase power is applied to the store, the 28 V DC power is applied to the store, and the timer interrupt is disabled at steps 372, 374, 376 and 378 respectively. Also, a generic application flag is set at step 380 to indicate that the Walleye weapon is present, and the Walleye application executive function is invoked at step 382.

If pin D is at a high voltage level and the 1760 pin is at a low or zero voltage level, this indicates that the Walleye Pod is present at the station. The timer interrupt is enabled, a remote terminal address is transmitted to the store, the three phase 115 V AC power and the 28 V DC power are applied to the store, and the timer interrupt is disabled at steps 384, 386, 388, 390 and 392 respectively. The generic executive application then starts a 5.5 second timer, sets the store type flag to indicate that the Walleye Pod is present, and invokes the Walleye pod executive function at steps 394, 396 and 398 respectively.

It should be noted that the real time clock interrupts are enabled to facilitate closing and opening the power switches or relays in the preferred sequence, as well as the timing of solicit message requests to the Pod.

The Walleye weapon application executive program encompasses all of the functions necessary to execute the operation of the Walleye weapon; and, generally, it includes functions to apply power to the weapon, and to process timer interrupts and interrupts from the BIU. With reference back to FIG. 29, this application executive program includes twelve specific functions, referred to as: the Walleye weapon application executive, the Walleye weapon timer interrupt service routine, the Walleye weapon BIU interrupt service routine, power removal, store hung monitor, Walleye weapon jettison, fusing, station select, designate target, CRAB, intent to launch and weapon select.

The Walleye weapon application executive function receives processing control from the generic application executive, and the former application executive controls the Walleye weapon application program and invokes the other functions of this application program as necessary. For example, the Walleye weapon application executive function may periodically invoke a function to monitor the internal power source of the Walleye weapon, and may periodically invoke a function to determine if the store remains present at the station.

Figure 37A:
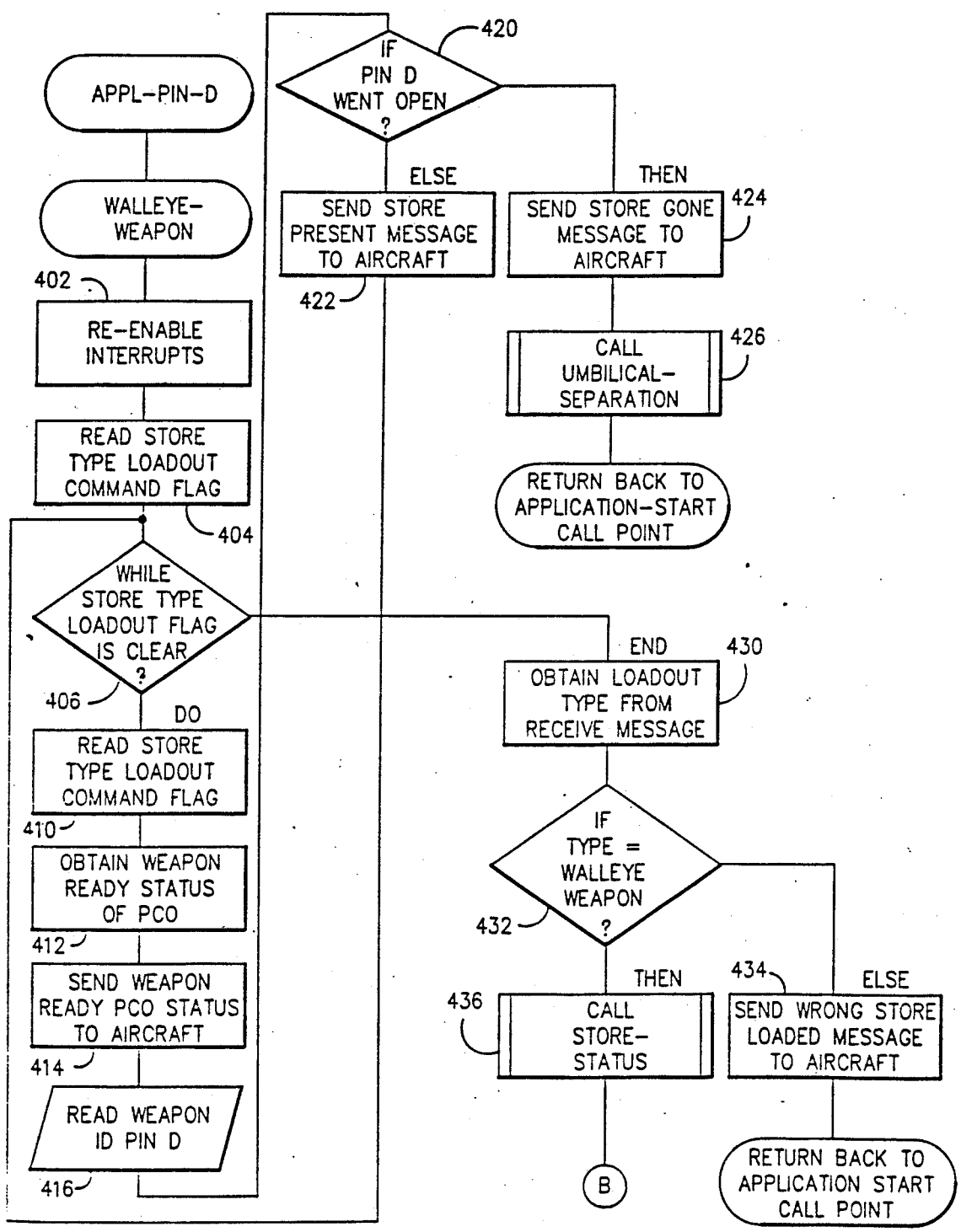
FIGS. 37A and B comprise a flow chart illustrating the operation of the Walleye weapon application executive function.
Figure 37B:
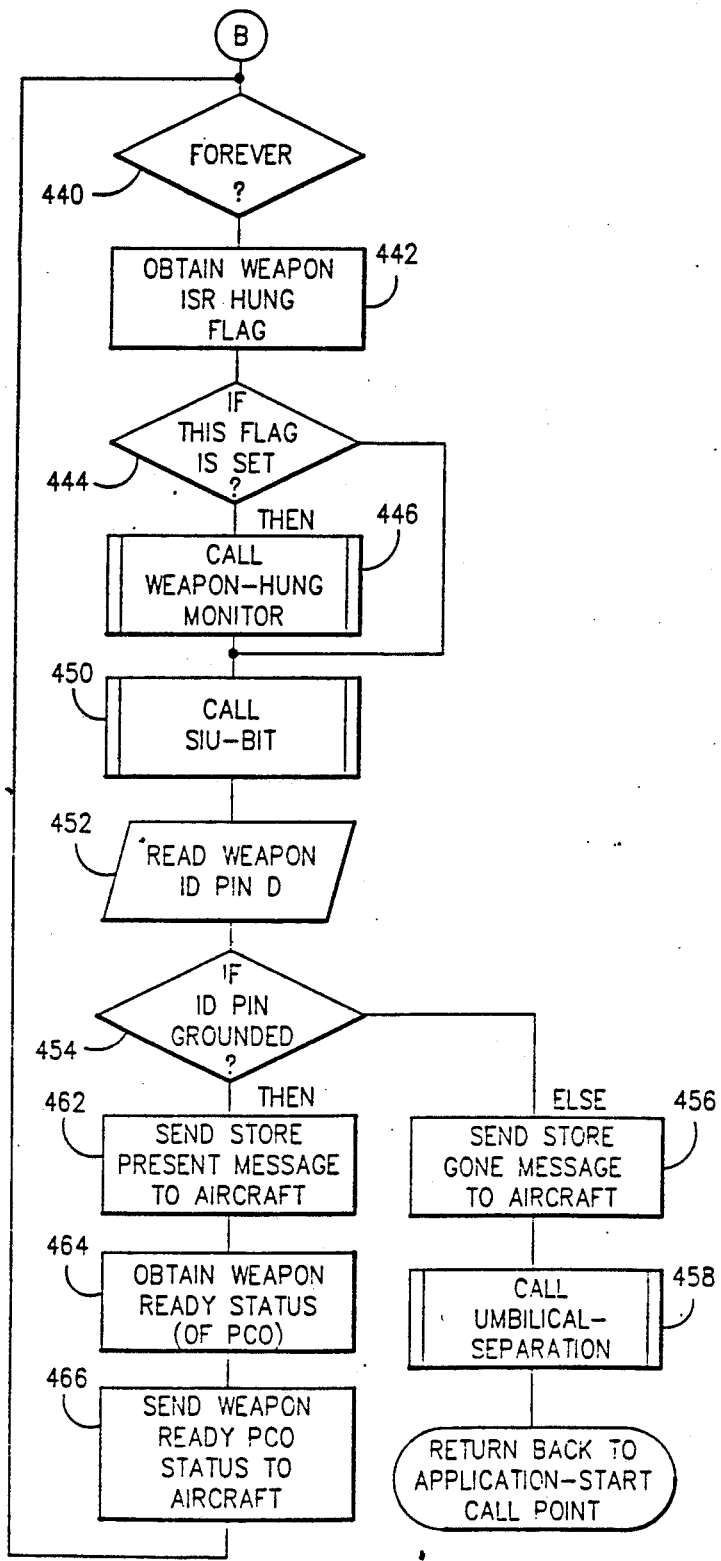

With reference to FIGS. 37a and 37b, the Walleye application executive function re-enables all interrupts at step 402, including the real time clock interrupt and the interrupts from the BIU. Then, at step 404, this application executive monitors for a message from the control station, and this is done by monitoring the load-out command flag, which is set when a message is received from the control station. As long as this loadout flag is clear, which indicates that there is no waiting message from the control station, the Walleye weapon application executive repeatedly monitors, at steps 406, 410, 412, 414, 416, 420, and 422, for the weapon power ready signal and the weapon present signal.

Each time the application executive checks for the weapon power ready signal, the application executive, at step 414, transmits to the control station a signal identifying the status of pin connector P4, thus indicating whether the weapon power ready signal is present. Similarly, each time the application executive monitors the store present signal, a message indicating whether the store is or is not present is transmitted to the control station at step 422 or 424 respectively. In addition, if the store is detected as being gone, the power removal, or umbilical separation function, is invoked at step 426 to remove power to the store; and once this function completes its operation, control of the SIU is returned to the generic application executive.

If a message from the control station is detected as being present in the BIU, the Walleye weapon application executive, at steps 430 and 432, checks the weapon type code or identification in that message to determine if it is the code for the Walleye weapon. If it is not the code for the Walleye weapon, a wrong store loaded message is sent to the control station at step 434 and processing control is returned to the generic application executive. However, if the weapon code in the message matches the Walleye weapon code, the store status function, discussed below, is invoked at step 436. When the store status function completes its operation, processing control returns to the Walleye weapon application executive function; and at step 440, this function enters a loop, referred to as a "forever" loop because it can continue for an indefinite period, in which the application executive function monitors for a hung store for as long as the weapon present signal is present.

In particular, at steps 442 and 444, the application executive checks the weapon hung flag. If this flag is set, indicating that the weapon is hung, the weapon hung monitor function, discussed below, is invoked at step 446; and after the weapon hung monitor function is completed, the application executive function moves to step 450, which is to invoke the SIU BIT function. If, at step 444, the weapon hung flag is clear, indicating that the store is not hung, the executive application function skips step 446 and proceeds directly to step 450 to invoke the SIU BIT function.

After the SIU BIT function is completed, the application executive function also monitors the store present signal and the weapon power ready signal. More specifically, at steps 452 and 454, the weapon present signal is checked. If this signal is not present, a weapon gone signal is sent to the control station at step 456, the umbilical separation function is invoked at step 458, and once this function is completed, processing control returns to the generic application executive function. If, however, at step 454, the weapon present signal is present, a message to that effect is sent to the control station at step 462. Then, the weapon power ready signal is checked, and a message indicating the status of that signal is sent to the control station at steps 464 and 466 respectively. From step 466, the application executive returns to step 440, and continues on from there until the weapon present signal indicates that the weapon is gone.

Figure 38:
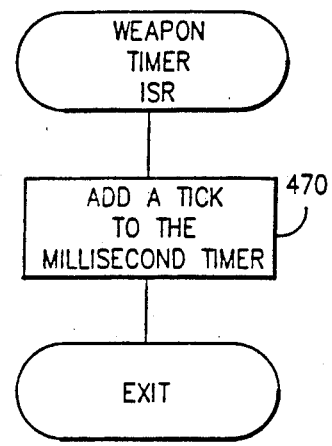
FIG. 38 is a flow chart illustrating the operation of the Walleye weapon timer interrupt service routine function.

The Walleye weapon timer interrupt service routine maintains a time count for the Walleye weapon application. With reference to FIG. 38, this timer interrupt service obtains the current value of the time count from the BIU millisecond timer, and at step 470 increments this value by one each millisecond.

The Walleye weapon BIU interrupt service routine interprets and processes the control messages received from the control station, and then invokes the specific functions requested or required by these control messages. Generally, this routine checks to be sure that a received message is the proper type for a Walleye weapon, and includes a proper loadout code; and then the routine invokes the specific function required by the loadout code, which may be the station select, the selective jettison, the fuze selection, the designate target, the CRAB, the intent to launch, or the weapon select functions.

Figure 39B:
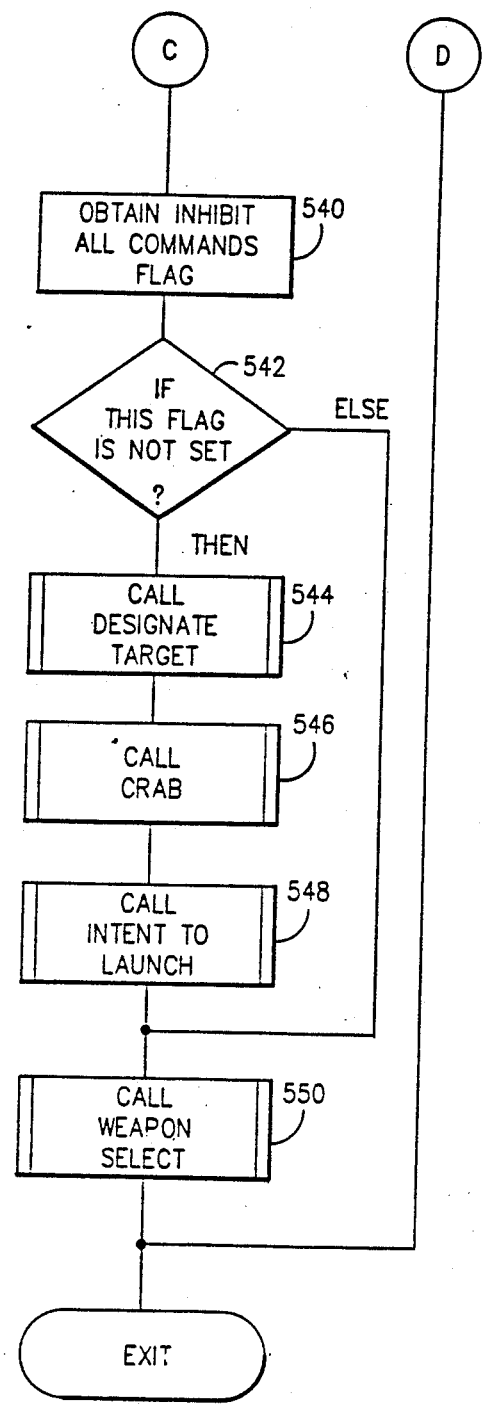
FIGS. 39A and B comprise a flow chart outlining the operation of the Walleye weapon bus interface unit interrupt service routine.

More specifically, with reference to FIGS. 39a and 39b, when invoked by means of an interrupt signal from one of the BUIs, the BIU interrupt service routine, at steps 500 and 502, checks the status of the interrupting BIU. If this status is other than a remote terminal, the interrupt service routine terminates. If the status of the interrupting BIU is a remote terminal, the BIU interrupt service, at steps 504 and 506, then checks the subaddress of the received message. If this subaddress is not the subaddress for a Walleye weapon control message, the program skips to step 508, a store mismatch message is sent to the control station, and then the interrupt service routine terminates.

If, at step 506, the subaddress is that of a Walleye weapon control message, the program proceeds to step 510, and the subaddress is checked to determine if it is the subaddress of an R24 message. If it is not, the program terminates. If the message is an R24 message, the loadout word is obtained from the message, the loadout data is placed in the SIU RAM, and the loadout present flag is set at steps 512, 514 and 516 respectively. Next, at steps 518, 520 and 522 respectively, the weapon safety flag words are obtained from the R24 message, these flag words are placed in the SIU RAM, and the status message handshake flag is set to indicate that a message has been received from the control station. Then, at step 524, the station select function, described below, is invoked; and when the station select function is completed, the jettison enable flag word of the received R24 message is checked at step 526. If this flag word indicates that jettison is permitted, then the weapon selective jettison function is invoked at step 532; and when this function is completed, the BIU interrupt service routine terminates.

If, though, at step 530, the jettison flagword does not indicate that jettison is permitted, the fuse value is obtained from the R24 message word at step 534, and the fuse select function is invoked at step 536. When this function is completed, the inhibit all commands flag is checked at steps 540 and 542. If, the inhibit all commands flag is not set, then the designate target, the CRAB, the intent to launch and the weapon select functions are invoked in this order at steps 544, 546, 548, and 550 respectively, with each of the latter three functions being invoked when the immediately preceding function has been completed. If, however, at step 542 the inhibit all commands flag is set, the program skips to step 550 and invokes the weapon select function. After the weapon select function ends, the BIU interrupt service itself terminates.

Figure 40:
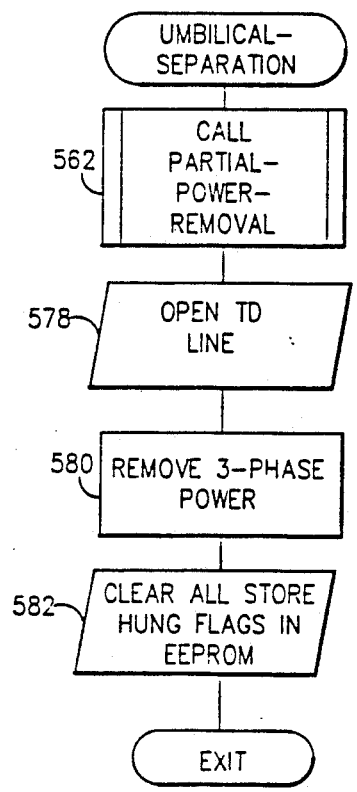
FIG. 40 is a flow chart showing the operation of the Walleye weapon umbilical separation routine.
Figure 41:
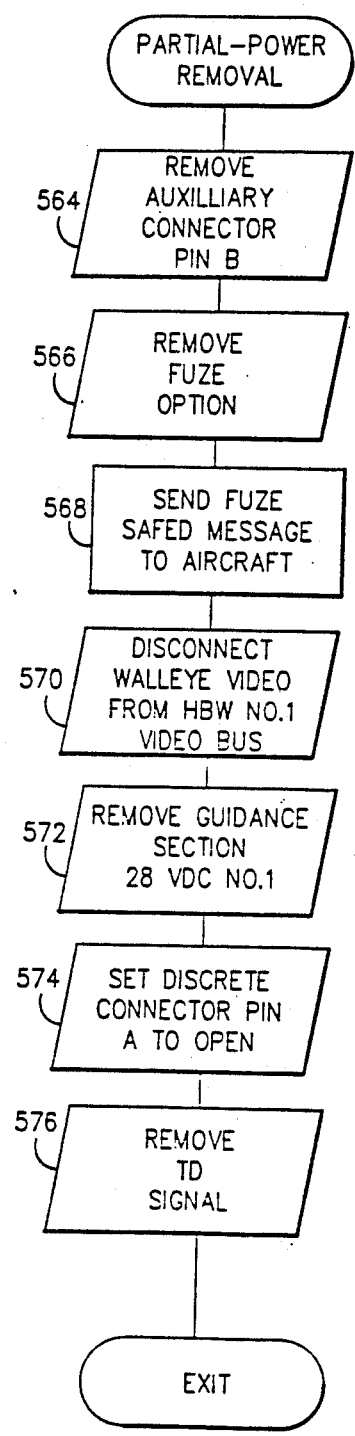
FIG. 41 is a flow chart outlining the operation of the Walleye weapon partial power removal routine.

The umbilical separation, or power removal, function is provided to remove all power applied to the store With reference to FIG. 40, the first step 562 of this function is to invoke a sub function, referred to as partial power removal. With reference to FIG. 41, when this sub function is invoked, it removes the intent to launch signal to the weapon at step 564, the fuze line is then opened at step 566 so that the fuze power cannot be conducted to the weapon, and a fuze safe message is sent at step 568 to the control station to indicate that the fuse connection is open. Then at steps 570, 572 and 574 respectively, the partial power removal function opens the lines leading to pins P6 and P7 to disconnect the Walleye video signal from the video bus, removes the external power supply to the weapon guidance section, and opens the line leading to pin P8 to prevent the CRAB signal from being applied to the weapon. The target designate signal to the weapon is terminated at step 576, so that, if the weapon is connected to the station, the weapon video camera is locked in its current position; and after this, control is returned to the power removal function. The power removal function opens the target designate signal line at step 578, opens the AC power lines at step 580; and then at step 582, the function clears all of the store hung flags in the SIU memory.

The weapon hung monitor function, generally, monitors the status of the weapon whenever it has been detected as being hung, which is defined as a condition existing after an attempt has been made to release the weapon, either by means of the intent-to-launch function or the weapon jettison function, and the weapon fails to leave the aircraft. Once a hung condition has been detected, the weapon hung monitor function normally monitors the status of the weapon for as long as the weapon remains attached to the aircraft.

Figure 42:
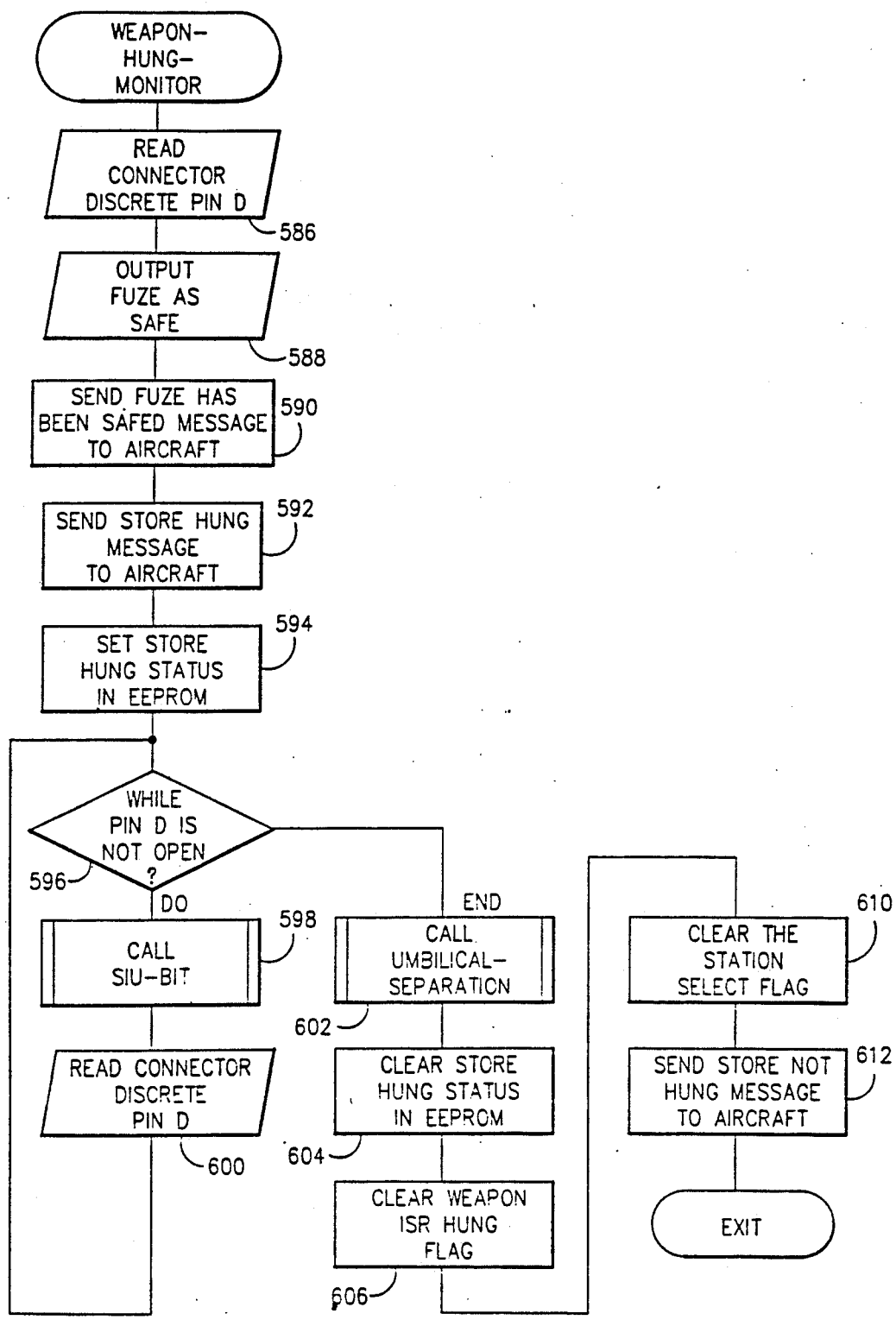
FIG. 42 is a flow chart of the Walleye weapon hung monitor function.
Figure 43B:
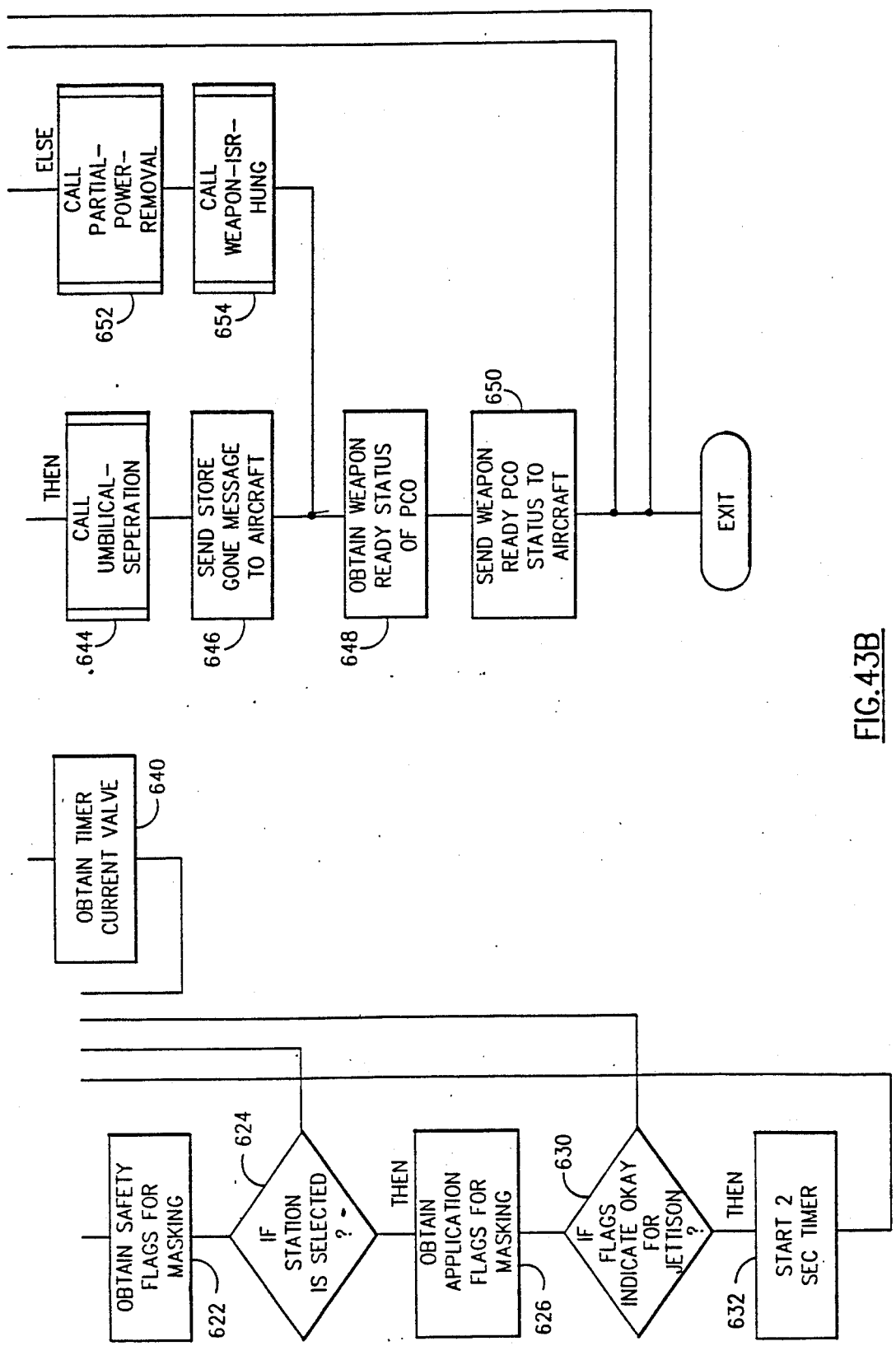
FIG. 43, which consists of FIGS. 43A and 43B, is a flow chart of the Walleye weapon selective jettison function.

With reference to FIG. 42, at step 586, this function determines the voltage level of connector pin P1 to determine if the weapon, is still attached to the aircraft; and the output fuze is safed and a fuze safed message is sent to the control panel, at steps 588 and 590 repectively. Also, a store hung message is sent to the control station and the store hung flag is set in the SIU memory, at steps 592 and 594 respectfully.

As represented by steps 596, 598 and 600, as long as connector pin P1 is at a low or ground voltage level, the weapon hung monitor function regularly invokes the SIU BIT to continue the fault tolerance functions of the station. Once connector pin P1 is detected as being open, indicating that the weapon has left the aircraft, the umbilical separation function is invoked at step 602. After the umbilical sepration function is completed, at steps 604, 606, 610 and 612 respectively, the store hung flag in the SIU memory is cleared, the weapon ISR hung flag in the BIU is cleared, the station select flag is cleared, and a store not hung message is sent to the control station. After this message is sent, the weapon hung monitor function ends, and processing control returns to the generic application executive function.

When the weapon selective jettison function is invoked, the current selected fuse option is safed at steps 616 and 618, and a fuse safe message is sent to the control station at step 620. After this, at steps 622 and 624, the safety flags for the station are checked. If the station has not received the station select command, the weapon selective jettison function ends. However, if the station has received the station select command, then the application flags are checked at steps 626 and 630.

For the weapon selective jettison function to proceed, two conditions must exist. The first of these conditions is that the armament safety override switch and the master arm switch are both enabled. The second of these conditions is that the master arm switch is enabled, the aircraft weight off wheels flag is set, and the landing gear handle flag is set (indicating that the landing gear is up). If either one of these conditions does not exist, the weapon selective jettison function terminates.

However, if both of these conditions are present, the jettison function starts a two second timer at step 632; and, during this time period, at steps 634, 636, 638 and 640, the function monitors the connector pin P1 for the weapon present signal. If the weapon present signal ends during this two second period, as represented by step 642, the umbilical separation function is invoked at step 644 to terminate power to the connector. Once this umbilical separation function is finished, a store gone message is sent to the control station at step 646. Then the status of the weapon power ready signal is determined at step 648, a message identifying this status is sent to the control station at step 650, and then the weapon selective jettison function itself finishes. If, however, at step 642, the weapon present signal is still present at the end of the above-mentioned two second time period, then the weapon is considered to be hung. The partial power removal function is invoked at step 652; and, thereafter, the weapon hung function is invoked at step 654. After these two functions are finished, the weapon selective jettison function proceeds to step 648 and continues on from there.

The fuze select function is provided to maintain a fuze mode variable that indicates the fuse mode to be selected when a Walleye weapon intent to launch signal is conducted to the weapon. This fuze mode variable is set to zero during initialization of the SIU and by the generic application executive function, and this variable may be set by the fuse select function in response to fuse function commands received from the control station.

The fuze select function is invoked whenever a fuze function command is received via the system data bus; and when invoked, as illustrated in FIG. 44, this function, at step 660, checks the inhibit all commands flag. If this flag is set, the fuze select function ends. If the inhibit all commands flag is not set, the fuze select function then checks the weapon safety flags at step 662. To proceed further, as represented by step 664, the following conditions must be met: the armament safety override flag must be set, the master arm flag must be set, the aircraft weight off wheels flag must be set and the landing gear handle flag must be set. If one of these conditions is not present, the fuze select function terminates. However, if all of these conditions are present, the fuze select function, at steps 666 and 668, obtains the fuze selection status from the R24 command message, and writes this fuze status into the SIU memory, over the fuze mode value previously stored therein.

Generally, the station select function is provided to process station select and deselect commands from the control station. With reference to FIG. 45, when invoked, the station select function, at steps 670 and 672, checks the station select bit or word, of the most recent R24 message transmitted to the station. If this bit is not a station select command, then at steps 674 and 676, the station select flag is cleared, and the signal line to connector pin P5 is opened so that the guidance section energize signal cannot be transmitted to the weapon. Then, at step 680, the line to pin P6 is opened to disconnect the Walleye weapon from the high band width video line; and after this, the function terminates. If, however, the station select bit of the most recent R24 message is a station select command, then the station select flag is set at step 682, and at steps 684 and 686, the lines to pins P5 and P6 are closed to connect the Walleye, respectively, to the power for the guidance section and to the high band width video line. After these two lines are closed, the station select function terminates.

The designate target function is provided to process a designate target signal enable or disable command from the control station, and in particular, when appropriate to apply or remove the 28 V DC target designate signal to the weapon via connector pin P3. More specifically, with reference to FIG. 46, when invoked, the designate target function at steps 688 and 690, checks to determine if the station has received the station select command; and this can be done by checking to determine if the weapon guidance section energize signal is being applied to the store, and to determine if the weapon is connected to the high band width video line. If the station has not received the station select command, the designate target function terminates. If the station has received that command, though, the designate target function, at steps 692 and 694, checks the designate target bit of the R24 message. If this bit indicates enable or disable, the target designate signal is applied to or removed from the weapon, at steps 696 or 698 respectively; and after this is done, the designate target function terminates.

Figures 47, 49:
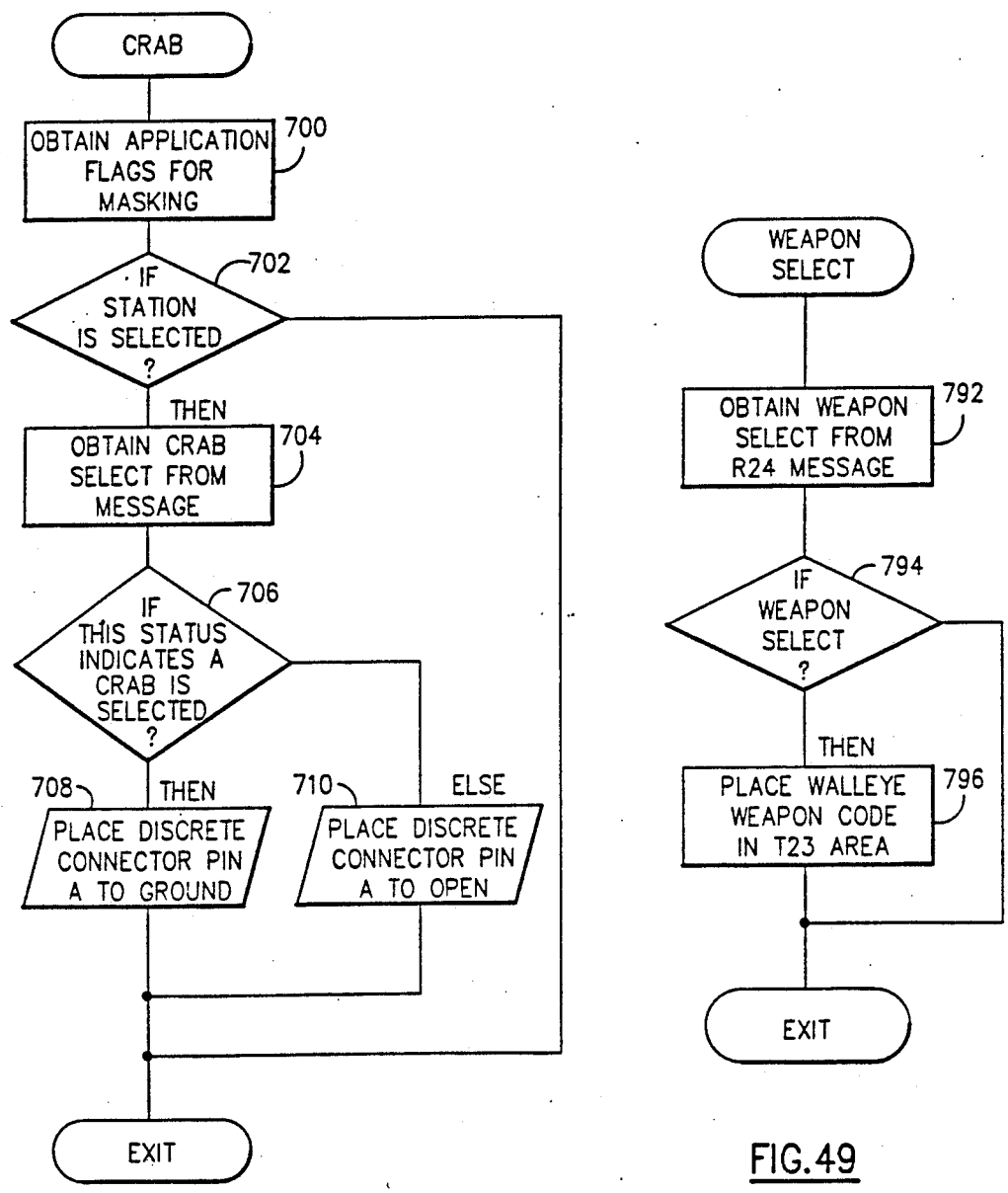
FIG. 47 is a flow chart outlining the operation of the Walleye Weapon CRAB function.
FIG. 49 is a flow chart showing the Walleye weapon select function.

The CRAB function is provided to process a CRAB enable or disable command from the control station, and in particular, when appropriate, to provide a high voltage level or a zero voltage level to connector pin P8. As illustrated in FIG. 47, when invoked, the CRAB function at steps 700 and 702, checks to determine if the station has received the station select command; and this is done by checking to determine if the weapon guidance section energize signal is being applied to the store and if the weapon is connected to the high band width video line. If the station has not received the station select command word, the CRAB function terminates. If the station has received that command, however, the CRAB function, at steps 704 and 706, checks the CRAB bit, or word, of the most recent R24 message received by the station. If this bit indicates that the CRAB function should be enabled, a zero voltage level is applied to pin P8 at step 708; while if the CRAB bit indicates that the CRAB function is to be disabled, a positive voltage level is applied to pin P8 at step 710. After this, the CRAB function terminates.

Figure 48A:
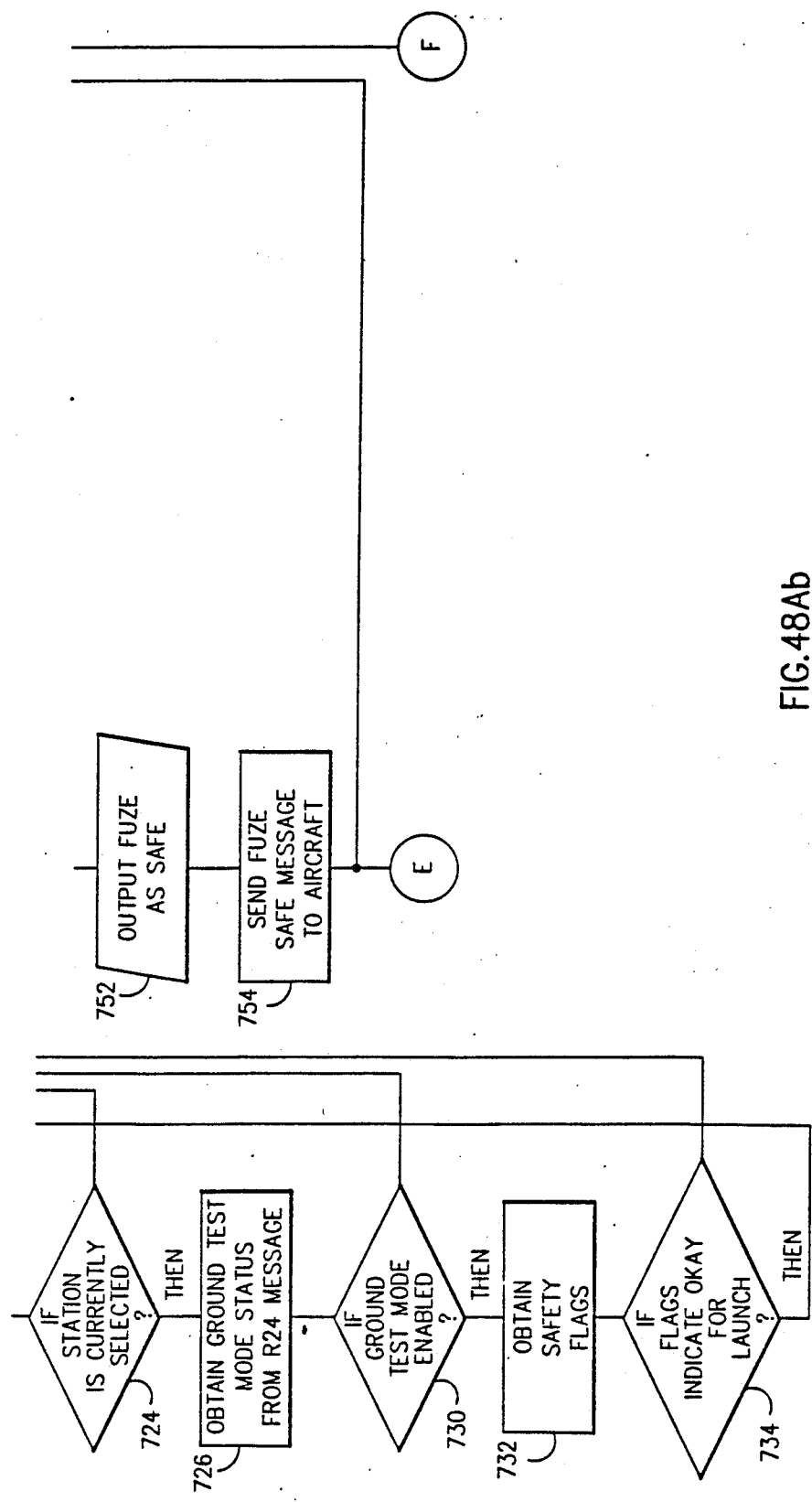
FIG. 48A, which consists of FIGS. 48Aa and 48Ab, and FIG. 48B, which consists of FIGS. 48Ba and 48Bb, comprise a flow chart outlining the Walleye weapon intent to launch function.
Figure 48B:
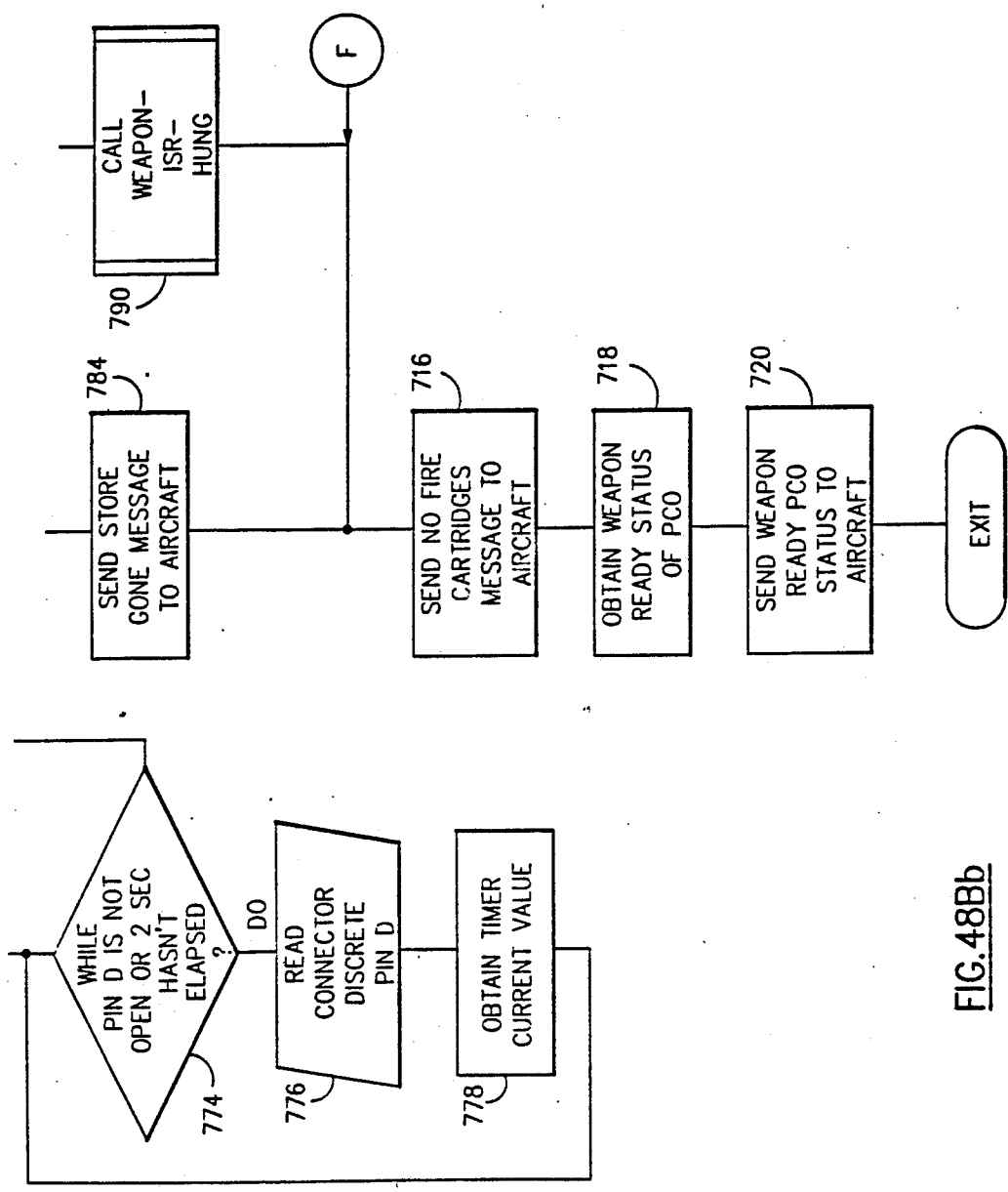

The intent to launch function performs the actions that launch the Walleye Weapon from the aircraft. As illustrated in FIGS. 48a and 48b, when invoked, at steps 712 and 714, the function checks the intent-to-launch bit in the most recent R24 message received by the station. If this bit does not indicate that the intent to launch signal should be enabled, the function proceeds to step 716. A no fire cartridges message is sent to the control station; and then at steps 718 and 720, the weapon power ready signal is checked, and a signal identifying the status of that power signal is sent to the control station. However, if at step 714, the intent-to-launch flag indicates that the signal should be enabled, then the intent-to-launch function, at steps 722 and 724, checks the application flags to determine if the station select command has been received. If this command has not been received, the function proceeds to steps 716, 718 and 720 and then terminates. If the station select command has been received, though, the intent to launch function, at steps 726 and 730, checks the ground test bit flag. If this flag is set to the disable position, the intent to launch function proceeds to steps 716, 718 and 720 and then terminates. If the ground test mode flag is set to enable, the intent-to-launch function then checks the aircraft safety flags at steps 732 and 734.

To continue, the following conditions must be met: the master arm switch must be set, the armament safety override switch must be set, the aircraft weight off wheels flag must be set, and the landing gear handle up flag must be set. If one of these conditions is not present, the intent to launch function proceeds to steps 716, 718 and 720 and then terminates. However, if all of these conditions are present, then the intent-to-launch signal is transmitted to the weapon, and a two second time period is started, at steps 736 and 738 respectively. Also, as represented by steps 740, 742, 744, 746, 748, 750, 752 and 754, the fuse value, whether it is safe, instantaneous or delay, is transmitted to the weapon, and a message identifying the transmitted fuse value is sent to the control station.

At step 756, the intent to launch signal function monitors the voltage level of connector pin P1, which indicates whether the weapon is present; and at step 758, the intent-to-launch signal enters a loop comprised of steps 758, 760 and 762, in which it also monitors for the commit-to-launch signal from the weapon. As represented by step 764, the function exits this loop at the end of the above-mentioned two second period, or when the commit-to-launch signal has been received from the weapon. If, when the function exits this loop, the commit-to-launch signal is not present, the partial power removal and weapon hung functions are invoked at steps 766 and 768 respectively, and when these functions are completed, the intent to launch function proceeds to steps 716, 718 and 720, and then ends.

If the commit-to-launch signal is present when the function exits the above-mentioned loop, a fire cartridge message is sent to the control station at step 770, the intent to launch function continues to monitor connector pin P1, and at step 774, the intent-to-launch function enters a second loop, comprising steps 774, 776 and 778. The function remains in the second loop until either the above-mentioned two second period ends, or the connector pin P1 is sensed to be open or at a high voltage level. When the function exits this loop, it moves on the step 780. If the function exits the second loop because connector pin P1 is detected as going open, all power is removed from the weapon by invoking the umbilical separation function, and then a store gone message is sent to the control station at steps 782 and 784 respectively; and after this, the function continues on to steps 716, 718 and 720 and then ends. However, if, when the intent-to-launch function exits the above-mentioned second loop, the connector pin P1 is at ground, then the weapon is considered to be hung. The partial power removal function and then the weapon hung functions are invoked at steps 786 and 790 respectively; and after these functions are completed, the intent-to-launch function performs steps 716, 718 and 720 and then ends.

The weapon select function is provided to send the weapon identification, or code, of the weapon attached to the station to the control station. With reference to FIG. 49, when invoked, this function checks the weapon select flag of the most recent R24 message at steps 792 and 794. If this flag is at a low or zero value, the weapon select function terminates. However, if the weapon select flag is set, or at a high value, the weapon identification or code is obtained from the weapon attached to the station, and that code is sent to the control station in the next T23 message from the BIU, as represented by step 796. After this code is sent, the weapon select function terminates.

The Walleye pod application program encompasses all of the functions necessary to execute the operations of the Walleye Pod; and, generally, this application program includes functions to apply power to the Walleye Pod and to process timer interrupts and interrupts from the BIU. This application program includes ten specific functions, referred to as: the Walleye pod application executive, the Walleye Pod timer interrupt service routine, the Walleye Pod BIU interrupt service routine, power removal, station select, pod encode, pod data refresh, pod status request, pod hung monitor, and jettison.

The Walleye Pod application executive function receives processing control from the generic application executive after the latter executive has detected the presence of the Walleye Pod at the station; and generally, the Walleye Pod application executive function controls the Walleye Pod application program and invokes the other functions of this application program as necessary. For example, the Walleye Pod application executive may invoke a function to determine whether the Pod remains at the station and may periodically, temporarily pass control of the SIU back to the kernel to conduct SIU BITs. The Walleye Pod application executive also responds to commands and status requests transmitted to the SIU from the control station, and acts as a bus controller to transmit commands and status requests to the Walleye Pod over the store bus.

With reference to FIGS. 50a–d, when invoked, the Walleye Pod application executive first confirms that the Walleye Pod is present, at steps 800 and 802, by checking the voltage level of pin P13, which is commonly referred to as the 1760 interlock pin. If this pin is at a high voltage level, which indicates that the Pod is not present, the application executive function, at steps 804 and 806, sends a store gone message to the control station, and then invokes the pod umbilical separation function, discussed below. When this separation function is completed, the Walleye Pod application executive function returns processing control to the generic application executive function. If, however, at step 802, the 1760 interlock pin has a zero voltage level, which indicates that the Walleye Pod is still present, a store present message is sent to the control station at step 808, and then various words and flags are set to initial conditions at steps 810, 812, 814 and 816. Specifically, the initial control and operand words in the BIU bus control file are set to initial safe conditions, the 1760 initialization flag is set, the store bus preference flag is set, and the bus retry counter is set to zero. After this, the solicit pod function, discussed below, is invoked at step 820; and when this function is completed, the store mismatch flag and the 1760 solicit response flags are cleared at steps 822 and 824 respectively.

Next, the Walleye Pod Application Executive enters a first loop; and each 300 milliseconds, this Application Executive sends to the store a request for the store identity code. The Walleye Pod Application Executive remains in this first loop until either a response is received from the store, a 5.5 second time period elapses, or the 1760 pin is detected as being open. In particular, at step 826, a 5.5 time second period is started; and then at step 828, a 300 millisecond time period is started. Immediately following the start of this latter time period, the bus select and solicit pod functions are invoked at steps 830 and 832 respectively; and after these functions are complete, the state of the BIU is checked at step 834. If the BIU remains in the bus control state, the program returns to step 826 and continues on from there. If, at step 834, the BIU is in the remote terminal state, then the tenth status word of the BIU message is read at step 836. If this word is not a pod terminal address, the function check the 1760 interlock pin status at step 840, then returns to step 826 and continues on from there. If, the tenth status word of the BIU message is a pod terminal address, the 1760 message present flag is set at step 842 to indicate that a message has been received from the store.

When the Walleye Pod application executive function exits the loop between steps 826 and 842, what happens next is determined by the reason why the function exited this loop. If the function exits the loop because the 1760 pin was detected at a high voltage level, as represented by step 844, a store gone message is sent to the control station at step 846, the pod umbilical separation function is invoked at step 848; and after this separation function is completed, processing control is returned to the generic application executive. If the Walleye Pod application executive exits the above-mentioned first loop because the 5.5 second time period elapsed, as represented by step 850, then at step 852, a message is sent to the control station indicating that there was no response from the Walleye Pod, and the pod umbilical separation function is invoked at step 854. After this separation function is completed, processing is returned to the generic application executive function.

If the Walleye Pod application executive function exits the loop between steps 826 and 842 because a message was received from the Walleye Pod, that message is checked at step 856 to determine if it contains a pod identification code. If the message does not contain a pod identification code, a message is sent to the control station indicating that the wrong store is at the station, and the umbilical separation function is invoked at steps 858 and 860 respectively. After this separation function is completed, processing control is returned to the generic application executive.

If, though, at step 856, the message contains a pod ID code, the Walleye Pod executive function proceeds to step 862. At steps 862, 864 and 866, the 1760 initialization flag is cleared, the station select flag is cleared, and the pod data refresh function, discussed below, is invoked, respectively. After the pod data refresh function is completed, the real time clock and BIU interrupts are re-enabled at step 868, and the 1760 pin is again checked at steps 870 and 872. If that pin has gone to a high voltage level, a store gone message is sent to the control panel at step 874, and the pod umbilical separation function is invoked at step 876; and after this function is completed, processing control is returned to the generic application executive function. If, at step 872, the 1760 connector pin is still at a ground voltage level, a store present message is sent to the control station at step 878, and the pod status request function is invoked at step 880. After the pod status function is completed, the T23 message update flag, the T23 message monitor flag, the 600 millisecond counter, and the bad message received counter are all cleared or reset to zero values at steps 882, 884, 886 and 888 respectively, Next, the Walleye Pod application executive function enters a second loop, in which various other functions are repeatedly invoked until either the store mismatch flag becomes set or the store leaves the station. In particular, at step 890, the store mismatch flag is checked. If this flag is clear, the store hung flag is checked at steps 892 and 894. If this latter flag is set, the pod hung monitor function is invoked, and then the check solicit pod function is invoked at steps 896 and 898 respectively If at step 894, the store hung flag is clear, step 896 is skipped, and the Walleye Pod application executive program proceeds to step 898 and invokes the check solicit pod function.

After the check solicit pod function is completed, the SIU BIT function is invoked at step 900; and after this latter function is completed, the 1760 interlock pin is checked at steps 902 and 904. If this pin remains at a zero voltage level, a store present message is sent to the control station at step 906, and the pod executive application program returns to step 890 and continues on from there.

The Pod executive application program exits the loop between steps 890 and 906 if either the store mismatch flag becomes set, or the 1760 interlock pin is detected as being open. In the former case, a store mismatch message is sent to the control station at step 910, and the pod umbilical separation function is invoked at step 912; and after this function is completed, processing control is returned to the generic application executive function. If the Walleye Pod application executive exits the above-mentioned loop because the 1760 interlock pin became open, a store gone message is sent to the control station at step 914, and the pod umbilical separation function is invoked at step 916; and after this separation function is completed, processing control is returned to the generic application executive function.

Figure 50A:
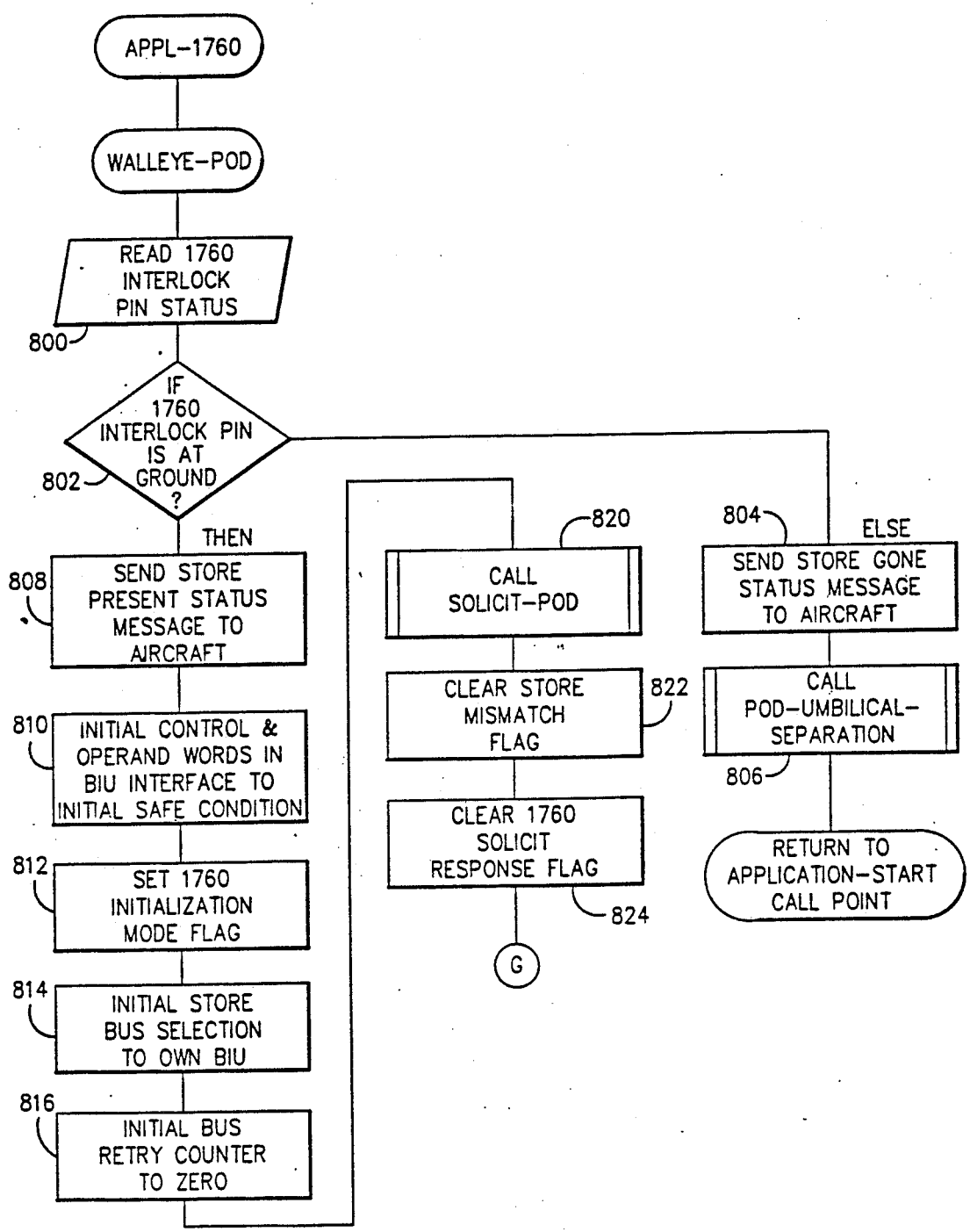
FIGS. 50A comprises a flow chart showing a part of the Walleye Pod application executive routine.
Figure 50B:
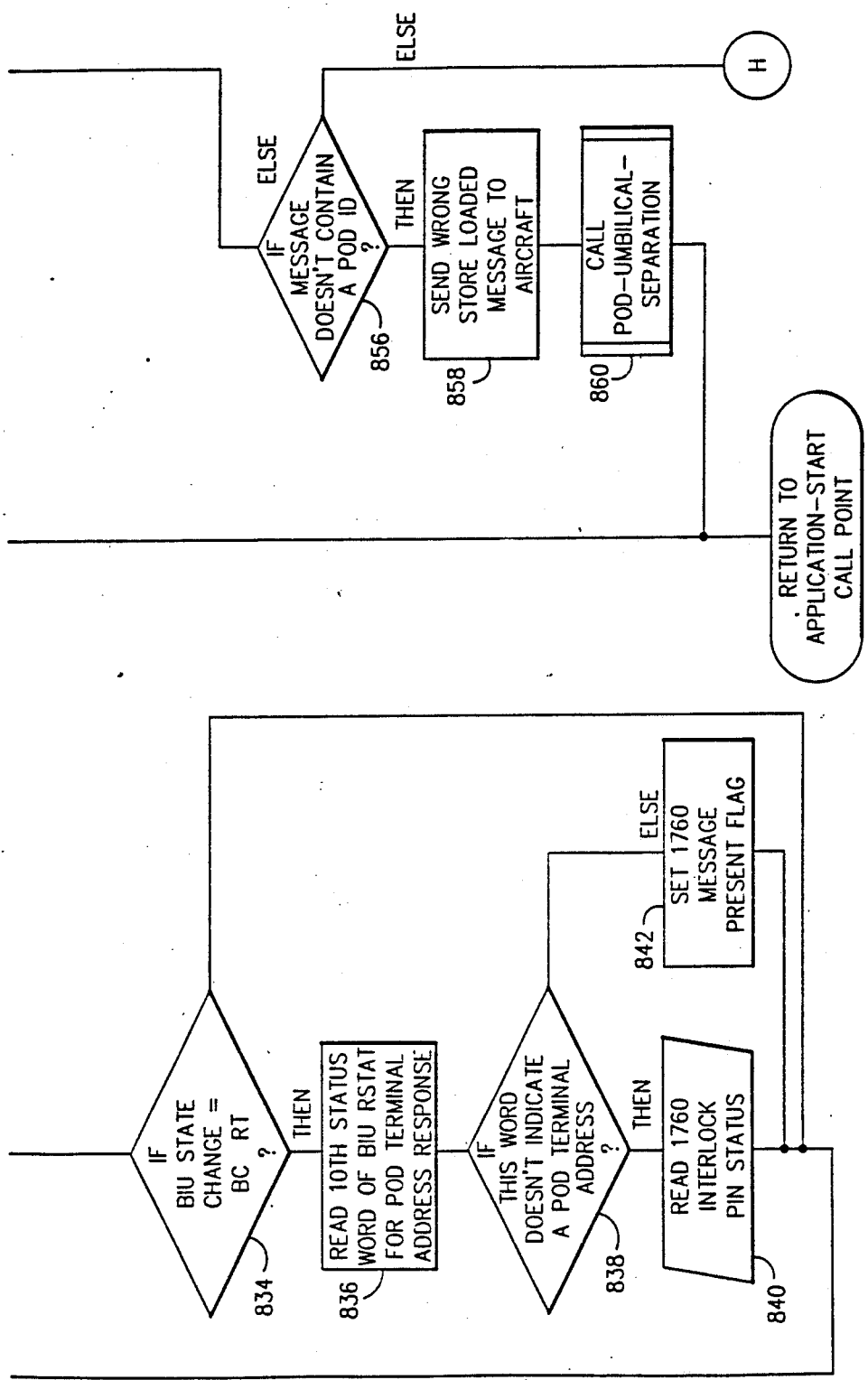
FIG. 50B, which consists of FIGS. 50Ba and 50Bb, comprises a flow chart showing another part of the Walleye Pod application executive routine.
Figures 50C, 51:
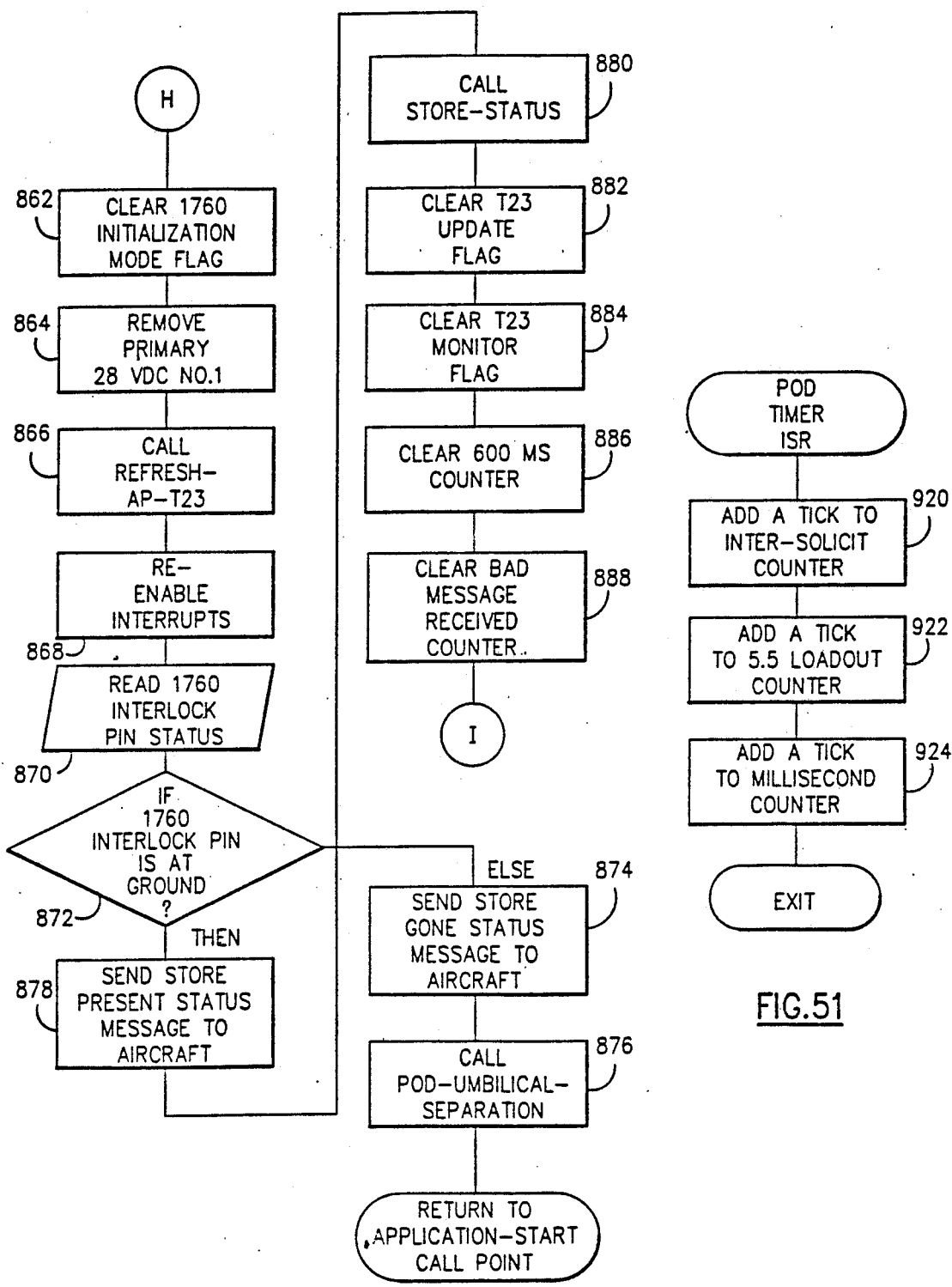
FIGS. 50C and 50D are flow charts showing still further parts of the Walleye Pod application executive routine.
FIG. 51 is a flow chart showing the Walleye Pod timer interrupt service routine.
Figure 50D:
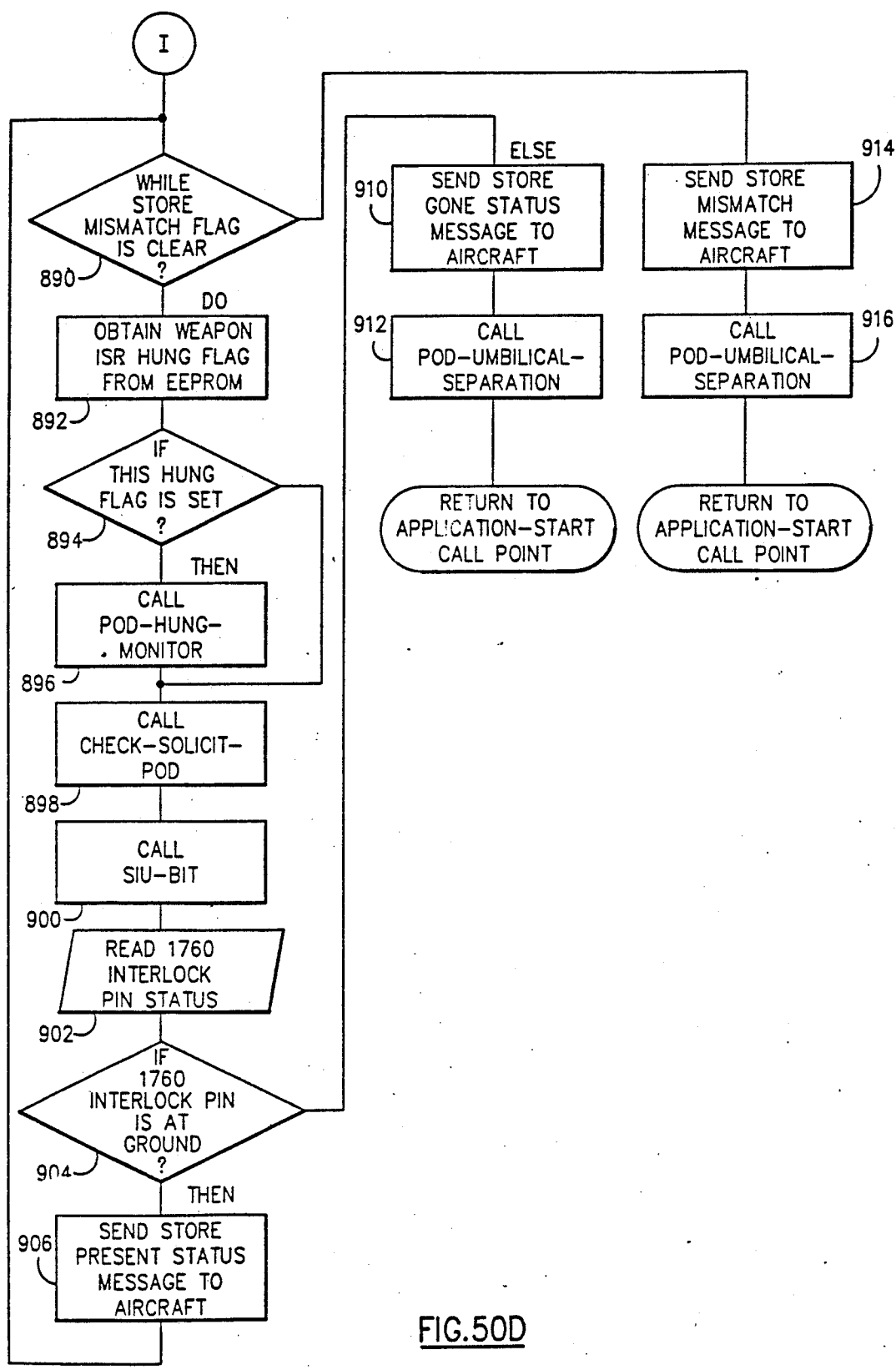
Figure 52:
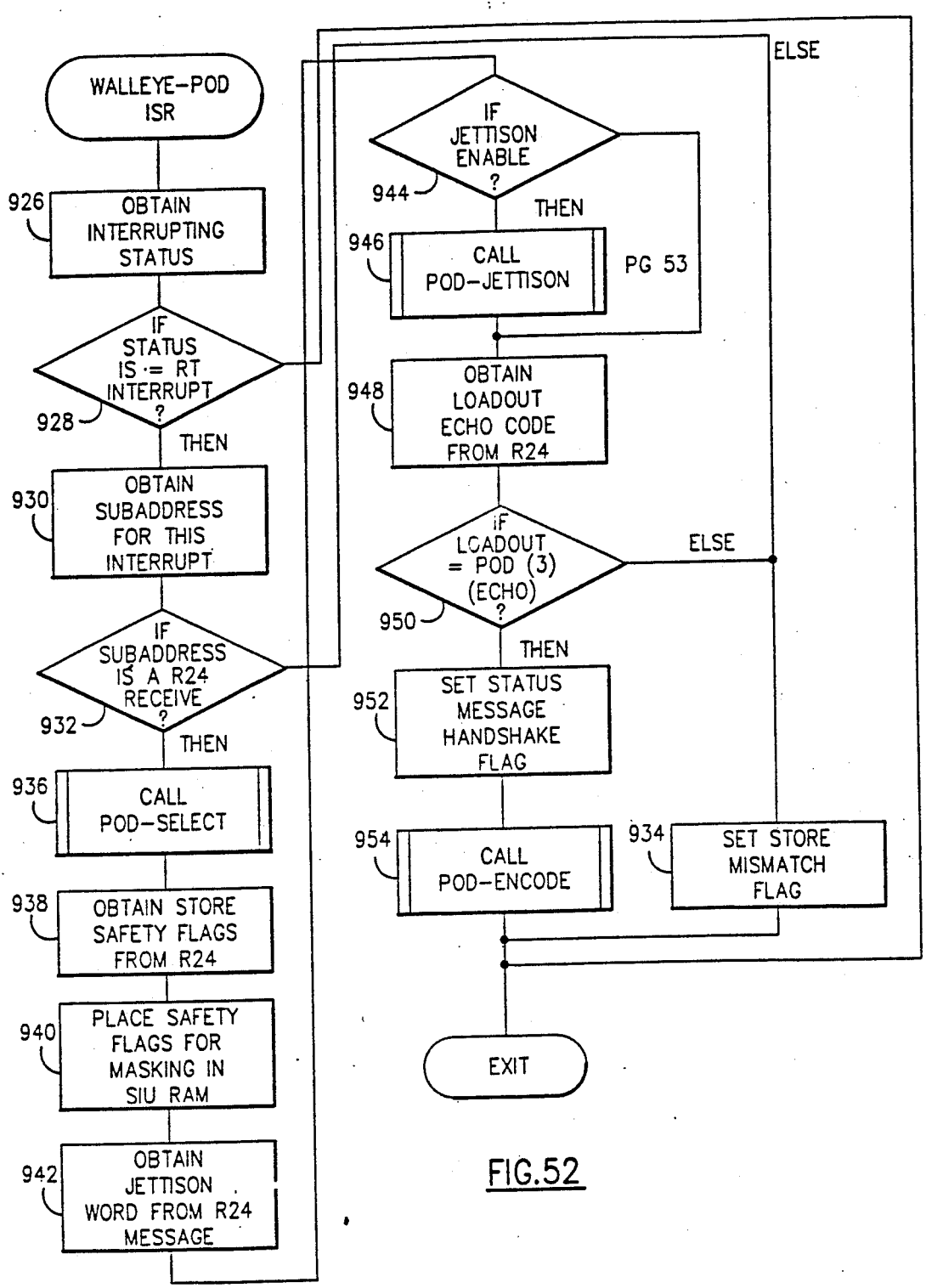
FIG. 52 is a flow chart showing the operation of the Walleye Pod interrupt service routine function.

The Walleye Pod timer interrupt service routine is provided to maintain three separate counters that keep track of three time periods. The first of these time periods is referred to as an intersolicit period, the second of these time periods is the above-mentioned 5.5 second time period, and the third time period is a general purpose timer. As represented in FIG. 51, the timer interrupt service routine obtains the value of each of the above-mentioned timers, increments these values by one each millisecond at steps 920, 922 and 924 respectively, and then saves the new time values.

The Walleye Pod BIU interrupt service routine interprets and processes control messages received from the control station, and then invokes the functions requested or required by those control messages. When the Walleye Pod BIU interrupt service routine function is invoked, it determines the status of the interrupting BIU at steps 926 and 928. If the status of this BIU is not that of a remote terminal, the interrupt service routine terminates. If the interrupting BIU is operating as a remote terminal, the interrupt service routine then checks, at steps 930 and 932, the subaddress for this particular interrupt. If this subaddress is not that of an R24 message, then the store mismatch flag is set at step 934, and the Interrupt Service Routine terminates. If the subaddress of the received interrupt is that of an R24 message, the pod select function is invoked at step 936; and after this function is completed, the store safety flags are obtained from the R24 message and placed in the SIU memory unit at steps 938 and 940 respectively.

Next, the jettison flag in the R24 message is checked at steps 942 and 944. If this flag is set, the pod jettison function is invoked at step 946, and then the load-out echo code word in the R24 message is checked at steps 948 and 950. If, at step 944, the jettison flag is clear, step 946 is skipped, and the program proceeds directly to step 948 and checks the load out echo code word of the R24 message. If the load out echo code is not proper, then the store mismatch flag is set at step 934 and the Interrupt Service function terminates. If the load out code is proper, then the status message handshake flag is set at step 952, and the pod encode function is invoked at step 954; and when the pod encode function is completed, the Interrupt Service Routine terminates.

Figures 53, 57:
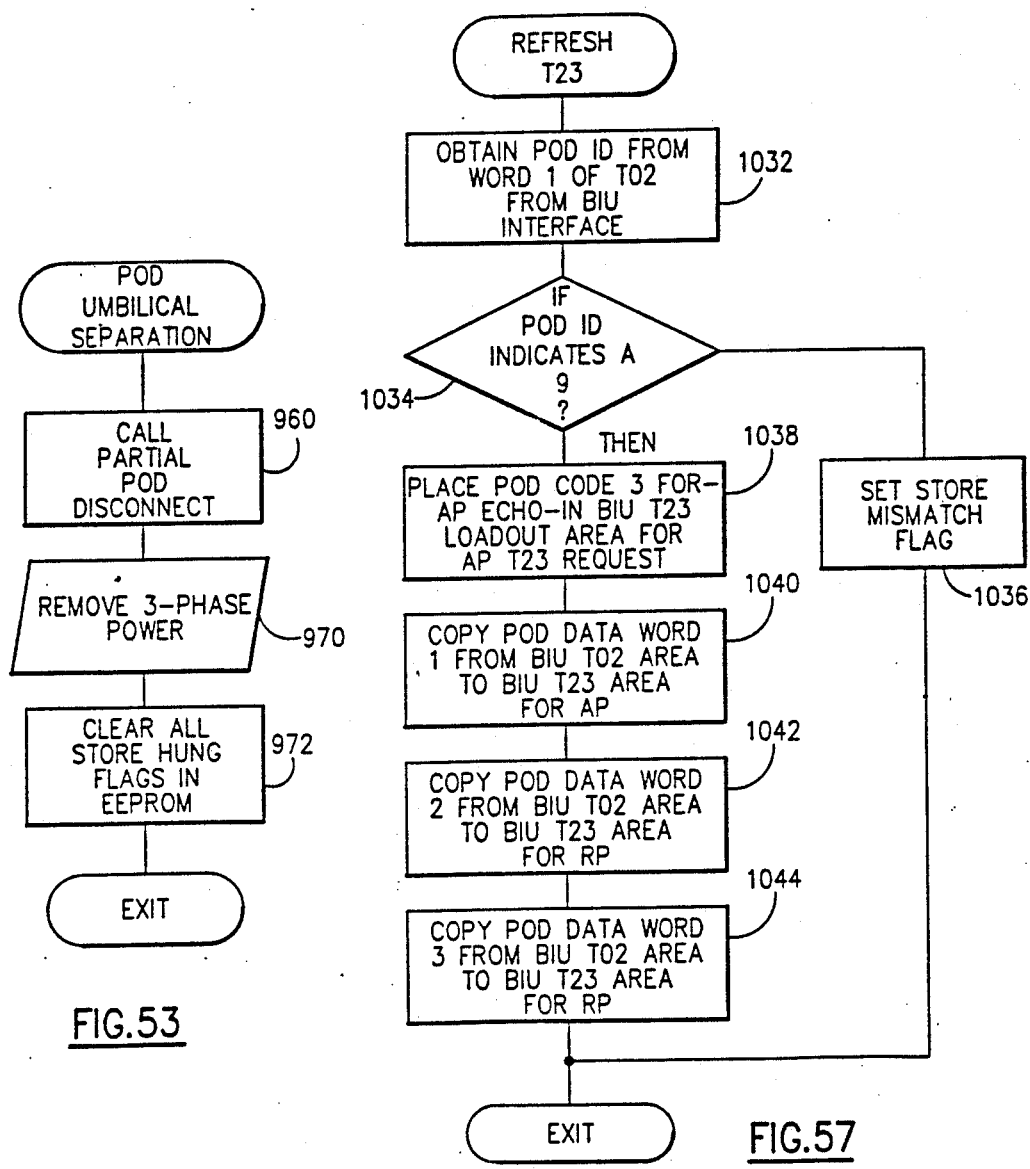
FIG. 53 outlines the operation of the Walleye Pod umbilical separation function.
FIG. 57 is a flow chart showing the operation of the Walleye Pod refresh function.

The pod power removal function is provided to remove all power applied to the Pod from the supporting aircraft. With reference to FIG. 53, when invoked, the first step 960 of this function is to invoke a subfunction, referred to as the partial pod disconnect function, which is represented in FIG. 54. When this subfunction is invoked, it opens the low band width and high band width video lines to disconnect the Pod from these lines at steps 962, 964 and 966. The partial pod disconnect function then, at step 968, terminates the station select signal conducted to the Pod via connector pin P17; and after this, processing control is returned to the umbilical separation function.

This separation function, at step 970, then removes the three phase AC power applied to the store, and at step 972 clears all the store hung flags in the SIU memory; and then the pod umbilical separation function terminates.

The station select function is provided to process station select and deselect commands from the control station. As represented by FIG. 55, when invoked, at steps 974 and 976, this function checks the station select command bit, or word, of the most recent R24 message transmitted to the station. If this word is not a station select command, then at step 978, the station select function invokes the partial-pod disconnect subfunction; and after this subfunction is completed, the T23 update flag and the station select flag are cleared at steps 980 and 982 respectively. If the station select command word is a station select command, then at steps 984 and 986, the station select function applies the station select signal to the Pod, and connects the Pod to the low band width audio line. The function also connects the Pod to the high band width video lines at steps 988 and 990 respectively, and the T23 update flag and the station select flag are set at steps 992 and 994 respectively.

Figures 56, 56A:
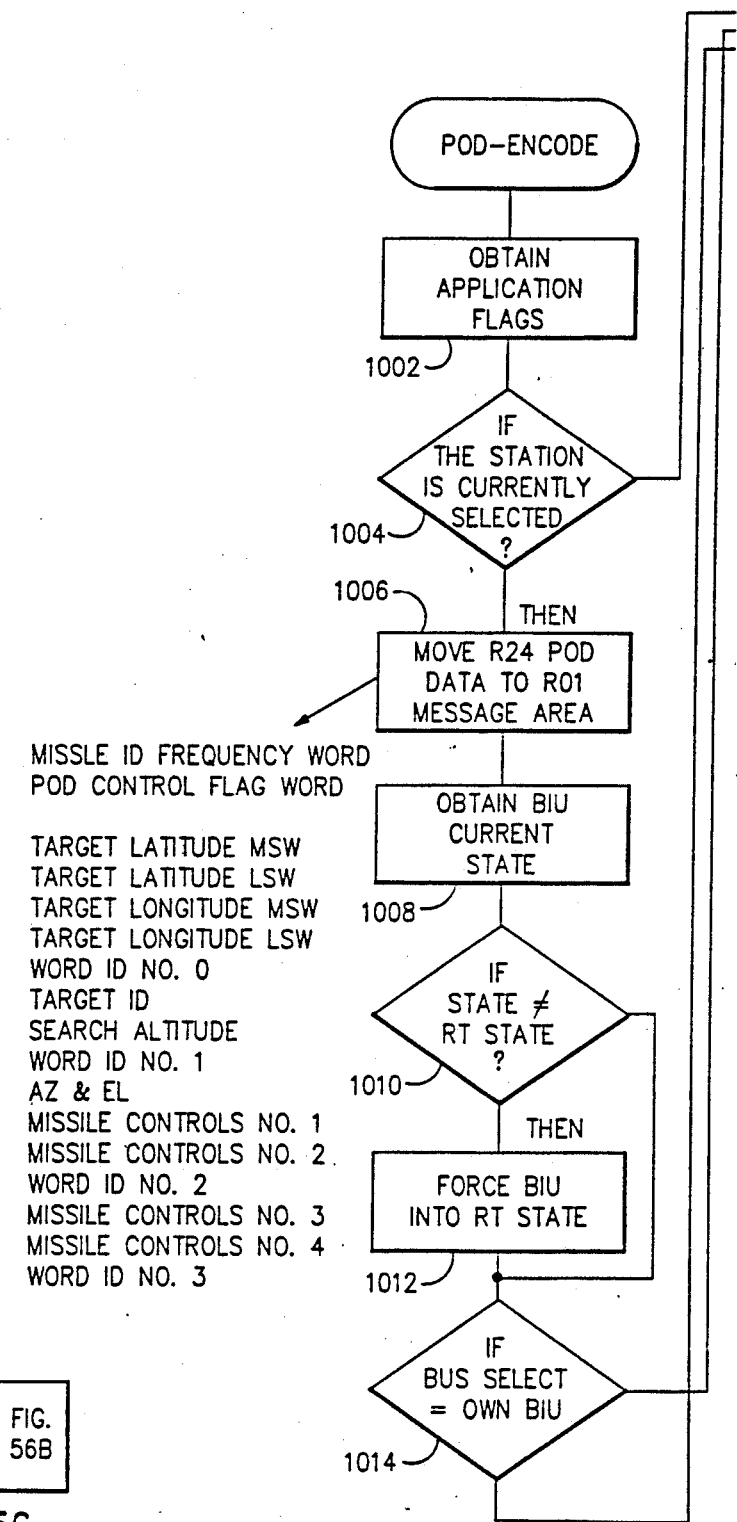
FIG. 56, which consists of FIGS. 56A and 56B, is a flow chart outlining the Walleye Pod encode function.
Figure 56B:
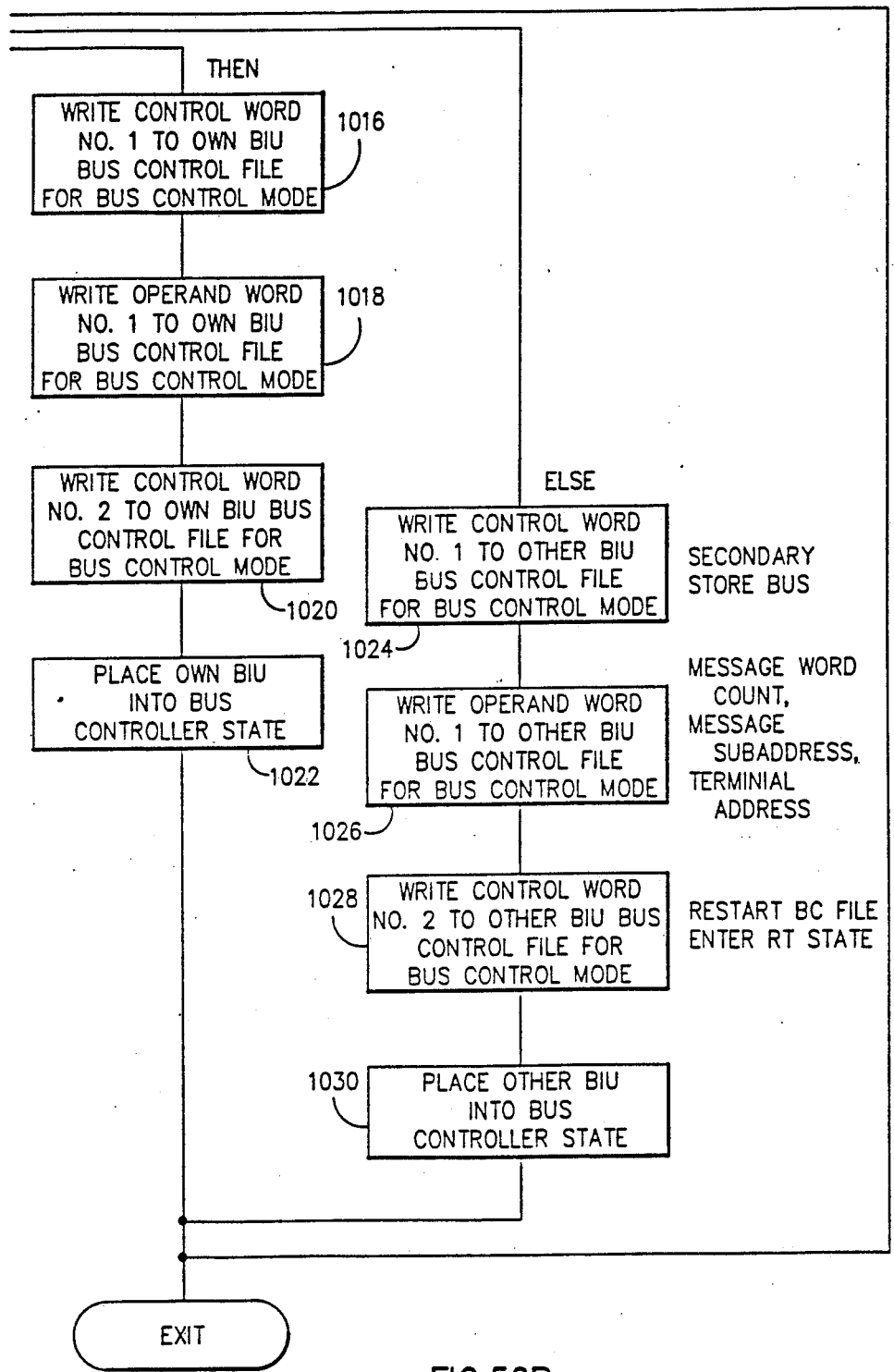

The pod encode function is provided to transfer pod data words received by the terminal in an R24 message, into an R01 message, and then to use one of the BIUs to transmit that R01 message to the store. More specifically, with reference to FIG. 56, when invoked, the pod encode function, at steps 1002 and 1004, checks the application flags to determine if the station has received a station select command. If the station has not received this command, the function terminates. However, if the station has received this command, the pod encode function then transfers the pod data words in the R24 message into an R01 message format at step 1006. After this, the pod encode function, at steps 1008 and 1010, checks the state of the BIUs. If the BIUs are not in the remote terminal state, the pod encode function changes the BIUs into the remote terminal state at step 1012, and then moves on to step 1014. If, though, at step 1010, the BIUs are already in the remote terminal state, the pod encode function skips step 1012 and proceeds directly to step 1014.

At step 1014, the pod encode function checks the bus preference flag to determine which BIU to use to transmit the R01 message to the Pod. If the bus preference flag indicates that the associated BIU is to be used, the R01 message is transmitted via that BIU at steps 1016, 1018, 1020 and 1022. This is done by transmitting to the bus control files of the memories of this BIU, a control word and a operand word of a first bus control record, and a control word of a second bus control record, and then placing the BIU into the bus controller state. If the bus preference flag indicates that the non-associated BIU is to be used to transmit the R01 message, that message is written in that non-associated BIU by transmitting to the bus control files of the BIU memories a control word and an operand word of a first bus control record, and a control word of a second bus control record, and then placing this BIU in the bus controller state at steps 1024, 1026, 1028 and 1030 respectively. After the proper BIU is placed in the bus controller state, the pod encode function ends.

The pod refresh function is provided to transfer pod status data received from the Pod in a T02 message, into a T23 message for transmission to the control station. In particular, as illustrated in FIG. 57, when invoked, the pod refresh function, at steps 1032 and 1034, checks the pod identification code of the last received T02 message from the pod. If this pod identification code is not the identification code of the pod attached to the station, then the store mismatch flag is set at step 1036, and the pod refresh function ends. However, if the pod identification code in the T02 message matches the identification code of the pod that is attached to the station, then a value of 3 is placed in the T23 load out area at step 1038. Then, the three data words of the T02 message are transferred from the T02 message storage area of the BIU into the T23 message loading area of the BIUs at steps 1040, 1042 and 1044 respectively. After these three data words have been transferred, the pod refresh function terminates.

Figure 58B:
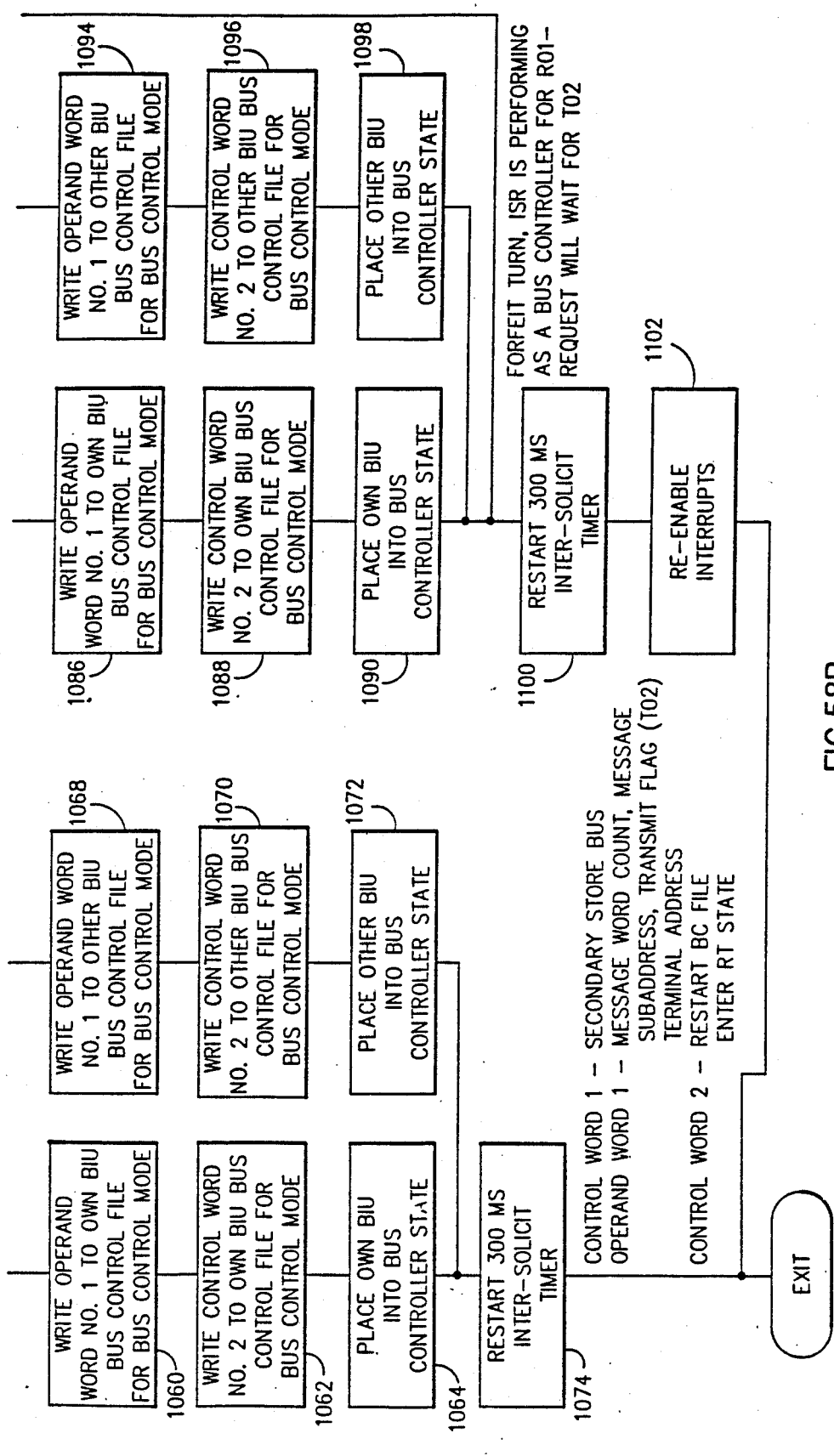
FIG. 58, which consists of FIGS. 58A and 58B, is a flow chart of the Walleye Pod solicit routine.

The pod status request function is provided to program the BIU to send to the Walleye pod a request for a T02 message from the pod. With reference to FIG. 58, first, at steps 1050 and 1052, this function checks the 1760 initialization flag. If this flag is set, which indicates that the store is undergoing initialization procedures, the BIU is placed in the remote terminal state at step 1054, and then the bus preference flag of the SIU is checked at step 1056. If the bus preference flag indicates that the associated BIU is to be used to transmit the request for the T02 message, then at steps 1058, 1060 and 1062, the message is written in that BIU by transmitting thereto a control word and an operand word of a first bus control record in the bus control file of the BIU memories, and a control word of a second bus control record, and then the associated BIU is placed in the bus controller state at step 1064. If, at step 1056, the bus preference flag indicates that the not associated BIU is to be used to transmit the request for the T02 message, then at steps 1066, 1068 and 1070, the message is written into that BIU by transmitting thereto a control word and an operand word of a first bus control record in the bus control file of the BIU memories, and a control word of a second bus record, and then that other BIU is placed into the bus controller state at step 1072. Once the preferred BIU has been placed in the bus controller state, the 300 millisecond intersolicit timer is started at step 1074, and then the pod status request function terminates.

If, at step 1052, the 1760 initialization flag is not set, then the pod status request function moves to step 1076. At this step, the interrupts are disabled, and then at step 1078, the BIU state is checked. If the BIU is in the remote terminal state, the bus preference flag is checked at step 1082. If the bus preference flag indicates that the associated BIU is to be used to transmit the request for the the T02 message, then at steps 1084, 1086 and 1088, the message is written into that BIU by transmitting thereto a control word and an operand word of a first bus control record in the bus control file of the BIU memories, and a control word of a second bus control record, and then the associated BIU is placed in the bus controller state at step 1090. If, at step 1082, the bus preference flag indicates that the not associated BIU is to be used to transmit the request for the T02 message, then at steps 1092, 1094 and 1096, the message is written into that BIU by transmitting thereto a control word and an operand of a first bus control record in the bus control file of the BIU memories, and a control word of a second bus control record, and then that other BIU is placed into the bus controller state at step 1098. Once the preferred BIU has been placed in the bus controller state, the three hundred millisecond intersolicit timer is started at step 1100, all the interrupts are re-enabled at step 1102, and then the pod status request function terminates.

If, at step 1080, the BIUs are not in the remote terminal state, the program skips to step 1100, performs steps 1100 and 1102 and then terminates. In this case, the steps between steps 1082 and 1098 are skipped because the fact that the BIU is not in the remote terminal state indicates that the BIU has been placed in the bus controller state to transmit an R01 message, and this opportunity to transmit a request to the pod for a T02 status message is not utilized.

The pod hung monitor function, generally, monitors the status of the pod whenever it has been detected as being hung, which is defined as a condition existing after an attempt has been to release the pod by means of the pod jettison function, but the pod fails to leave the aircraft. Once a hung condition has been detected, the pod hung monitor function normally monitors the status of the pod for as long as the pod remains attached to the aircraft.

Figure 59:
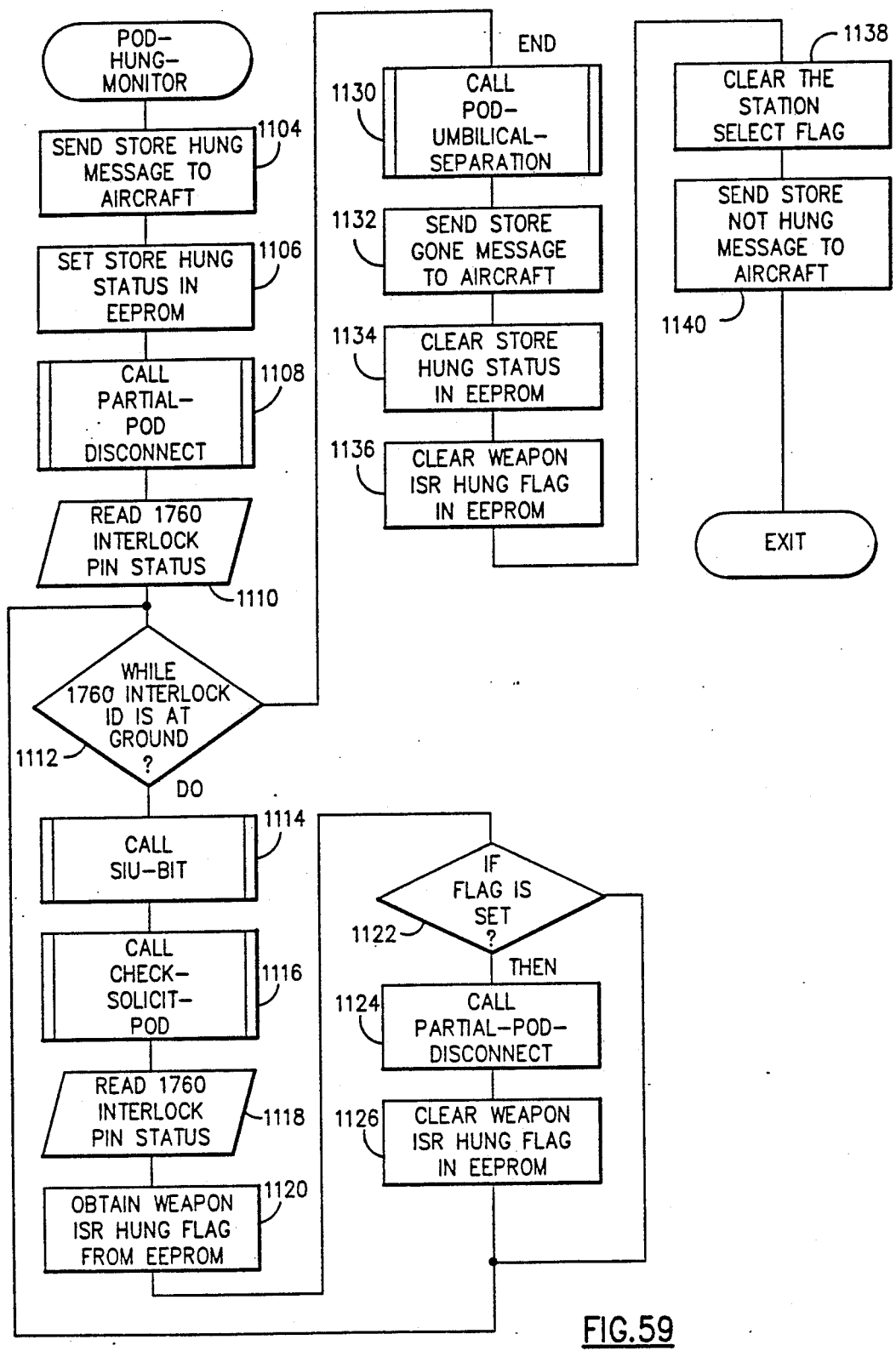
FIG. 59 is a flow chart of the Walleye Pod hung monitor function.

With reference to FIG. 59, at step 1104, the store hung message is sent to the control station; at step 1106, the store hung flag is set in the SIU memory; and at step 1108, the partial pod disconnect function is invoked Once the partial pod disconnect function is completed, the Pod hung monitor function monitors the voltage of the 1760 interlock pin at step 1110; and then, as represented by step 1112, enters a loop in which the voltage level of this pin is monitored.

In this loop, the SIU BIT is invoked at step 1114, and then the check solicit pod function, discussed below, is invoked at step 1116. After these two functions are completed, the voltage level of the 1760 interlock pin is sensed at step 1118, and then the weapon ISR hung flag is checked at steps 1120 and 1122. If this flag is set, the partial pod disconnect function is invoked at step 1124; and after this function is completed, the weapon hung flag is cleared at step 1126, the program returns to step 1112 and continues on from there. If, at step 1122, the weapon ISR hung flag is not set, the program skips steps 1124 and 1126 and directly returns to step 1112. Once the 1760 interlock pin is detected as being at a high voltage level, the program exits the loop between steps 1112 and 1126, and proceeds to step 1130. The pod umbilical separation function is invoked at step 1130, and after completion of this function, a store gone message is sent to the control station at step 1132. Then, at steps 1132, 1134, 1136, 1138 and 1140, the store hung flag and the weapon ISR hung flag in the SIU memory are cleared, the station select flag is cleared, a store not hung message is sent to the control station, and this completes the pod hung monitor function.

Figure 60:
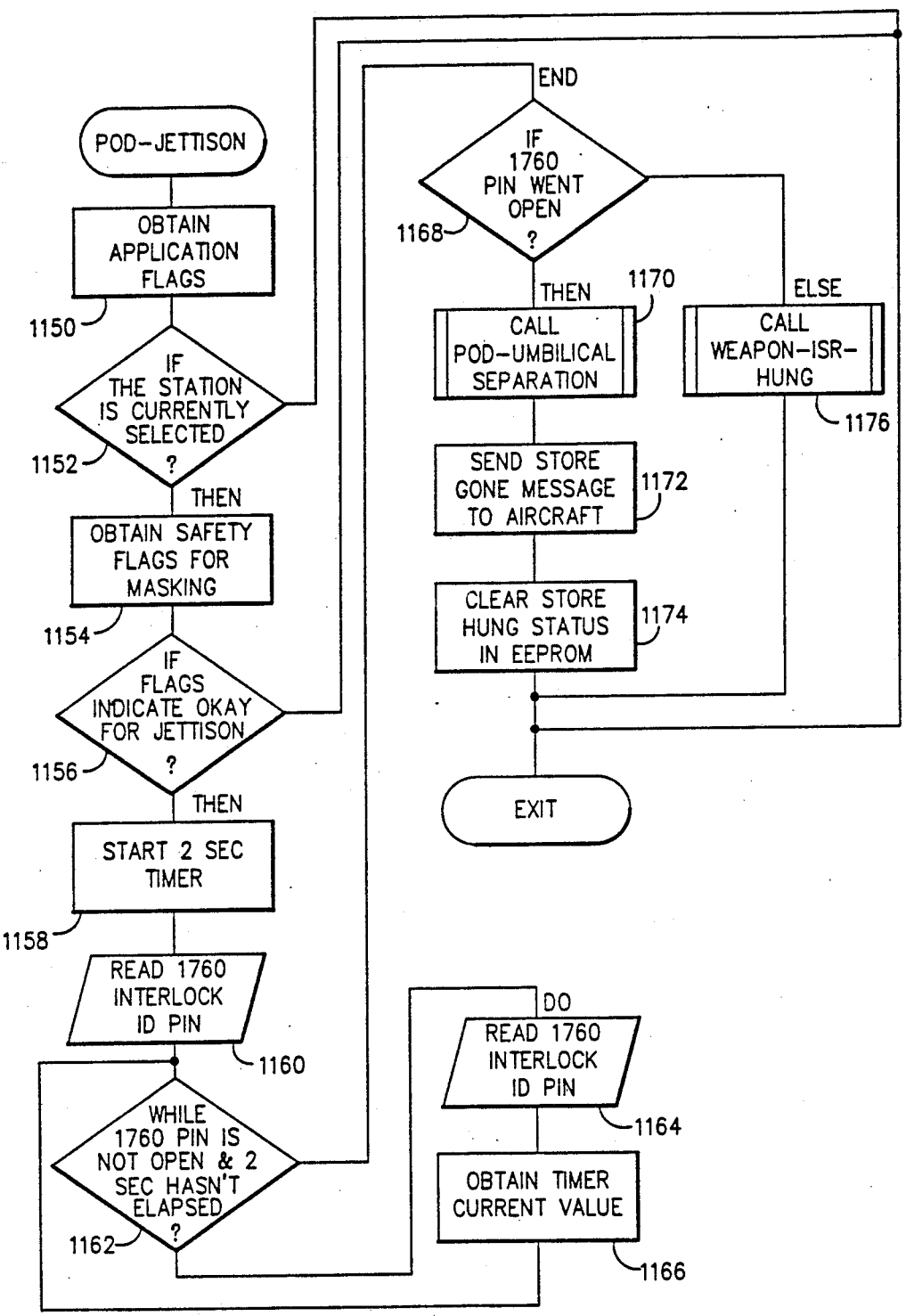
FIG. 60 is a flow chart illustrating the operation of the Walleye Pod jettison function.

The pod jettison function is provided to check various conditions to determine if it is proper to jettison the pod; and if it is not, this function will prevent pod jettison. This function also monitors the pod to detect when the pod is jettisoned. As represented in FIG. 60, at steps 1150 and 1152, the application flags are checked; and if the station has not received a station select command, the pod jettison function terminates. If the station has received a station select command, then the jettison flag word and the safety flags of the Walleye command message are checked at steps 1154 and 1156 respectively. If the jettison flag word indicates jettison is not permitted at this time, or if the safety flag words indicate that it is not safe to jettison the pod, the pod jettison function ends. However, if the jettison flag word indicates that jettison is permitted and the safety flag words indicate that it is safe to jettison the pod, a two second time period is started at step 1158, and the voltage of the 1760 interlock pin is detected at step 1160.

Next, as represented by steps 1162, 1164 and 1166, the pod jettison function enters a loop in which the 1760 interlock pin is monitored, and the function remains in this loop until the two second time period ends, or the 1760 pin is detected at a high voltage. If the function exits this loop because the 1760 pin is detected as being at a high voltage, as represented by step 1168, then the pod umbilical separation function is invoked at step 1170. Upon completion of this function, the store gone message is sent to the control station at step 1172, the store hung flag in the SIU memory is cleared at step 1174, and then the pod jettison function terminates. However, if the pod jettison function exits the loop formed by steps 1162, 1164 and 1166 because the abovementioned two second time period expires, the store hung function is invoked at step 1176; and upon completion of this function, the pod jettison function itself terminates.

Figures 61, 61B:
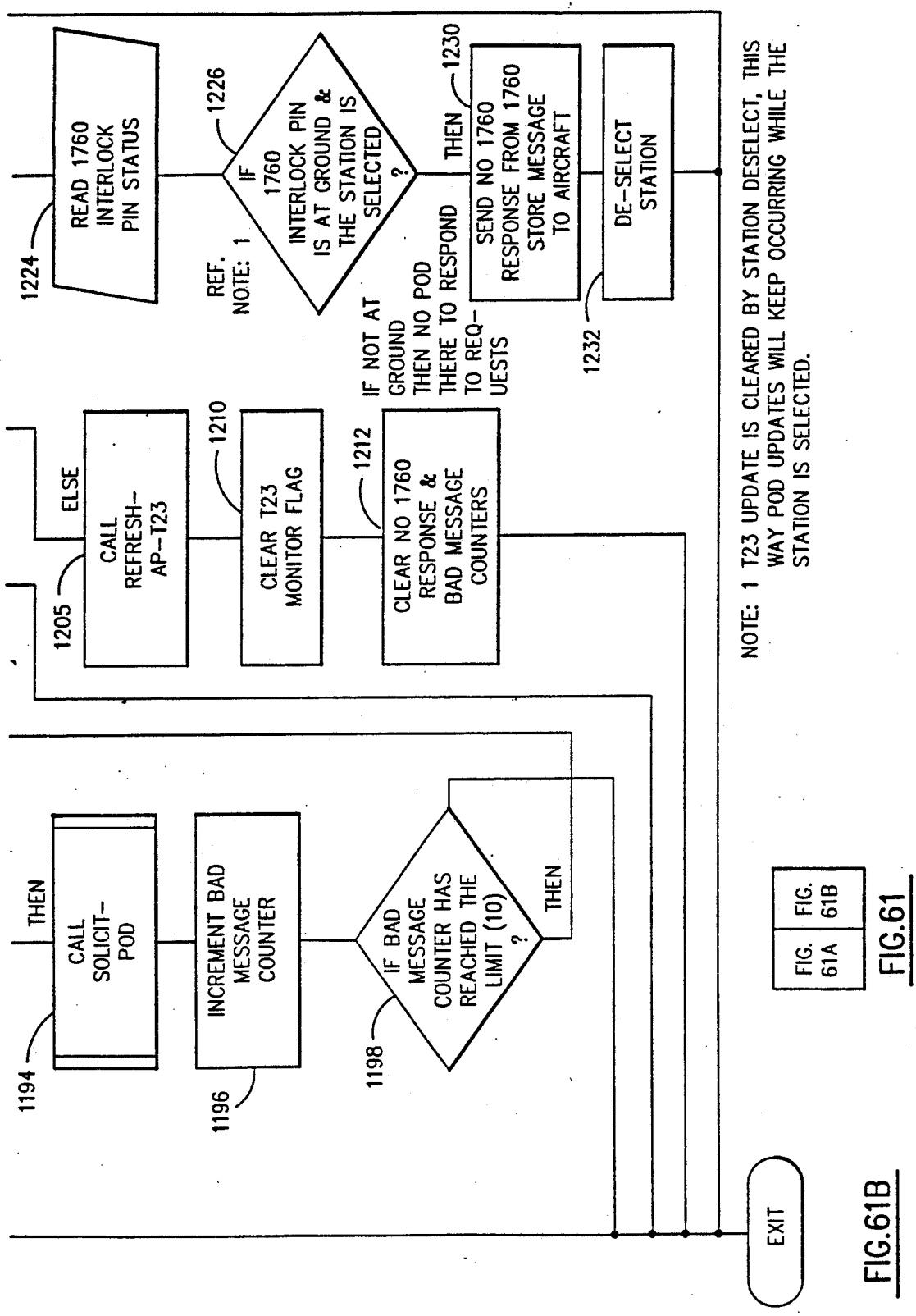
FIG. 61, which consists of FIGS. 61A and 61B, is a flow chart for the Walleye Pod check-solicit function.

The check-solicit Pod function is provided to determine when it is time to solicit the Pod for new data for a T02 message, and it perform various other tasks relating to those requests With reference to FIG. 61, at step 1180, the T23 update flag is checked; and if this flag is not set, the function terminates. However, if the T23 update flag is set, the function proceeds to step 1182, which is to check the T23 monitor flag. If this flag is not set, the check-solicit Pod function then sets this flag at step 1184, and invokes the solicit Pod function at step 1186; and after the solicit Pod function ends, the check-solicit Pod function itself terminates. If the T23 monitor flag is set at step 1182, the check-solicit Pod function then checks to determine if the most recent change in the state of the associated BIU has been from bus controller to remote terminal, as represented by step 1188.

If the BIU has been changed from a bus controller to a remote terminal, which indicates that the BIU has received a message, the 10th word of that message is read at step 1190, and the function determines whether that word is a status word from a Walleye Pod at step 1192. If that status word is a Walleye Pod status word, the solicit Pod function is invoked at step 1194, and after the function is completed, the bad message counters in the BIU memories are incremented by one at step 1196. After this, that bad message counter is checked, at step 1198, to determine if it has reached a predetermined limit; and, if it has not reached that limit, the check-solicit Pod function terminates. If, though, the bad message counter has reached that predetermined limit, then at step 1200, a message is sent to the control station indicating that no response has been received from the store, at step 1202 the bad message counter is reset to zero, at step 1204 the station select flag is cleared, and then the check-solicit Pod function terminates.

If, at step 1192, the read status word is determined not to be a Walleye Pod status word, then the Refresh function is invoked at step 1206; and after this Refresh function ends, the T23 flag is cleared at step 1210, the no 1760 response and the bad message counters are cleared at step 1212, and then the Check-Solicit Pod function terminates.

If at step 1188, the Check-Solicit Pod function determines that the most recent change in the state of the BIU has not been from the bus controller state to the remote terminal state, then the Check-Solicit Pod function proceeds to step 1214. At this step, the 300 millisecond inter-solicit timer is checked. If this timer has completed that time period, the Check-Solicit Pod function ends, but if that time period has not finished, the Solicit Pod function is invoked at step 1216. After this function is completed, a 600 millisecond no response counter is incremened at step 1218, and then at step 1220, this counter is checked. If this counter is less than two, the Check-Solicit Pod function ends; but if the counter equals two, the 1760 no response counter and the bad message counters are reset to zero at step 1222.

Then, at step 1224, the voltage level of the 1760 interlock pin is sensed, and at step 1226, the Check-Solicit Pod function determines the status of this pin and checks to determine whether the station has received the station select command. If, either the 1760 interlock pin is not at ground voltage level, or the station has not received the station select command, then the Check-Solicit Pod function terminates. However, if at step 1226, the 1760 interlock pin is at ground voltage level and the station has received the station select command, then at step 1230, a message is sent to the control station indicating that no response has been received from the Walleye Pod, then at step 1272, the station select flag is cleared, and then the Check Solicit-Pod function ends.

Figure 62:
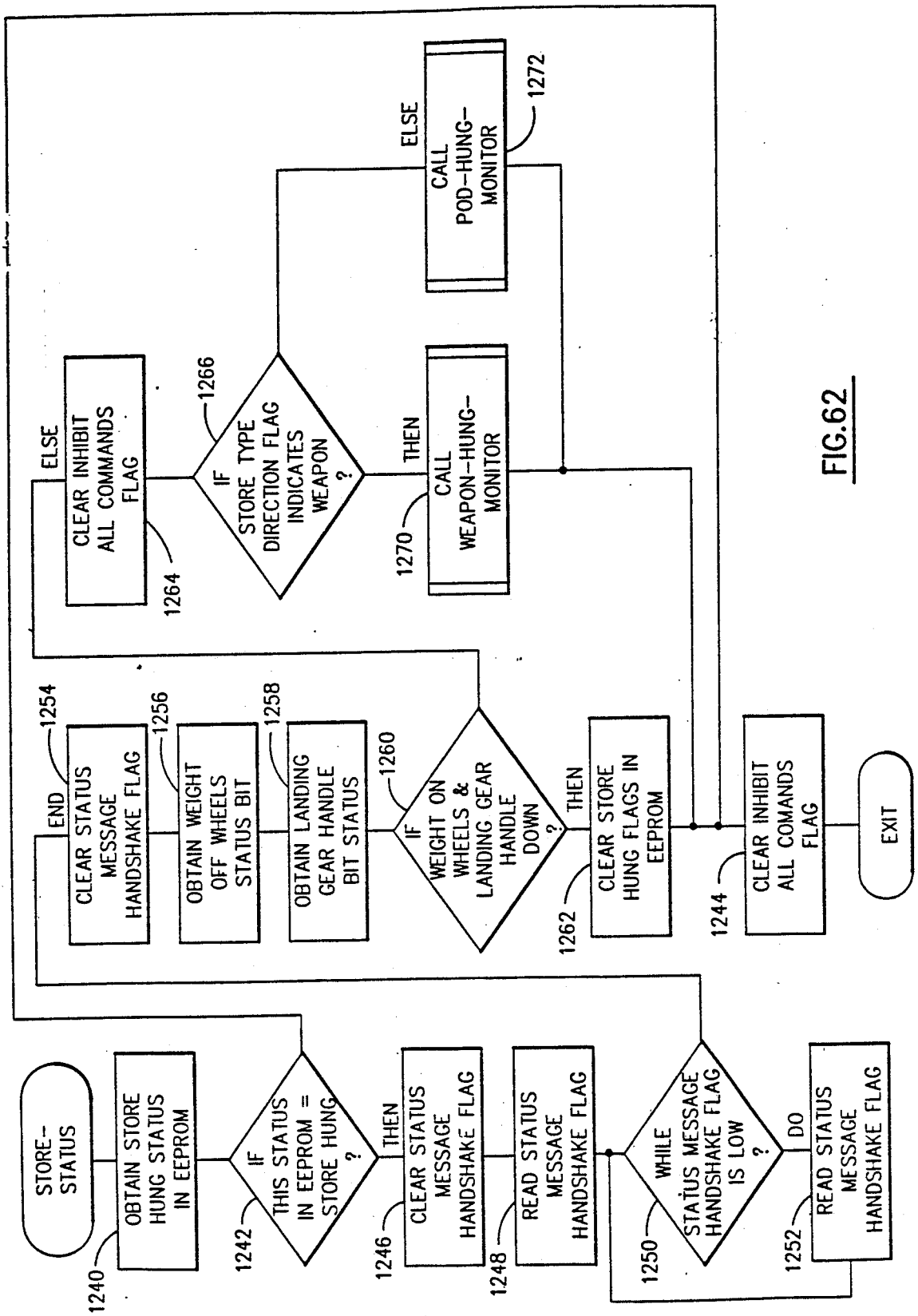
FIG. 62 is a flow chart of the Walleye weapon and Pod store status routine.

The Walleye and Walleye Pod software program is also provided with a store status function, outlined in FIG. 62, to determine the status of the store after a period in which power has been lost or removed from and then reapplied to the station. This function is a general function not specifically related to either the generic application processing, the Walleye weapon processing or the Walleye Pod processing functions. With reference to FIG. 62, when invoked, the store status function, at steps 1240 and 1242, first checks the store hung flag in the SIU memory. If this flag is clear, indicating that the store is not hung, the program, at step 1244, clears the inhibit all commands flag and then terminates. However, if the store hung flag in the SIU memory is set, then at step 1246, the status message handshake flag is cleared; at step 1248, the function reads the status of that message handshake flag; and the program enters a loop formed by steps 1250 and 1252, in which the program waits for the next R24 message. When this message is received, the status message flag is cleared at step 1254, and the weight off wheels flag and the landing gear handle flag in that R24 message are examined at steps 1256, 1258 and 1260 respectively.

If the weight on wheels flag is set and the landing gear handle bit is clear, which indicate that the plane is on the ground supported by the landing gear, it is assumed that the previously detected hung store condition has been corrected since power was lost or removed from the terminal; and the hung store flags in the SIU memory are cleared at step 1262, the inhibit all commands flag is cleared and then the store status function ends. However, if either the weight on wheels bit is set, or the landing gear handle bit is set, it is assumed that the previously detected hung condition is still present. In this case, the inhibit all commands flag is cleared at step 1264, and the store type direction flag is checked at step 1266 to determine if it indicates that a weapon is present at the terminal. If this flag indicates that a weapon is present, the weapon hung monitor function is invoked at step 1270; and if the store type direction flag indicates that a weapon is not present, the pod hung monitor function is invoked at step 1272. After the proper store hung monitor function is completed, the store status function clears the inhibit all commands flag at step 1244, and then this function is completed.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A data management system for use with a plurality of different types of stores, the data management system comprising:
 a central unit;
 a plurality of distributed stations; and
 means to transmit data between the central unit and the distributed stations;
 the central unit including
   (i) means to hold a plurality of store specific application programs, each of the store specific application programs being associated with one of the plurality of store types, each of the store specific application programs including means to control the transmission of data between a store of an associated type and one of the distributed stations, and
   (ii) means to control the operation of the data management system, and including means to select any of the store specific application programs for transmission to any of the distributed stations of the data management system;
 each of the distributed stations including
   (i) means to connect the station to one store of any of said store types, (ii) an input-output section to transmit data between the station and said one store that is connected to the station, and (iii) means to hold any one of the store specific application programs.

2. A data management system according to claim 1, wherein each distributed station further includes a store generic application program to control the transmission of selected data between the station and a store of any of said plurality of types of stores that is connected to the station.

3. A data management system according to claim 2, wherein:

each of the distributed stations further includes a store interface unit connected to the input-output section of the station to receive data from and to transmit data to the input-output section of the station;

the store generic application program is held in the store interface unit; and the means to hold the store specific application program is also located in the store interface unit.

4. A data management system according to claim 3, wherein each store generic application program includes:

means to determine if a store is attached to the station in which the store generic application program is located; and means to determine the type of store attached to the station in which the store generic application program is located.

5. A data management system according to claim 4, wherein each store generic application program further includes means to generate and send to the central unit a store present signal indicating that a store is attached to the station in which the generic application program is stored, and identifying the type of said store.

6. A data management system according to claim 5, wherein, in response to receiving the store present signal from one of the distributed stations, the central unit sends to said one distributed station, the store specific application program associated with the type of store connected to said one distributed station.

7. A data management system according to claim 6, wherein each store specific application program includes:

means to determine if a store is attached to the station in which the store specific application program is located; and means to determine if a store attached to the station is of the type associated with the store specific application program.

8. A data management system according to claim 1, wherein:

the means to transmit data between the central unit and the distributed station includes a system data bus connected to the central unit and to each of the distributed stations;

each distributed station further includes (i) a bus interface unit connected to the system data bus to transmit data between said system data bus and the distributed station, and (ii) a store interface unit connected to the bus interface unit and to the input-output section of the station, to receive data from and to transmit data to the bus interface unit, and to receive data from and to transmit data to the input-output section of the station.

9. A data management system according to claim 8, wherein:

each distributed station further includes a store bus connected to the bus interface unit of the station, to directly connect the bus interface unit to the store connected to the station; and each distributed station has a normal mode of operation to transmit data between the bus interface unit and the store interface unit of the station, and a bypass mode of operation to transmit data between the bus interface unit and a store connected to the station.

10. A data management system according to claim 9, wherein:

the central unit further includes means to generate a passthrough command and to send the passthrough command to the bus interface units; and each bus interface unit includes a control program including means, responsive to the passthrough command, to change the bus interface unit from the normal mode of to the bypass mode of operation.

11. A data management system according to claim 1, wherein:

the means to transmit data comprises first and second system data buses, each of the system data buses being connected to the central unit and to each of the distributed stations; and each distributed station further includes (i) first and second bus interface units, the first bus interface unit of each distributed station being connected to the first system data bus to transmit data between the distributed station and the first system data bus, the second bus interface unit of each distributed station being connected to the second system data bus to transmit data between the distributed station and the second system data bus, and (ii) first and second store interface units, the first store interface unit of each distributed station being connected to both the first and second bus interface units of the station to transmit data between said first store interface unit and the first and second bus interface units of the station, the second store interface unit of each distributed station being connected to both the first and second bus interface units of the distributed station to transmit data between the second interface unit and both the first and second bus interface units of the station.

12. A data management system according to claim 11, wherein:

each distributed station further includes first and second store buses;

the first store bus of each distributed station is connected to the first bus interface unit thereof to transmit data directly between said first bus interface unit and a store connected to the station; and the second store bus of each distributed station is connected to the second bus interface unit thereof to transmit data directly between said second bus interface unit and the store connected to the station.

* * * * *